United States Patent
Park et al.

(10) Patent No.: US 10,491,276 B2
(45) Date of Patent: Nov. 26, 2019

(54) METHOD FOR TRANSMITTING AND RECEIVING CHANNEL STATE INFORMATION IN MULTI-ANTENNA WIRELESS COMMUNICATION SYSTEM, AND APPARATUS THEREFOR

(71) Applicant: LG ELECTRONICS INC., Seoul (KR)

(72) Inventors: Haewook Park, Seoul (KR); Hyungtae Kim, Seoul (KR); Kijun Kim, Seoul (KR); Jonghyun Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/064,924

(22) PCT Filed: May 11, 2017

(86) PCT No.: PCT/KR2017/004879
§ 371 (c)(1),
(2) Date: Jun. 21, 2018

(87) PCT Pub. No.: WO2017/196098
PCT Pub. Date: Nov. 16, 2017

(65) Prior Publication Data
US 2019/0260434 A1 Aug. 22, 2019

Related U.S. Application Data

(60) Provisional application No. 62/335,053, filed on May 11, 2016, provisional application No. 62/371,835, (Continued)

(51) Int. Cl.
*H04B 7/0456* (2017.01)
*H04B 7/06* (2006.01)
*H04B 7/0452* (2017.01)

(52) U.S. Cl.
CPC ........ *H04B 7/0456* (2013.01); *H04B 7/0626* (2013.01); *H04B 7/0452* (2013.01); *H04B 7/0617* (2013.01)

(58) Field of Classification Search
CPC .. H04B 7/0456; H04B 7/0626; H04B 7/0617; H04B 7/0452
See application file for complete search history.

(56) References Cited

U.S. PATENT DOCUMENTS

| | | | |
|---|---|---|---|
| 9,654,195 B2 | 5/2017 | Rahman et al. | |
| 2013/0301448 A1* | 11/2013 | Sayana | H04W 24/10 370/252 |
| 2014/0328422 A1* | 11/2014 | Chen | H04B 7/0486 375/267 |

FOREIGN PATENT DOCUMENTS

| | | |
|---|---|---|
| JP | 2014-042253 A | 3/2014 |
| KR | 10-2012-0089820 A | 8/2012 |

(Continued)

OTHER PUBLICATIONS

3GPP TSG RAN WG1 Meeting #84bis, R1-162693, Agenda Item 7.3.3.2.3., "Linear Combination Codebook and CSI Reporting," Busan, Korea, Apr. 11-15, 2016, 6 pages.

*Primary Examiner* — Vineeta S Panwalkar
(74) *Attorney, Agent, or Firm* — Fish & Richardson P.C.

(57) ABSTRACT

Disclosed are a method for transmitting and receiving channel state information in a multi-antenna wireless communication system, and an apparatus therefor. Particularly, a method by which user equipment (UE) reports channel state information in a two-dimensional multi-antenna wireless communication system comprises the steps of: receiving, from a base station, a channel state information reference signal (CSI-RS) through a multi-antenna port; and reporting the channel state information to the base station, wherein a plurality of codewords, which are used for generating a
(Continued)

pre-coding matrix selected by the UE in a codebook for reporting the channel state information, are specified by the channel state information and, after power coefficients are applied to each of the plurality of codewords, the pre-coding matrix can be generated based on a linear combination of the plurality of codewords to which the power coefficients are applied.

12 Claims, 19 Drawing Sheets

Related U.S. Application Data filed on Aug. 7, 2016, provisional application No. 62/376,471, filed on Aug. 18, 2016, provisional application No. 62/401,919, filed on Sep. 30, 2016, provisional application No. 62/420,542, filed on Nov. 10, 2016, provisional application No. 62/422,581, filed on Nov. 15, 2016.

(56) References Cited

FOREIGN PATENT DOCUMENTS

| | | |
|---|---|---|
| KR | 10-2013-0028783 A | 3/2013 |
| WO | WO 2010/147416 A2 | 12/2010 |

* cited by examiner

[FIG. 1]
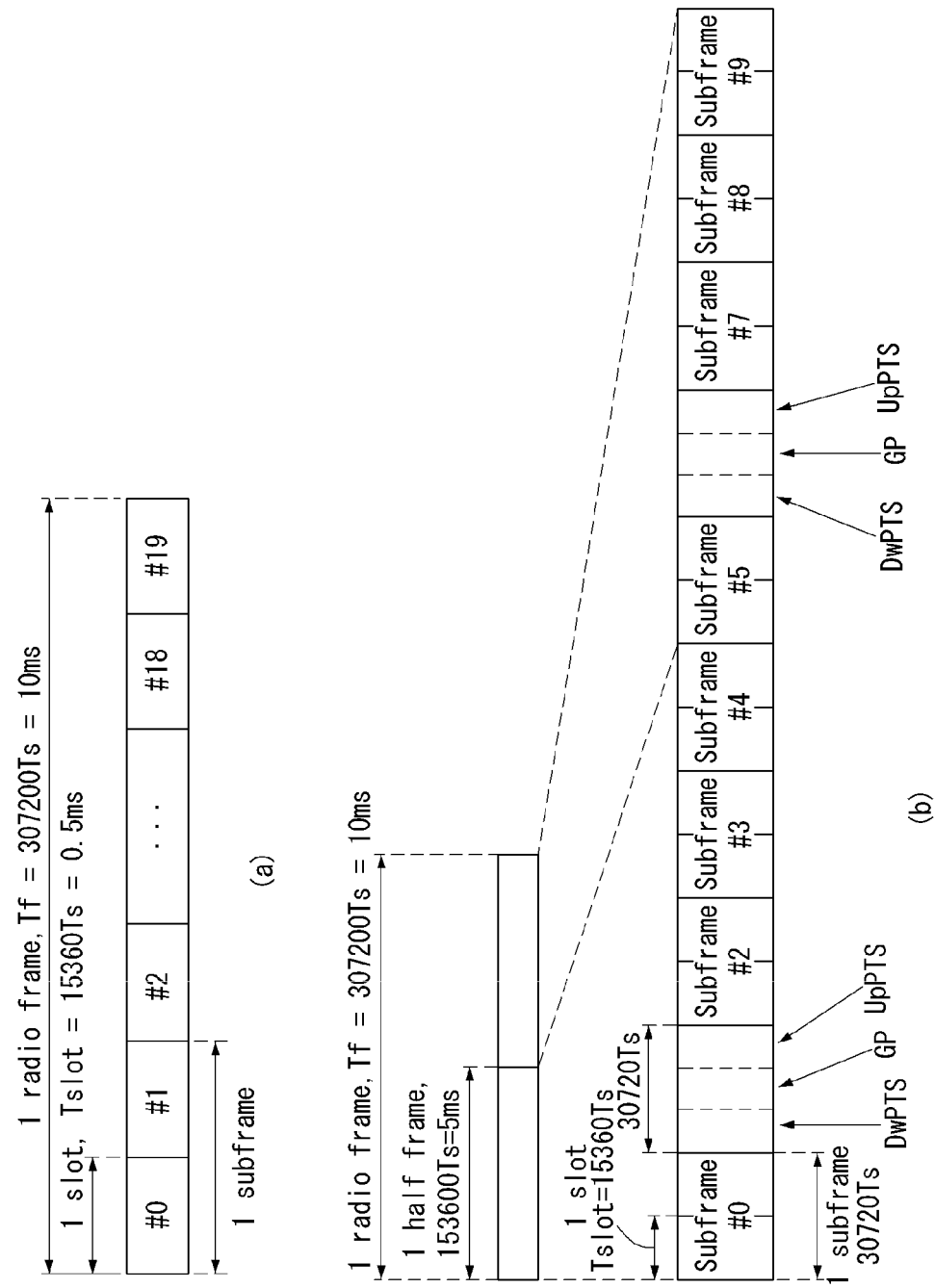

[FIG. 2]
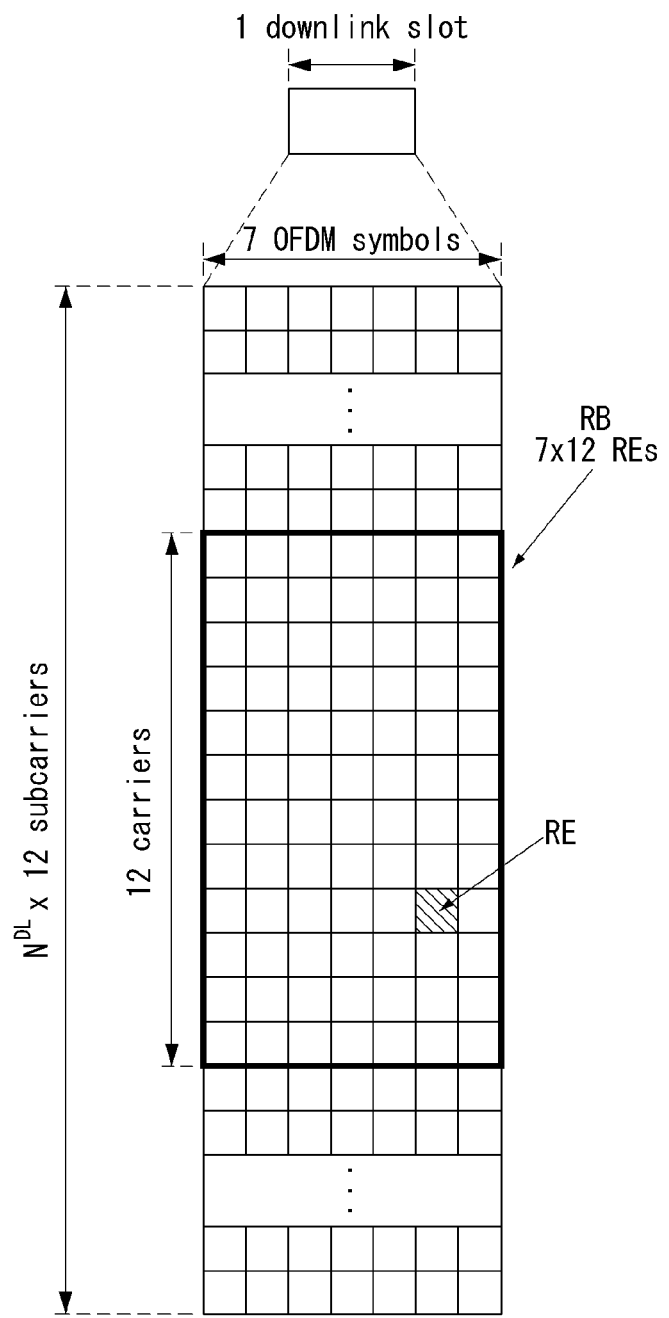

[FIG. 3]
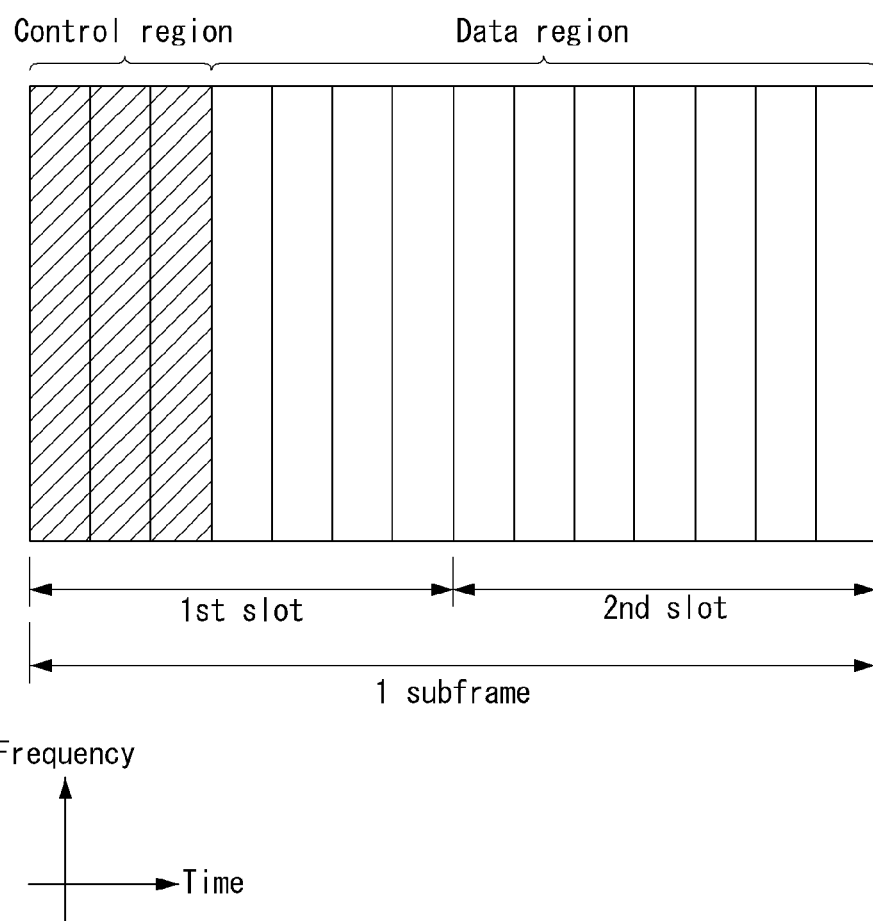

[FIG. 4]
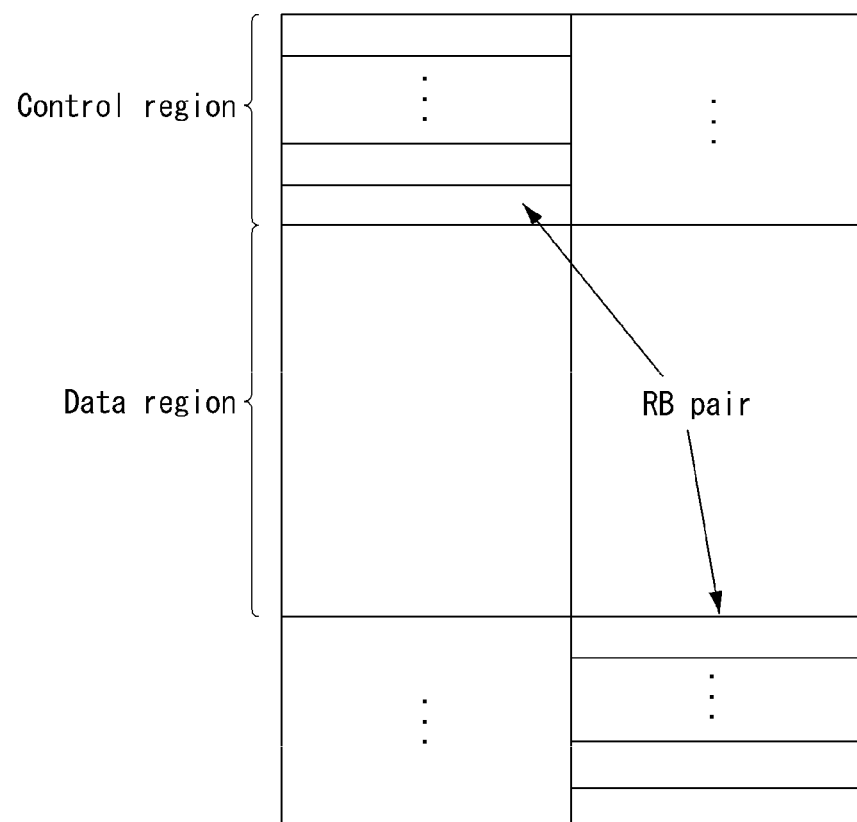

【FIG. 5】
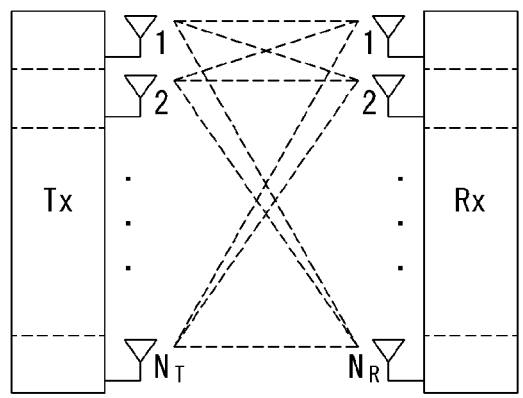
【FIG. 6】
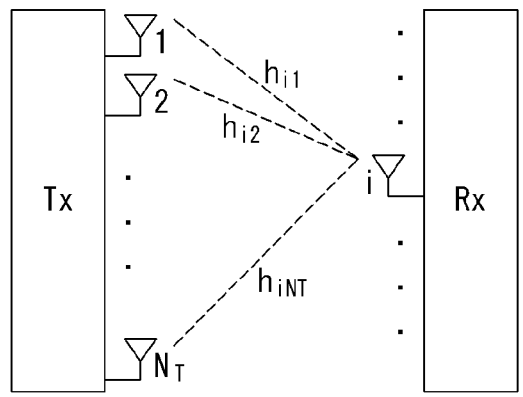

[FIG. 7]
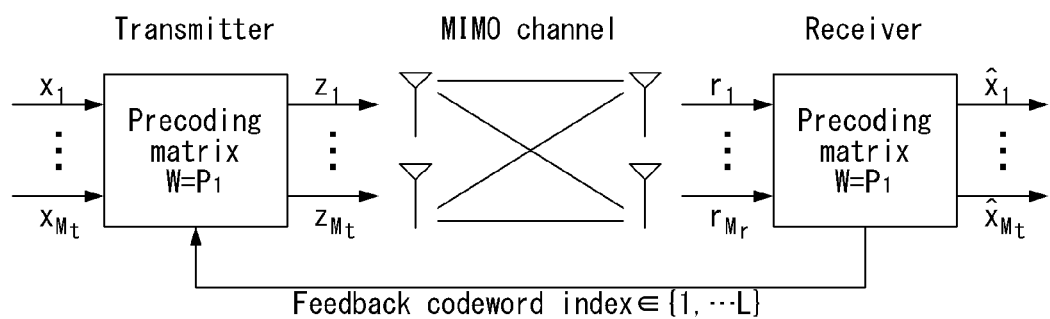

[FIG. 8]
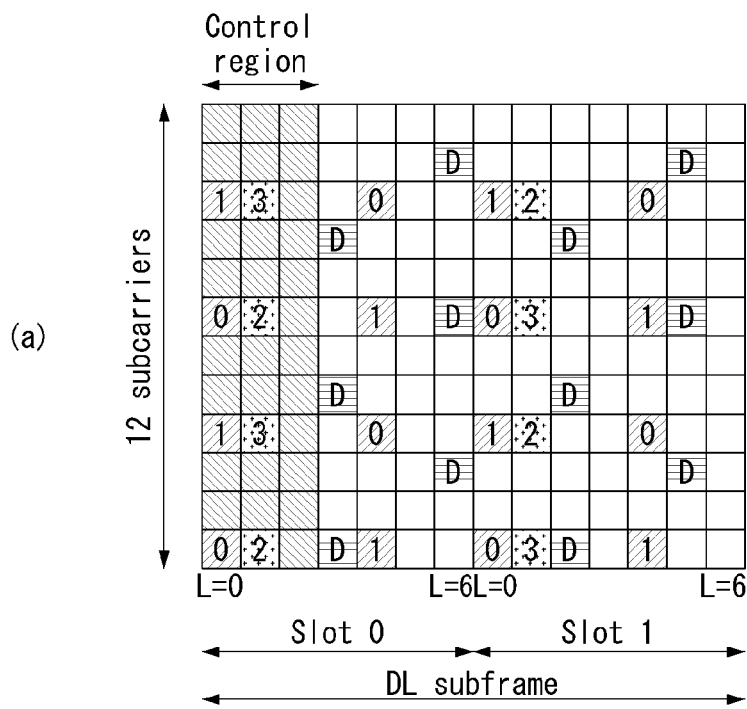
(a)
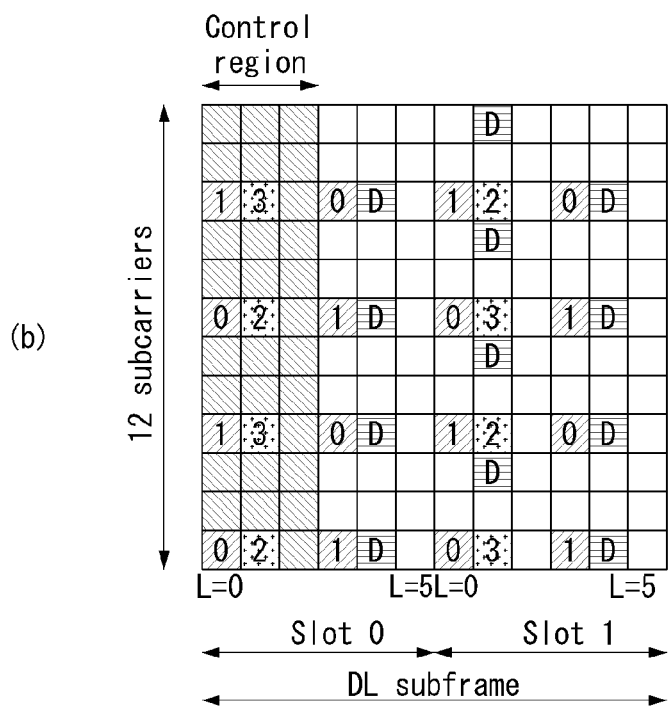
(b)

【FIG. 9】
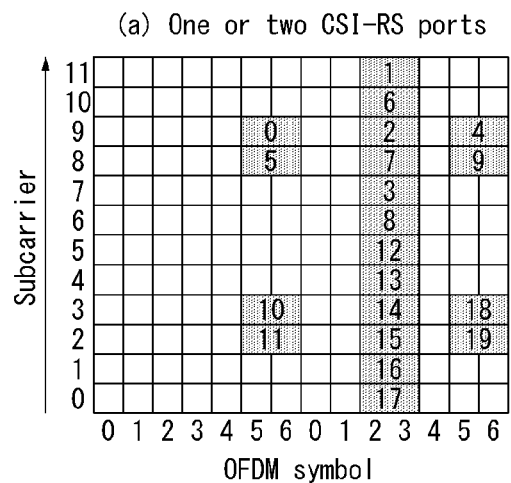
(a) One or two CSI-RS ports
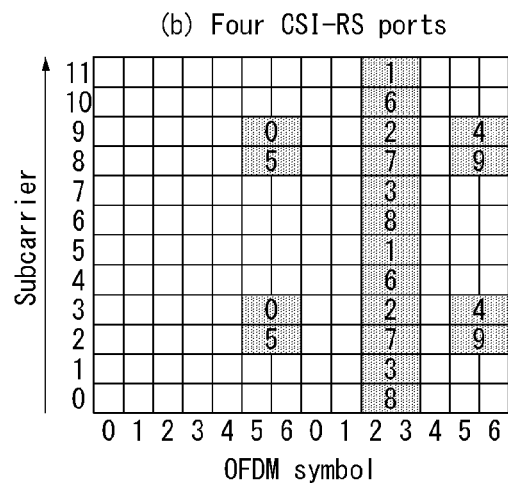
(b) Four CSI-RS ports
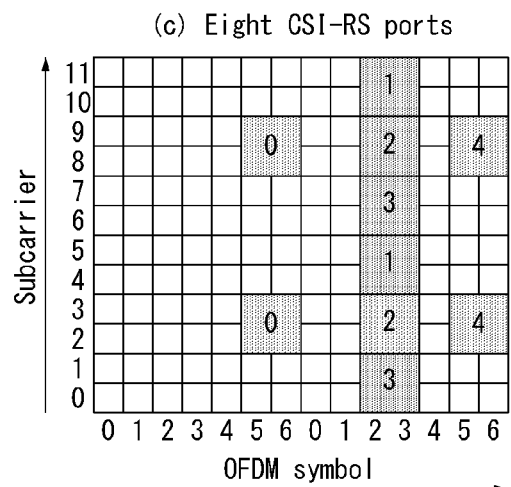
(c) Eight CSI-RS ports

[FIG. 10]
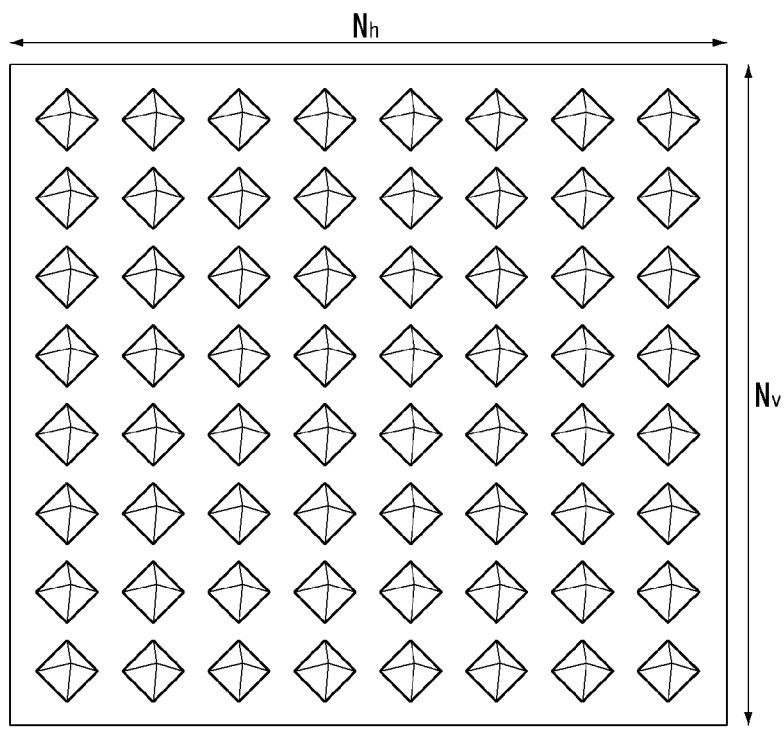
[FIG. 11]
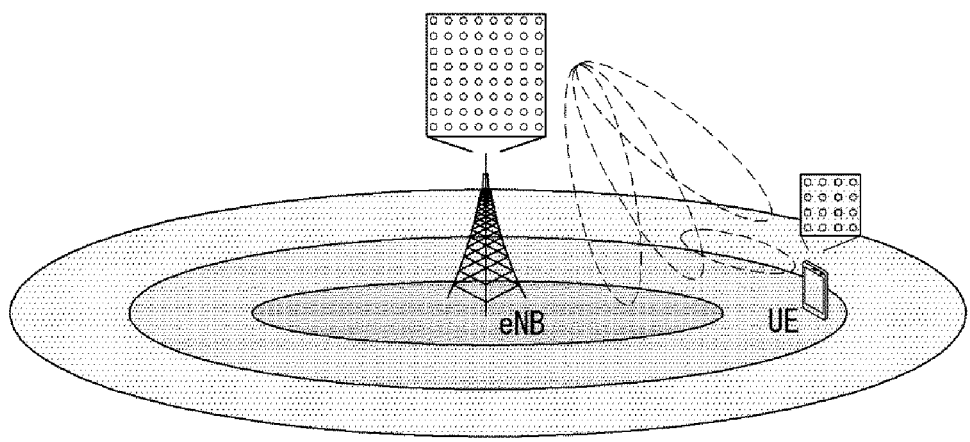

[FIG. 12]
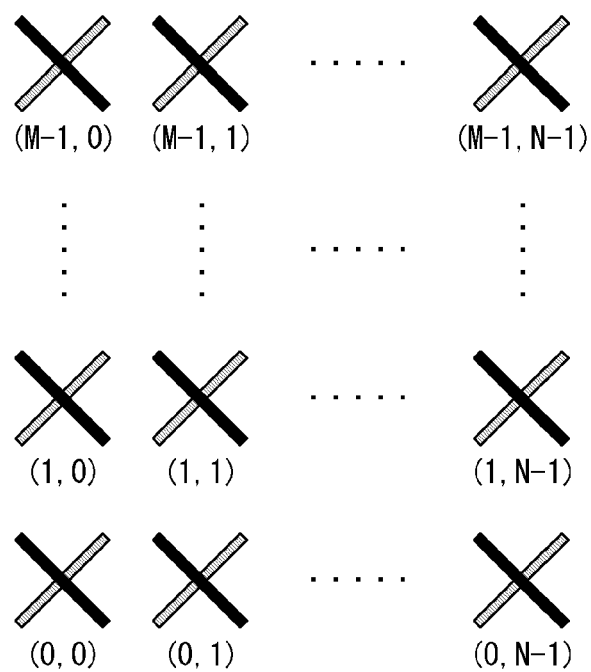

[FIG. 13]
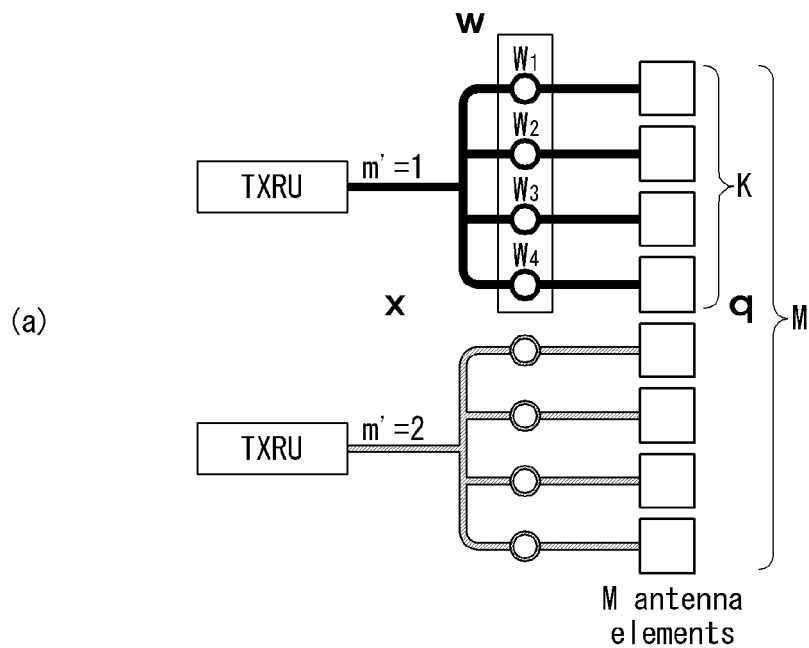
(a)
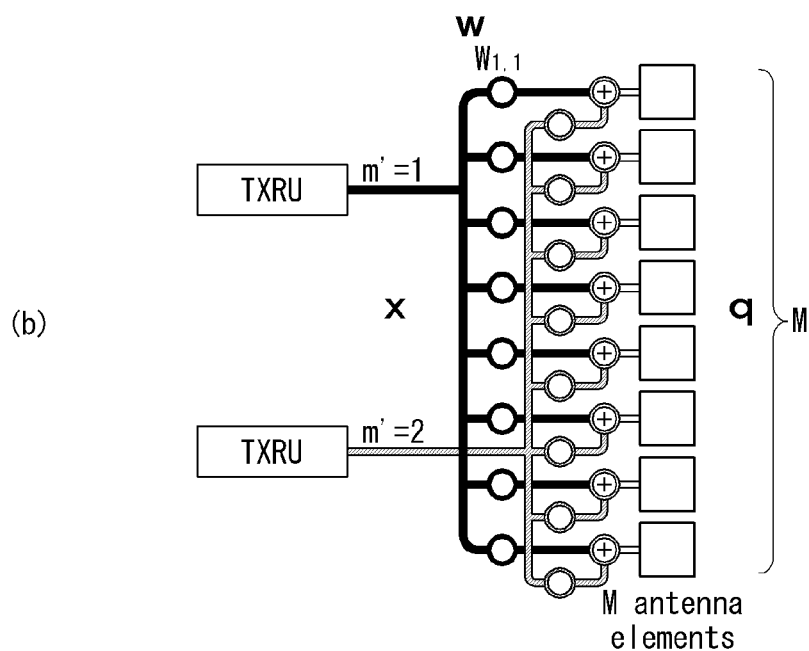
(b)

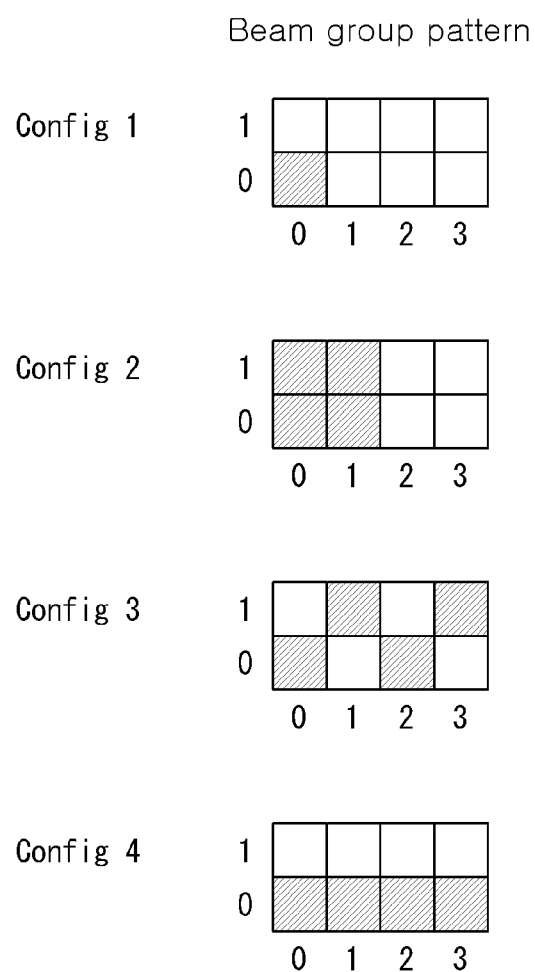
[FIG. 14]

[FIG. 15]
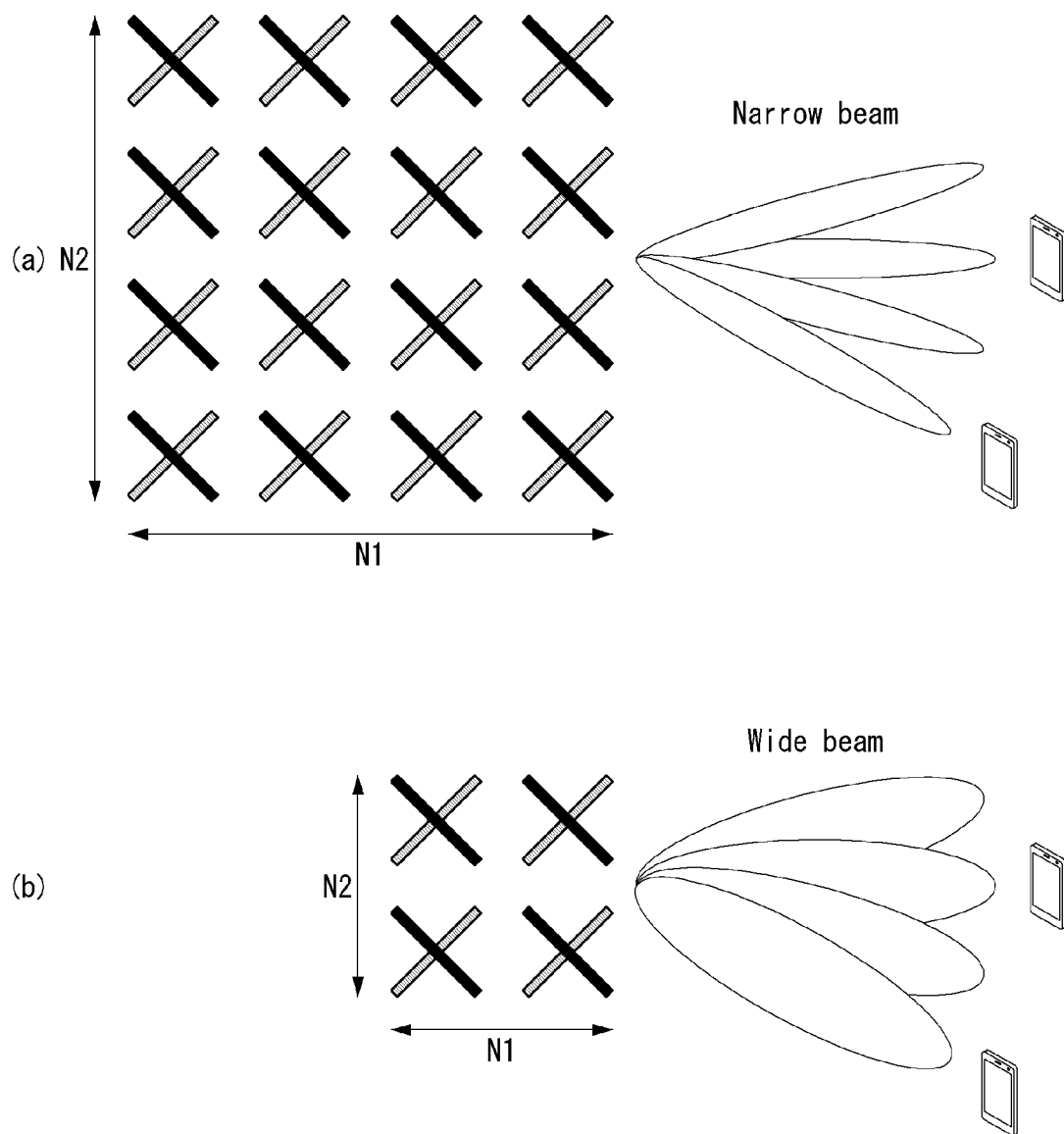

[FIG. 16]
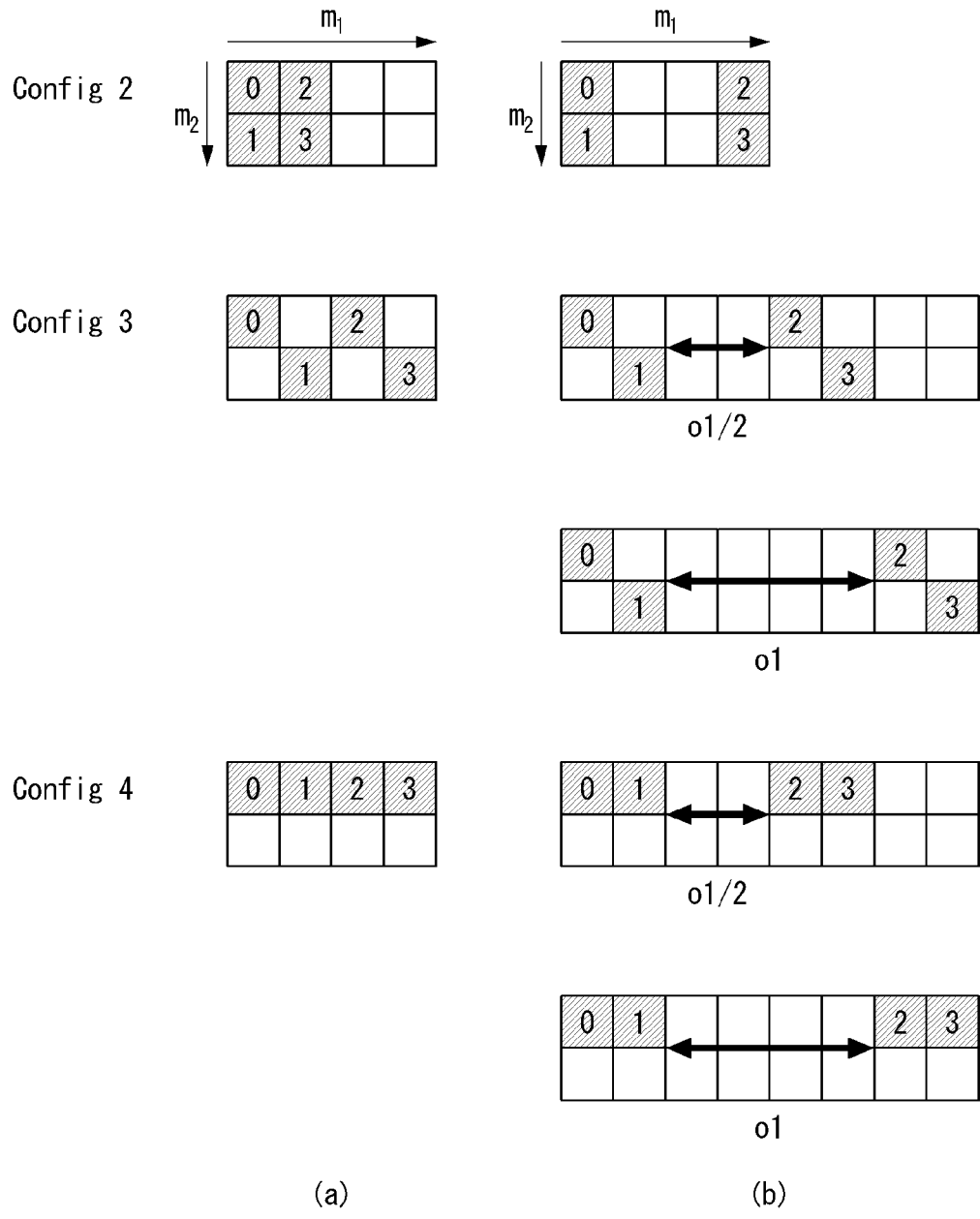
(a)          (b)

[FIG. 17]

[FIG. 18]
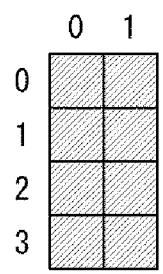
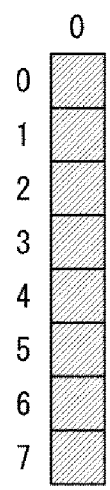

【FIG. 19】

[FIG. 20]
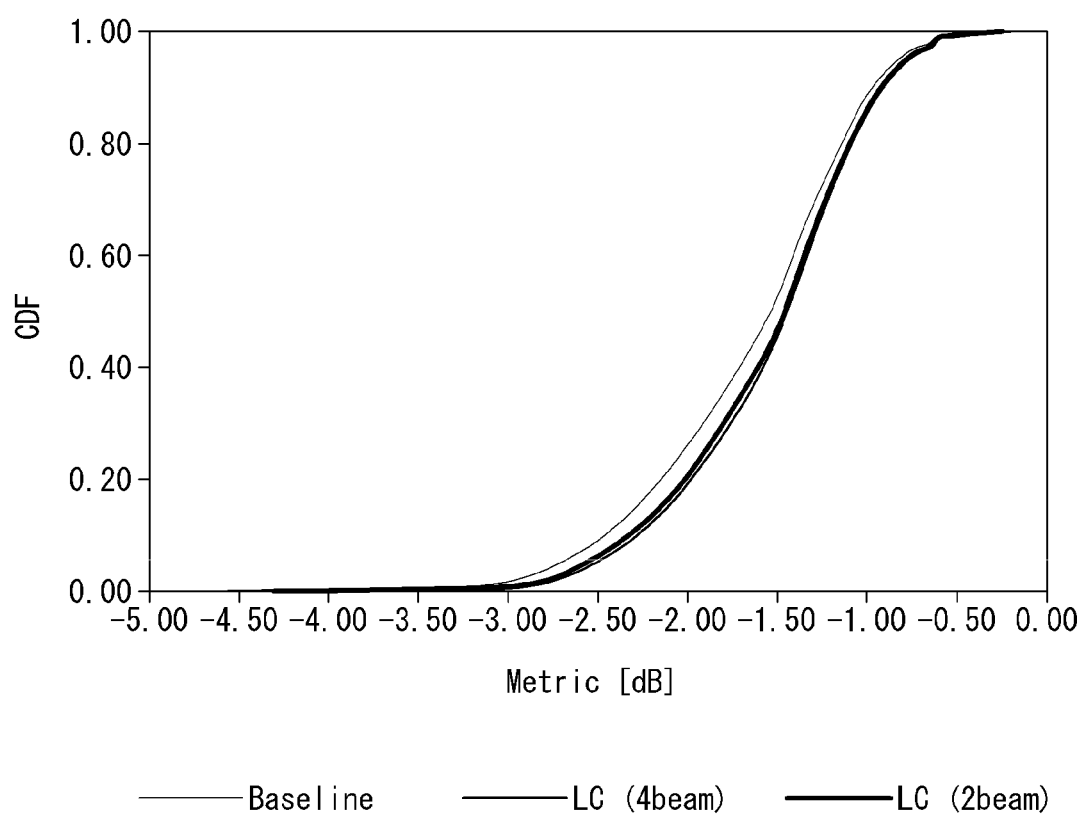

[FIG. 21]
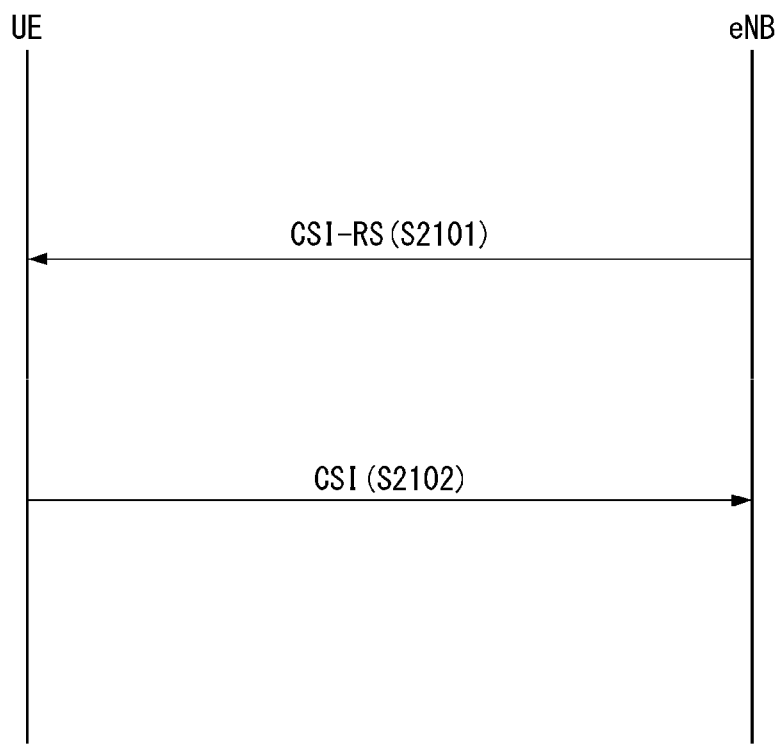
[FIG. 22]
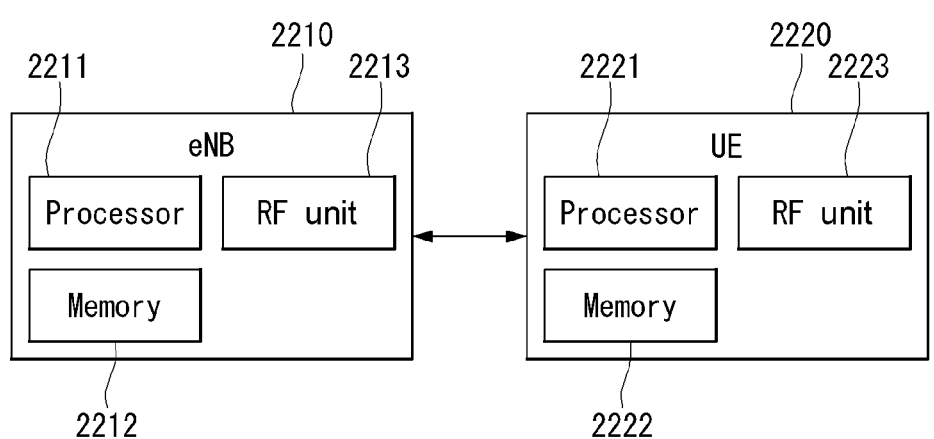

METHOD FOR TRANSMITTING AND RECEIVING CHANNEL STATE INFORMATION IN MULTI-ANTENNA WIRELESS COMMUNICATION SYSTEM, AND APPARATUS THEREFOR

CROSS-REFERENCE TO RELATED APPLICATIONS

This application is the National Phase of PCT International Application No. PCT/KR2017/004879, filed on May 11, 2017, which claims priority under 35 U.S.C. 119(e) to U.S. Provisional Application No. 62/335,053, filed on May 11, 2016, U.S. Provisional Application No. 62/371,835, filed on Aug. 7, 2016, U.S. Provisional Application No. 62/376,471, filed on Aug. 18, 2016, U.S. Provisional Application No. 62/401,919, filed on Sep. 30, 2016, U.S. Provisional Application No. 62/420,542, filed on Nov. 10, 2016, and to U.S. Provisional Application No. 62/422,581, filed on Nov. 15, 2016, all of which are hereby expressly incorporated by reference into the present application.

TECHNICAL FIELD

The present invention relates to a wireless communication system and, more particularly, to a method of transmitting and receiving channel state information in a wireless communication system supporting a multi-antenna system (specifically, a 2-dimensional active antenna system (2D AAS)) and an apparatus supporting the same.

BACKGROUND ART

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed services, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive Multiple Input Multiple Output (MIMO), in-band full duplex, non-orthogonal multiple access (NOMA), supporting super-wide band, and device networking, have been researched.

DISCLOSURE

Technical Problem

An object of the present invention proposes a method of transmitting and receiving channel state information in a wireless communication system supporting a multi-antenna system (e.g., a 2D AAS or a 3-dimensional multi-input multi-output (3D-MIMO) system including massive antenna ports).

An object of the present invention proposes a method of designing a codebook for multi-user (MU) performance improvement in a wireless communication system supporting a multi-antenna system.

Technical objects to be achieved by the present invention are not limited to the aforementioned technical objects, and other technical objects not described above may be evidently understood by a person having ordinary skill in the art to which the present invention pertains from the following description.

Technical Solution

In an aspect of the present invention, a method for a user equipment (UE) to report channel state information in a 2-dimensional multi-antenna wireless communication system includes receiving a channel state information reference signal (CSI-RS) from a base station through a multi-antenna port and reporting channel state information to the base station. A plurality of codewords used to generate a precoding matrix selected by the UE in a codebook for the reporting of the channel state information may be specified by the channel state information, and the precoding matrix may be generated based on a linear combination of the plurality of codewords to which a power coefficient has been applied after the power coefficient is applied to each of the plurality of codewords.

In another aspect of the present invention, a user equipment (UE) reporting channel state information in a 2-dimensional multi-antenna wireless communication system includes a radio frequency (RF) unit for transmitting and receiving radio signals and a processor controlling the RF unit. The processor may be configured to receive a channel state information reference signal (CSI-RS) from a base station through a multi-antenna port and to report channel state information to the base station, a plurality of codewords used to generate a precoding matrix selected by the UE in a codebook for the reporting of the channel state information may be specified by the channel state information, and the precoding matrix may be generated based on a linear combination of the plurality of codewords to which a power coefficient has been applied after the power coefficient is applied to each of the plurality of codewords.

Preferably, the plurality of codewords may include a first codeword and a second codeword, a first power coefficient applied to the first codeword may be previously determined to be 1, and a second power coefficient applied to the second codeword may be determined to be a value relative to the first power coefficient based on the channel state information.

Preferably, a value available as the power coefficient may be equally divided and configured between a specific upper limit and a specific lower limit. One or more of the upper limit and the lower limit, the number of values available as the power coefficient, and the number of bits necessary to report the power coefficient may be received as information for determining the value available as the power coefficient from the base station through higher layer signaling.

Preferably, after the power coefficient and a phase coefficient are applied to each of the plurality of codewords, the precoding matrix may be generated based on the linear combination of the plurality of codewords to which the power coefficient and the phase coefficient have been applied.

Preferably, a value available as the phase coefficient may be equally divided and configured between a specific upper limit and a specific lower limit. One or more of the upper limit and the lower limit, the number of values available as the phase coefficient, and the number of bits necessary to report the phase coefficient may be received as information for determining the value available as the phase coefficient from the base station through higher layer signaling.

Preferably, the number of codewords used for the linear combination may be restricted to 2.

Preferably, the number of codewords used for the linear combination may be received from the base station through higher layer signaling.

Preferably, information indicating whether a codebook including the precoding matrix generated by the linear combination is used may be received from the base station through higher layer signaling.

Preferably, a codebook including the precoding matrix generated by the linear combination may be used for only channel state information reporting of ranks 1 and 2.

Preferably, the codewords used for the linear combination may be orthogonal.

Preferably, a codeword available for the linear combination may be restricted by a bitmap including a bit corresponding to each of all of predefined codewords or codewords belonging to a codeword set, and the bitmap may be received from the base station through higher layer signaling.

Preferably, an indicator indicating whether a codebook including the precoding matrix generated by the linear combination is used for each rank may be received from the base station.

Preferably, a power coefficient available for the linear combination may be restricted by a bitmap including a bit corresponding to each of all of predefined power coefficients.

Preferably, the codewords used for a linear combination may be orthogonal.

Preferably, a codeword available for the linear combination may be restricted by a bitmap including a bit corresponding to each of all of predefined codewords or codewords belonging to a codeword set, and the bitmap may be received from the base station through higher layer signaling.

Preferably, an indicator indicating whether a codebook including the precoding matrix generated by the linear combination is used for each rank may be received from the base station.

Preferably, a power coefficient available for the linear combination may be restricted by a bitmap including a bit corresponding to each of all of predefined power coefficients.

Advantageous Effects

In accordance with an embodiment of the present invention, performance of MU transmission in a wireless communication system supporting a multi-antenna system can be improved.

In accordance with an embodiment of the present invention, a finer beam can be generated by more accurately reflecting a multipath channel between a UE and a base station in a wireless communication system supporting a multi-antenna system.

Feedback overhead of channel state information in a wireless communication system supporting a multi-antenna system according to an embodiment of the present invention can be reduced.

Effects which may be obtained by the present invention are not limited to the aforementioned effects, and other technical effects not described above may be evidently understood by a person having ordinary skill in the art to which the present invention pertains from the following description.

DESCRIPTION OF DRAWINGS

The accompanying drawings, which are included herein as a part of the description for help understanding the present invention, provide embodiments of the present invention, and describe the technical features of the present invention with the description below.

FIG. 1 illustrates the structure of a radio frame in a wireless communication system to which the present invention may be applied.

FIG. 2 is a diagram illustrating a resource grid for a downlink slot in a wireless communication system to which the present invention may be applied.

FIG. 3 illustrates a structure of downlink subframe in a wireless communication system to which the present invention may be applied.

FIG. 4 illustrates a structure of uplink subframe in a wireless communication system to which the present invention may be applied.

FIG. 5 shows the configuration of a known MIMO communication system.

FIG. 6 is a diagram showing a channel from a plurality of transmission antennas to a single reception antenna.

FIG. 7 is a diagram for describing a basic concept of a codebook-based precoding in a wireless communication system to which the present invention may be applied.

FIG. 8 illustrates reference signal patterns mapped to downlink resource block pairs in a wireless communication system to which the present invention may be applied.

FIG. 9 is a diagram illustrating resources to which reference signals are mapped in a wireless communication system to which the present invention may be applied.

FIG. 10 illustrates a 2D-AAS having 64 antenna elements in a wireless communication system to which the present invention may be applied.

FIG. 11 illustrates a system in which an eNB or UE has a plurality of transmission/reception antennas capable of forming a 3-Dimension (3D) beam based on the AAS in a wireless communication system to which the present invention may be applied.

FIG. 12 illustrates a 2D antenna system having cross-polarizations in a wireless communication system to which the present invention may be applied.

FIG. 13 illustrates a transceiver unit model in a wireless communication system to which the present invention may be applied.

FIG. 14 is a diagram illustrating the configurations of a codebook in a wireless communication system to which the present invention may be applied.

FIG. 15 illustrates the relation between the number of antenna ports and a beam width in a wireless communication system to which the present invention may be applied.

FIG. 16 is a diagram illustrating a W1 beam group with four beams according to an embodiment of the present invention.

FIG. 17 is a diagram illustrating a W1 beam group with eight beams according to an embodiment of the present invention.

FIG. 18 is a diagram illustrating a W1 beam group with eight beams according to an embodiment of the present invention.

FIG. 19 is a diagram illustrating a W1 beam group with 16 beams according to an embodiment of the present invention.

FIG. 20 illustrates a graph indicating a codebook gain according to the number of beams participating in a linear combination according to an embodiment of the present invention.

FIG. 21 is a diagram illustrating a method of transmitting and receiving channel state information according to an embodiment of the present invention.

FIG. 22 illustrates a block diagram of a wireless communication apparatus according to an embodiment of the present invention.

MODE FOR INVENTION

Some embodiments of the present invention are described in detail with reference to the accompanying drawings. A detailed description to be disclosed along with the accompanying drawings are intended to describe some embodiments of the present invention and are not intended to describe a sole embodiment of the present invention. The following detailed description includes more details in order to provide full understanding of the present invention. However, those skilled in the art will understand that the present invention may be implemented without such more details.

In some cases, in order to avoid that the concept of the present invention becomes vague, known structures and devices are omitted or may be shown in a block diagram form based on the core functions of each structure and device.

In this specification, a base station has the meaning of a terminal node of a network over which the base station directly communicates with a device. In this document, a specific operation that is described to be performed by a base station may be performed by an upper node of the base station according to circumstances. That is, it is evident that in a network including a plurality of network nodes including a base station, various operations performed for communication with a device may be performed by the base station or other network nodes other than the base station. The base station (BS) may be substituted with another term, such as a fixed station, a Node B, an eNB (evolved-NodeB), a Base Transceiver System (BTS), or an access point (AP). Furthermore, the device may be fixed or may have mobility and may be substituted with another term, such as User Equipment (UE), a Mobile Station (MS), a User Terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, or a Device-to-Device (D2D) device.

Hereinafter, downlink (DL) means communication from an eNB to UE, and uplink (UL) means communication from UE to an eNB. In DL, a transmitter may be part of an eNB, and a receiver may be part of UE. In UL, a transmitter may be part of UE, and a receiver may be part of an eNB.

Specific terms used in the following description have been provided to help understanding of the present invention, and the use of such specific terms may be changed in various forms without departing from the technical sprit of the present invention.

The following technologies may be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), and Non-Orthogonal Multiple Access (NOMA). CDMA may be implemented using a radio technology, such as Universal Terrestrial Radio Access (UTRA) or CDMA2000. TDMA may be implemented using a radio technology, such as Global System for Mobile communications (GSM)/General Packet Radio Service (GPRS)/Enhanced Data rates for GSM Evolution (EDGE). OFDMA may be implemented using a radio technology, such as Institute of Electrical and Electronics Engineers (IEEE) 802.11 (Wi-Fi), IEEE 802.16 (WiMAX), IEEE 802.20, or Evolved UTRA (E-UTRA). UTRA is part of a Universal Mobile Telecommunications System (UMTS). 3rd Generation Partnership Project (3GPP) Long Term Evolution (LTE) is part of an Evolved UMTS (E-UMTS) using evolved UMTS Terrestrial Radio Access (E-UTRA), and it adopts OFDMA in downlink and adopts SC-FDMA in uplink. LTE-Advanced (LTE-A) is the evolution of 3GPP LTE.

Embodiments of the present invention may be supported by the standard documents disclosed in at least one of IEEE 802, 3GPP, and 3GPP2, that is, radio access systems. That is, steps or portions that belong to the embodiments of the present invention and that are not described in order to clearly expose the technical spirit of the present invention may be supported by the documents. Furthermore, all terms disclosed in this document may be described by the standard documents.

In order to more clarify a description, 3GPP LTE/LTE-A is chiefly described, but the technical characteristics of the present invention are not limited thereto.

General System to which the Present Invention May be Applied

FIG. 1 shows the structure of a radio frame in a wireless communication system to which an embodiment of the present invention may be applied.

3GPP LTE/LTE-A support a radio frame structure type 1 which may be applicable to Frequency Division Duplex (FDD) and a radio frame structure which may be applicable to Time Division Duplex (TDD).

The size of a radio frame in the time domain is represented as a multiple of a time unit of $T\_s=1/(15000*2048)$. A UL and DL transmission includes the radio frame having a duration of $T\_f=307200*T\_s=10$ ms.

FIG. 1(*a*) exemplifies a radio frame structure type 1. The type 1 radio frame may be applied to both of full duplex FDD and half duplex FDD.

A radio frame includes 10 subframes. A radio frame includes 20 slots of $T\_slot=15360*T\_s=0.5$ ms length, and 0 to 19 indexes are given to each of the slots. One subframe includes consecutive two slots in the time domain, and subframe i includes slot 2i and slot 2i+1. The time required for transmitting a subframe is referred to as a transmission time interval (TTI). For example, the length of the subframe i may be 1 ms and the length of a slot may be 0.5 ms.

A UL transmission and a DL transmission I the FDD are distinguished in the frequency domain. Whereas there is no restriction in the full duplex FDD, a UE may not transmit and receive simultaneously in the half duplex FDD operation.

One slot includes a plurality of Orthogonal Frequency Division Multiplexing (OFDM) symbols in the time domain and includes a plurality of Resource Blocks (RBs) in a frequency domain. In 3GPP LTE, OFDM symbols are used to represent one symbol period because OFDMA is used in downlink. An OFDM symbol may be called one SC-FDMA symbol or symbol period. An RB is a resource allocation unit and includes a plurality of contiguous subcarriers in one slot.

FIG. 1(b) shows frame structure type 2.

A type 2 radio frame includes two half frame of 153600*T_s=5 ms length each. Each half frame includes 5 subframes of 30720*T_s=1 ms length.

In the frame structure type 2 of a TDD system, an uplink-downlink configuration is a rule indicating whether uplink and downlink are allocated (or reserved) to all subframes.

Table 1 shows the uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, in each subframe of the radio frame, 'D' represents a subframe for a DL transmission, 'U' represents a subframe for UL transmission, and 'S' represents a special subframe including three types of fields including a Downlink Pilot Time Slot (DwPTS), a Guard Period (GP), and a Uplink Pilot Time Slot (UpPTS).

A DwPTS is used for an initial cell search, synchronization or channel estimation in a UE. A UpPTS is used for channel estimation in an eNB and for synchronizing a UL transmission synchronization of a UE. A GP is duration for removing interference occurred in a UL owing to multi-path delay of a DL signal between a UL and a DL.

Each subframe i includes slot 2i and slot 2i+1 of T_slot=15360*T_s=0.5 ms.

The UL-DL configuration may be classified into 7 types, and the position and/or the number of a DL subframe, a special subframe and a UL subframe are different for each configuration.

A point of time at which a change is performed from downlink to uplink or a point of time at which a change is performed from uplink to downlink is called a switching point. The periodicity of the switching point means a cycle in which an uplink subframe and a downlink subframe are changed is identically repeated. Both 5 ms and 10 ms are supported in the periodicity of a switching point. If the periodicity of a switching point has a cycle of a 5 ms downlink-uplink switching point, the special subframe S is present in each half frame. If the periodicity of a switching point has a cycle of a 5 ms downlink-uplink switching point, the special subframe S is present in the first half frame only.

In all the configurations, 0 and 5 subframes and a DwPTS are used for only downlink transmission. An UpPTS and a subframe subsequent to a subframe are always used for uplink transmission.

Such uplink-downlink configurations may be known to both an eNB and UE as system information. An eNB may notify UE of a change of the uplink-downlink allocation state of a radio frame by transmitting only the index of uplink-downlink configuration information to the UE whenever the uplink-downlink configuration information is changed. Furthermore, configuration information is kind of downlink control information and may be transmitted through a Physical Downlink Control Channel (PDCCH) like other scheduling information. Configuration information may be transmitted to all UEs within a cell through a broadcast channel as broadcasting information.

Table 2 represents configuration (length of DwPTS/GP/UpPTS) of a special subframe.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

The structure of a radio subframe according to the example of FIG. 1 is just an example, and the number of subcarriers included in a radio frame, the number of slots included in a subframe and the number of OFDM symbols included in a slot may be changed in various manners.

FIG. 2 is a diagram illustrating a resource grid for one downlink slot in a wireless communication system to which an embodiment of the present invention may be applied.

Referring to FIG. 2, one downlink slot includes a plurality of OFDM symbols in a time domain. It is described herein that one downlink slot includes 7 OFDMA symbols and one resource block includes 12 subcarriers for exemplary purposes only, and the present invention is not limited thereto.

Each element on the resource grid is referred to as a resource element, and one resource block (RB) includes 12×7 resource elements. The number of RBs NADL included in a downlink slot depends on a downlink transmission bandwidth.

The structure of an uplink slot may be the same as that of a downlink slot.

FIG. 3 shows the structure of a downlink subframe in a wireless communication system to which an embodiment of the present invention may be applied.

Referring to FIG. 3, a maximum of three OFDM symbols located in a front portion of a first slot of a subframe correspond to a control region in which control channels are allocated, and the remaining OFDM symbols correspond to a data region in which a physical downlink shared channel (PDSCH) is allocated. Downlink control channels used in 3GPP LTE include, for example, a physical control format indicator channel (PCFICH), a physical downlink control channel (PDCCH), and a physical hybrid-ARQ indicator channel (PHICH).

A PCFICH is transmitted in the first OFDM symbol of a subframe and carries information about the number of OFDM symbols (i.e., the size of a control region) which is used to transmit control channels within the subframe. A PHICH is a response channel for uplink and carries an acknowledgement (ACK)/not-acknowledgement (NACK) signal for a Hybrid Automatic Repeat Request (HARQ). Control information transmitted in a PDCCH is called Downlink Control Information (DCI). DCI includes uplink resource allocation information, downlink resource allocation information, or an uplink transmission (Tx) power control command for a specific UE group.

A PDCCH may carry information about the resource allocation and transport format of a downlink shared channel (DL-SCH) (this is also called an "downlink grant"), resource allocation information about an uplink shared channel (UL-SCH) (this is also called a "uplink grant"), paging information on a PCH, system information on a DL-SCH, the resource allocation of a higher layer control message, such as a random access response transmitted on a PDSCH, a set of transmission power control commands for individual UE within specific UE group, and the activation of a Voice over Internet Protocol (VoIP), etc. A plurality of PDCCHs may be transmitted within the control region, and UE may monitor a plurality of PDCCHs. A PDCCH is transmitted on a single Control Channel Element (CCE) or an aggregation of some contiguous CCEs. A CCE is a logical allocation unit that is used to provide a PDCCH with a coding rate according to the state of a radio channel. A CCE corresponds to a plurality of resource element groups. The format of a PDCCH and the number of available bits of a PDCCH are determined by an association relationship between the number of CCEs and a coding rate provided by CCEs.

An eNB determines the format of a PDCCH based on DCI to be transmitted to UE and attaches a Cyclic Redundancy Check (CRC) to control information. A unique identifier (a Radio Network Temporary Identifier (RNTI)) is masked to the CRC depending on the owner or use of a PDCCH. If the PDCCH is a PDCCH for specific UE, an identifier unique to the UE, for example, a Cell-RNTI (C-RNTI) may be masked to the CRC. If the PDCCH is a PDCCH for a paging message, a paging indication identifier, for example, a Paging-RNTI (P-RNTI) may be masked to the CRC. If the PDCCH is a PDCCH for system information, more specifically, a System Information Block (SIB), a system information identifier, for example, a System Information-RNTI (SI-RNTI) may be masked to the CRC. A Random Access-RNTI (RA-RNTI) may be masked to the CRC in order to indicate a random access response which is a response to the transmission of a random access preamble by UE.

FIG. 4 shows the structure of an uplink subframe in a wireless communication system to which an embodiment of the present invention may be applied.

Referring to FIG. 4, the uplink subframe may be divided into a control region and a data region in a frequency domain. A physical uplink control channel (PUCCH) carrying uplink control information is allocated to the control region. A physical uplink shared channel (PUSCH) carrying user data is allocated to the data region. In order to maintain single carrier characteristic, one UE does not send a PUCCH and a PUSCH at the same time.

A Resource Block (RB) pair is allocated to a PUCCH for one UE within a subframe. RBs belonging to an RB pair occupy different subcarriers in each of 2 slots. This is called that an RB pair allocated to a PUCCH is frequency-hopped in a slot boundary.

Multi-Input Multi-Output (MIMO)

A MIMO technology does not use single transmission antenna and single reception antenna that have been commonly used so far, but uses a multi-transmission (Tx) antenna and a multi-reception (Rx) antenna. In other words, the MIMO technology is a technology for increasing a capacity or enhancing performance using multi-input/output antennas in the transmission end or reception end of a wireless communication system. Hereinafter, MIMO is called a "multi-input/output antenna.".

More specifically, the multi-input/output antenna technology does not depend on a single antenna path in order to receive a single total message and completes total data by collecting a plurality of data pieces received through several antennas. As a result, the multi-input/output antenna technology can increase a data transfer rate within a specific system range and can also increase a system range through a specific data transfer rate.

It is expected that an efficient multi-input/output antenna technology will be used because next-generation mobile communication requires a data transfer rate much higher than that of existing mobile communication. In such a situation, the MIMO communication technology is a next-generation mobile communication technology which may be widely used in mobile communication UE and a relay node and has been in the spotlight as a technology which may overcome a limit to the transfer rate of another mobile communication attributable to the expansion of data communication.

Meanwhile, the multi-input/output antenna (MIMO) technology of various transmission efficiency improvement technologies that are being developed has been most in the spotlight as a method capable of significantly improving a communication capacity and transmission/reception performance even without the allocation of additional frequencies or a power increase.

FIG. 5 shows the configuration of a known MIMO communication system.

Referring to FIG. 5, if the number of transmission (Tx) antennas is increased to N_T and the number of reception (Rx) antennas is increased to N_R at the same time, a theoretical channel transmission capacity is increased in proportion to the number of antennas, unlike in the case where a plurality of antennas is used only in a transmitter or a receiver. Accordingly, a transfer rate can be improved, and frequency efficiency can be significantly improved. In this case, a transfer rate according to an increase of a channel transmission capacity may be theoretically increased by a value obtained by multiplying the following rate increment R_i by a maximum transfer rate R_o if one antenna is used.

$$R_i = \min(N_T, N_R) \qquad \text{[Equation 1]}$$

That is, in an MIMO communication system using 4 transmission antennas and 4 reception antennas, for example, a quadruple transfer rate can be obtained theoretically compared to a single antenna system.

Such a multi-input/output antenna technology may be divided into a spatial diversity method for increasing transmission reliability using symbols passing through various channel paths and a spatial multiplexing method for improving a transfer rate by sending a plurality of data symbols at the same time using a plurality of transmission antennas. Furthermore, active research is being recently carried out on a method for properly obtaining the advantages of the two methods by combining the two methods.

Each of the methods is described in more detail below.

First, the spatial diversity method includes a space-time block code-series method and a space-time Trelis code-series method using a diversity gain and a coding gain at the same time. In general, the Trelis code-series method is better in terms of bit error rate improvement performance and the degree of a code generation freedom, whereas the space-time block code-series method has low operational complexity. Such a spatial diversity gain may correspond to an amount corresponding to the product (N_T×N_R) of the number of transmission antennas (N_T) and the number of reception antennas (N_R).

Second, the spatial multiplexing scheme is a method for sending different data streams in transmission antennas. In this case, in a receiver, mutual interference is generated between data transmitted by a transmitter at the same time. The receiver removes the interference using a proper signal processing scheme and receives the data. A noise removal method used in this case may include a Maximum Likelihood Detection (MLD) receiver, a Zero-Forcing (ZF) receiver, a Minimum Mean Square Error (MMSE) receiver, Diagonal-Bell Laboratories Layered Space-Time (D-BLAST), and Vertical-Bell Laboratories Layered Space-Time (V-BLAST). In particular, if a transmission end can be aware of channel information, a Singular Value Decomposition (SVD) method may be used.

Third, there is a method using a combination of a spatial diversity and spatial multiplexing. If only a spatial diversity gain is to be obtained, a performance improvement gain according to an increase of a diversity disparity is gradually saturated. If only a spatial multiplexing gain is used, transmission reliability in a radio channel is deteriorated. Methods for solving the problems and obtaining the two gains have been researched and may include a double space-time transmit diversity (double-STTD) method and a space-time bit interleaved coded modulation (STBICM).

In order to describe a communication method in a multi-input/output antenna system, such as that described above, in more detail, the communication method may be represented as follows through mathematical modeling.

First, as shown in FIG. 5, it is assumed that N_T transmission antennas and NR reception antennas are present.

First, a transmission signal is described below. If the N_T transmission antennas are present as described above, a maximum number of pieces of information which can be transmitted are N_T, which may be represented using the following vector.

$$s=[s_1,s_2,\Lambda,s_{N_T}]^T \quad \text{[Equation 2]}$$

Meanwhile, transmission power may be different in each of pieces of transmission information s_1, s_2, . . . , s_NT. In this case, if pieces of transmission power are P_1, P_2, . . . , P_NT, transmission information having controlled transmission power may be represented using the following vector.

$$s=[\hat{s}_1,\hat{s}_2,\Lambda,\hat{s}_{N_T}]^T=[P_1s_1,P_2s_2,\Lambda,P_{N_T}s_{N_T}]^T \quad \text{[Equation 3]}$$

Furthermore, transmission information having controlled transmission power in the Equation 3 may be represented as follows using the diagonal matrix P of transmission power.

$$\hat{s} = \begin{bmatrix} P_1 & & & 0 \\ & P_2 & & \\ & & O & \\ 0 & & & P_{N_T} \end{bmatrix} \begin{bmatrix} s_1 \\ s_2 \\ M \\ s_{N_T} \end{bmatrix} = Ps \quad \text{[Equation 4]}$$

Meanwhile, the information vector having controlled transmission power in the Equation 4 is multiplied by a weight matrix W, thus forming N_T transmission signals x_1, x_2, . . . , x_NT that are actually transmitted. In this case, the weight matrix functions to properly distribute the transmission information to antennas according to a transport channel condition. The following may be represented using the transmission signals x_1, x_2, . . . , x_NT.

$$x = \begin{bmatrix} x_1 \\ x_2 \\ M \\ x_i \\ M \\ x_{N_T} \end{bmatrix} = \begin{bmatrix} w_{11} & w_{12} & \Lambda & w_{1N_T} \\ w_{21} & w_{22} & \Lambda & w_{2N_T} \\ M & M & O & M \\ w_{i1} & w_{i2} & \Lambda & w_{iN_T} \\ M & M & O & M \\ w_{N_T1} & w_{N_T2} & \Lambda & w_{N_TN_T} \end{bmatrix} \begin{bmatrix} \hat{s}_1 \\ \hat{s}_2 \\ M \\ \hat{s}_j \\ M \\ \hat{s}_{N_T} \end{bmatrix} = W\hat{s} = WPs \quad \text{[Equation 5]}$$

In this case, w_ij denotes weight between an i-th transmission antenna and a j-th transmission information, and W is an expression of a matrix of the weight. Such a matrix W is called a weight matrix or precoding matrix.

Meanwhile, the transmission signal x, such as that described above, may be considered to be used in a case where a spatial diversity is used and a case where spatial multiplexing is used.

If spatial multiplexing is used, all the elements of the information vector s have different values because different signals are multiplexed and transmitted. In contrast, if the spatial diversity is used, all the elements of the information vector s have the same value because the same signals are transmitted through several channel paths.

A method of mixing spatial multiplexing and the spatial diversity may be taken into consideration. In other words, the same signals may be transmitted using the spatial diversity through 3 transmission antennas, for example, and the remaining different signals may be spatially multiplexed and transmitted.

If N_R reception antennas are present, the reception signals y_1, y_2, . . . , y_NR of the respective antennas are represented as follows using a vector y.

$$y=[y_1,y_2,\Lambda,y_{N_R}]^T \quad \text{[Equation 6]}$$

Meanwhile, if channels in a multi-input/output antenna communication system are modeled, the channels may be classified according to transmission/reception antenna indices. A channel passing through a reception antenna i from a transmission antenna j is represented as h_ij. In this case, it is to be noted that in order of the index of h_ij, the index of a reception antenna comes first and the index of a transmission antenna then comes.

Several channels may be grouped and expressed in a vector and matrix form. For example, a vector expression is described below.

FIG. 6 is a diagram showing a channel from a plurality of transmission antennas to a single reception antenna.

As shown in FIG. 6, a channel from a total of N_T transmission antennas to a reception antenna i may be represented as follows.

$$h_i^T = [h_{i1}, h_{i2}, \Lambda, h_{iN_T}]$$ [Equation 7]

Furthermore, if all channels from the N_T transmission antenna to NR reception antennas are represented through a matrix expression, such as Equation 7, they may be represented as follows.

$$H = \begin{bmatrix} h_1^T \\ h_2^T \\ M \\ h_i^T \\ M \\ h_{N_R}^T \end{bmatrix} = \begin{bmatrix} h_{11} & h_{12} & \Lambda & h_{1N_T} \\ h_{21} & h_{22} & \Lambda & h_{2N_T} \\ M & M & O & \\ h_{i1} & h_{i2} & \Lambda & h_{iN_T} \\ M & M & O & \\ h_{N_R1} & h_{N_R2} & \Lambda & h_{N_RN_T} \end{bmatrix}$$ [Equation 8]

Meanwhile, Additive White Gaussian Noise (AWGN) is added to an actual channel after the actual channel experiences the channel matrix H. Accordingly, AWGN, n_1, n_2, . . . , n_NR added to the N_R reception antennas, respectively, are represented using a vector as follows.

$$n = [n_1, n_2, \Lambda, n_{N_R}]^T$$ [Equation 9]

A transmission signal, a reception signal, a channel, and AWGN in a multi-input/output antenna communication system may be represented to have the following relationship through the modeling of the transmission signal, reception signal, channel, and AWGN, such as those described above.

$$y = \begin{bmatrix} y_1 \\ y_2 \\ M \\ y_i \\ M \\ y_{N_R} \end{bmatrix} = \begin{bmatrix} h_{11} & h_{12} & \Lambda & h_{1N_T} \\ h_{21} & h_{22} & \Lambda & h_{2N_T} \\ M & M & O & \\ h_{i1} & h_{i2} & \Lambda & h_{iN_T} \\ M & M & O & \\ h_{N_R1} & h_{N_R2} & \Lambda & h_{N_RN_T} \end{bmatrix} \begin{bmatrix} x_1 \\ x_2 \\ M \\ x_j \\ M \\ x_{N_T} \end{bmatrix} + \begin{bmatrix} n_1 \\ n_2 \\ M \\ n_i \\ M \\ n_{N_R} \end{bmatrix} =$$ [Equation 10]

$$Hx + n$$

Meanwhile, the number of rows and columns of the channel matrix H indicative of the state of channels is determined by the number of transmission/reception antennas. In the channel matrix H, as described above, the number of rows becomes equal to the number of reception antennas N_R, and the number of columns becomes equal to the number of transmission antennas N_T. That is, the channel matrix H becomes an N_R×N_T matrix.

In general, the rank of a matrix is defined as a minimum number of the number of independent rows or columns. Accordingly, the rank of the matrix is not greater than the number of rows or columns. As for figural style, for example, the rank H of the channel matrix H is limited as follows.

$$\text{rank}(H) \leq \min(N_T, N_R)$$ [Equation 11]

Furthermore, if a matrix is subjected to Eigen value decomposition, a rank may be defined as the number of Eigen values that belong to Eigen values and that are not 0. Likewise, if a rank is subjected to Singular Value Decomposition (SVD), it may be defined as the number of singular values other than 0. Accordingly, the physical meaning of a rank in a channel matrix may be said to be a maximum number on which different information may be transmitted in a given channel.

In this specification, a "rank" for MIMO transmission indicates the number of paths through which signals may be independently transmitted at a specific point of time and a specific frequency resource. The "number of layers" indicates the number of signal streams transmitted through each path. In general, a rank has the same meaning as the number of layers unless otherwise described because a transmission end sends the number of layers corresponding to the number of ranks used in signal transmission.

Hereinafter, in relation to the MIMO transport techniques described above, a codebook-based precoding technique will be described in detail.

FIG. 7 is a diagram for describing a basic concept of a codebook-based precoding in a wireless communication system to which the present invention may be applied.

According to the codebook-based precoding technique, a transmitting-end and a receiving end share codebook information that includes a predetermined number of precoding matrixes according to a transmission rank, the number of antennas, and so on.

That is, in the case that feedback information is finite, the precoding-based codebook technique may be used.

A receiving-end may measure a channel state through a receiving signal, and may feedback a finite number of preferred matrix information (i.e., index of the corresponding precoding matrix) based on the codebook information described above. For example, a receiving-end may measure a signal in Maximum Likelihood (ML) or Minimum Mean Square Error (MMSE) technique, and may select an optimal precoding matrix.

FIG. 7 shows that a receiving-end transmits the precoding matrix information for each codeword to a transmitting-end, but the present invention is not limited thereto.

The transmitting-end that receives the feedback information from the receiving-end may select a specific precoding matrix from the codebook based on the received information. The transmitting-end that selects the precoding matrix may perform precoding in a manner of multiplying layer signals, of which number amounts to a transmission rank, by the selected precoding matrix and may transmit the precoded transmission signal via a plurality of antennas. The number of rows in a precoding matrix is equal to the number of antennas, while the number of columns is equal to a rank value. Since the rank value is equal to the number of layers, the number of the columns is equal to the number of the layers. For instance, when the number of transmitting antennas and the number of layers are 4 and 2, respectively, a precoding matrix may include 4×2 matrix. Equation 12 below represents an operation of mapping information mapped to each layer to a respective antenna through the precoding matrix in the case.

$$\begin{bmatrix} y_1 \\ y_2 \\ y_3 \\ y_4 \end{bmatrix} = \begin{bmatrix} p_{11} & y_1 \\ p_{12} & y_1 \\ p_{13} & y_1 \\ p_{14} & y_1 \end{bmatrix} \cdot \begin{bmatrix} x_1 \\ x_2 \end{bmatrix}$$ [Equation 12]

Referring to Equation 12, information mapped to a layer includes x1 and x2 and each element $p_{ij}$ of 4×2 matrix is a weight used for precoding. $y_1$, $y_2$, $y_3$ and $y_4$ indicate information mapped to antennas and may be transmitted via corresponding antennas by OFDM transmission schemes, respectively.

The receiving-end that receives the signal precoded and transmitted in the transmitting-end may reconstruct the received signal by performing inverse processing of the precoding performed in the transmitting-end. Generally, since a precoding matrix satisfies such a unitary matrix (U) condition as 'U*U$^H$=I' (herein, UAH means an Hermit matrix of matrix U), the above-mentioned inverse processing of the precoding may be performed in a manner of multiplying the received signal by Hermit matrix P$^H$ of the precoding matrix P used for the precoding performed by the transmitting-end.

In addition, since the precoding is requested to have good performance for antenna configurations of various types, it may be necessary to consider performance for various antenna configurations in codebook design. In the following description, an exemplary configuration of multiple antennas is explained.

In the conventional 3GPP LTE system (e.g., system according to 3GPP LTE Release-8 or Release-9 Standard), since maximum four transmission antennas are supported in DL, a codebook for four transmission antennas is designed. In the 3GPP LTE-A system evolved from the conventional 3GPP LTE system, maximum eight transmission antennas may be supported in DL. Accordingly, it may be necessary to design a precoding codebook that provides good performance for a DL transmission via maximum eight transmission antennas.

Moreover, when a codebook is designed, generally required are constant modulus property, finite alphabet, restriction on a codebook size, nested property, and providing good performance for various antenna configurations.

The constant modulus property means a property that amplitude of each channel component of a precoding matrix configuring a codebook is constant. According to this property, no matter what kind of a precoding matrix is used, power levels transmitted from all antennas may be maintained equal to each other. Hence, it may be able to raise efficiency in using a power amplifier.

The finite alphabet means to configure precoding matrixes using quadrature phase shift keying (QPSK) alphabet (i.e., ±1, ±j) only except a scaling factor in the case of two transmitting antennas, for example. Accordingly, when multiplication is performed on a precoding matrix by a precoder, it may alleviate the complexity of calculation.

The codebook size may be restricted as a predetermined size or smaller. Since a size of a codebook increases, precoding matrixes for various cases may be included in the codebook, and accordingly, a channel status may be more accurately reflected. However, the number of bits of a precoding matrix indicator (PMI) correspondingly increases to cause signaling overhead.

The nested property means that a portion of a high rank precoding matrix is configured with a low rank precoding matrix. Thus, when the corresponding precoding matrix is configured, an appropriate performance may be guaranteed even in the case that a BS determines to perform a DL transmission of a transmission rank lower than a channel rank indicated by a rank indicator (RI) reported from a UE. In addition, according to this property, complexity of channel quality information (CQI) calculation may be reduced. This is because calculation for a precoding matrix selection may be shared in part when an operation of selecting a precoding matrix from precoding matrixes designed for different ranks is performed.

Providing good performance for various antenna configurations may mean that providing performance over a predetermined level is required for various cases including a low correlated antenna configuration, a high correlated antenna configuration, a cross-polarized antenna configuration and the like.

Reference Signal (RS)

In a wireless communication system, a signal may be distorted during transmission because data is transmitted through a radio channel. In order for a reception end to accurately receive a distorted signal, the distortion of a received signal needs to be corrected using channel information. In order to detect channel information, a method of detecting channel information using the degree of the distortion of a signal transmission method and a signal known to both the transmission side and the reception side when they are transmitted through a channel is chiefly used. The aforementioned signal is called a pilot signal or reference signal (RS).

Furthermore recently, when most of mobile communication systems transmit a packet, they use a method capable of improving transmission/reception data efficiency by adopting multiple transmission antennas and multiple reception antennas instead of using one transmission antenna and one reception antenna used so far. When data is transmitted and received using multiple input/output antennas, a channel state between the transmission antenna and the reception antenna must be detected in order to accurately receive the signal. Accordingly, each transmission antenna must have an individual reference signal.

In a mobile communication system, an RS may be basically divided into two types depending on its object. There are an RS having an object of obtaining channel state information and an RS used for data demodulation. The former has an object of obtaining, by a UE, to obtain channel state information in the downlink. Accordingly, a corresponding RS must be transmitted in a wideband, and a UE must be capable of receiving and measuring the RS although the UE does not receive downlink data in a specific subframe. Furthermore, the former is also used for radio resources management (RRM) measurement, such as handover. The latter is an RS transmitted along with corresponding resources when an eNB transmits the downlink. A UE may perform channel estimation by receiving a corresponding RS and thus may demodulate data. The corresponding RS must be transmitted in a region in which data is transmitted.

A downlink RS includes one common RS (CRS) for the acquisition of information about a channel state shared by all of UEs within a cell and measurement, such as handover, and a dedicated RS (DRS) used for data demodulation for only a specific UE. Information for demodulation and channel measurement can be provided using such RSs. That is, the DRS is used for only data demodulation, and the CRS is used for the two objects of channel information acquisition and data demodulation.

The reception side (i.e., UE) measures a channel state based on a CRS and feeds an indicator related to channel quality, such as a channel quality indicator (CQI), a precoding matrix index (PMI) and/or a rank indicator (RI), back to the transmission side (i.e., an eNB). The CRS is also called a cell-specific RS. In contrast, a reference signal related to the feedback of channel state information (CSI) may be defined as a CSI-RS.

The DRS may be transmitted through resource elements if data on a PDSCH needs to be demodulated. A UE may receive information about whether a DRS is present through a higher layer, and the DRS is valid only if a corresponding PDSCH has been mapped. The DRS may also be called a UE-specific RS or demodulation RS (DMRS).

FIG. 8 illustrates reference signal patterns mapped to downlink resource block pairs in a wireless communication system to which the present invention may be applied.

Referring to FIG. 8, a downlink resource block pair, that is, a unit in which a reference signal is mapped, may be represented in the form of one subframe in a time domain X 12 subcarriers in a frequency domain. That is, in a time axis (an x axis), one resource block pair has a length of 14 OFDM symbols in the case of a normal cyclic prefix (CP) (FIG. 8a) and has a length of 12 OFDM symbols in the case of an extended cyclic prefix (CP) (FIG. 8b). In the resource block lattice, resource elements (REs) indicated by "0", "1", "2", and "3" mean the locations of the CRSs of antenna port indices "0", "1", "2", and "3", respectively, and REs indicated by "D" mean the location of a DRS.

A CRS is described in more detail below. The CRS is a reference signal which is used to estimate the channel of a physical antenna and may be received by all UEs located within a cell in common. The CRS is distributed to a full frequency bandwidth. That is, the CRS is cell-specific signal and is transmitted every subframe in a wideband. Furthermore, the CRS may be used for channel quality information (CSI) and data demodulation.

A CRS is defined in various formats depending on an antenna array on the transmitting side (eNB). In the 3GPP LTE system (e.g., Release-8), an RS for a maximum four antenna ports is transmitted depending on the number of transmission antennas of an eNB. The side from which a downlink signal is transmitted has three types of antenna arrays, such as a single transmission antenna, two transmission antennas and four transmission antennas. For example, if the number of transmission antennas of an eNB is two, CRSs for a No. 0 antenna port and a No. 1 antenna port are transmitted. If the number of transmission antennas of an eNB is four, CRSs for No. 0~No. 3 antenna ports are transmitted. If the number of transmission antennas of an eNB is four, a CRS pattern in one RB is shown in FIG. 8.

If an eNB uses a single transmission antenna, reference signals for a single antenna port are arrayed.

If an eNB uses two transmission antennas, reference signals for two transmission antenna ports are arrayed using a time division multiplexing (TDM) scheme and/or a frequency division multiplexing (FDM) scheme. That is, different time resources and/or different frequency resources are allocated in order to distinguish between reference signals for two antenna ports.

Furthermore, if an eNB uses four transmission antennas, reference signals for four transmission antenna ports are arrayed using the TDM and/or FDM schemes. Channel information measured by the reception side (i.e., UE) of a downlink signal may be used to demodulate data transmitted using a transmission scheme, such as single transmission antenna transmission, transmission diversity, closed-loop spatial multiplexing, open-loop spatial multiplexing or a multi-user-multi-input/output (MIMO) antenna.

If a multi-input multi-output antenna is supported, when a RS is transmitted by a specific antenna port, the RS is transmitted in the locations of resource elements specified depending on a pattern of the RS and is not transmitted in the locations of resource elements specified for other antenna ports. That is, RSs between different antennas do not overlap.

A DRS is described in more detail below. The DRS is used to demodulate data. In multi-input multi-output antenna transmission, precoding weight used for a specific UE is combined with a transmission channel transmitted by each transmission antenna when the UE receives an RS, and is used to estimate a corresponding channel without any change.

A 3GPP LTE system (e.g., Release-8) supports a maximum of four transmission antennas, and a DRS for rank 1 beamforming is defined. The DRS for rank 1 beamforming also indicates an RS for an antenna port index 5.

In an LTE-A system, that is, an advanced and developed form of the LTE system, the design is necessary to support a maximum of eight transmission antennas in the downlink of an eNB. Accordingly, RSs for the maximum of eight transmission antennas must be also supported. In the LTE system, only downlink RSs for a maximum of four antenna ports has been defined. Accordingly, if an eNB has four to a maximum of eight downlink transmission antennas in the LTE-A system, RSs for these antenna ports must be additionally defined and designed. Regarding the RSs for the maximum of eight transmission antenna ports, the aforementioned RS for channel measurement and the aforementioned RS for data demodulation must be designed.

One of important factors that must be considered in designing an LTE-A system is backward compatibility, that is, that an LTE UE must well operate even in the LTE-A system, which must be supported by the system. From an RS transmission viewpoint, in the time-frequency domain in which a CRS defined in LTE is transmitted in a full band every subframe, RSs for a maximum of eight transmission antenna ports must be additionally defined. In the LTE-A system, if an RS pattern for a maximum of eight transmission antennas is added in a full band every subframe using the same method as the CRS of the existing LTE, RS overhead is excessively increased.

Accordingly, the RS newly designed in the LTE-A system is basically divided into two types, which include an RS having a channel measurement object for the selection of MCS or a PMI (channel state information-RS or channel state indication-RS (CSI-RS)) and an RS for the demodulation of data transmitted through eight transmission antennas (data demodulation-RS (DM-RS)).

The CSI-RS for the channel measurement object is characterized in that it is designed for an object focused on channel measurement unlike the existing CRS used for objects for measurement, such as channel measurement and handover, and for data demodulation. Furthermore, the CSI-RS may also be used for an object for measurement, such as handover. The CSI-RS does not need to be transmitted every subframe unlike the CRS because it is transmitted for an object of obtaining information about a channel state. In order to reduce overhead of a CSI-RS, the CSI-RS is intermittently transmitted on the time axis.

For data demodulation, a DM-RS is dedicatedly transmitted to a UE scheduled in a corresponding time-frequency domain. That is, a DM-RS for a specific UE is transmitted only in a region in which the corresponding UE has been scheduled, that is, in the time-frequency domain in which data is received.

In the LTE-A system, a maximum of eight transmission antennas are supported in the downlink of an eNB. In the LTE-A system, if RSs for a maximum of eight transmission antennas are transmitted in a full band every subframe using the same method as the CRS in the existing LTE, RS overhead is excessively increased. Accordingly, in the LTE-A system, an RS has been separated into the CSI-RS of the CSI measurement object for the selection of MCS or a PMI and the DM-RS for data demodulation, and thus the two RSs have been added. The CSI-RS may also be used for an object, such as RRM measurement, but has been designed for a main object for the acquisition of CSI. The CSI-RS does not need to be transmitted every subframe because it is not used for data demodulation. Accordingly, in order to reduce overhead of the CSI-RS, the CSI-RS is intermittently transmitted on the time axis. That is, the CSI-RS has a period corresponding to a multiple of the integer of one subframe and may be periodically transmitted or transmitted in a specific transmission pattern. In this case, the period or pattern in which the CSI-RS is transmitted may be set by an eNB.

For data demodulation, a DM-RS is dedicatedly transmitted to a UE scheduled in a corresponding time-frequency domain. That is, a DM-RS for a specific UE is transmitted only in the region in which scheduling is performed for the corresponding UE, that is, only in the time-frequency domain in which data is received.

In order to measure a CSI-RS, a UE must be aware of information about the transmission subframe index of the CSI-RS for each CSI-RS antenna port of a cell to which the UE belongs, the location of a CSI-RS resource element (RE) time-frequency within a transmission subframe, and a CSI-RS sequence.

In the LTE-A system, an eNB has to transmit a CSI-RS for each of a maximum of eight antenna ports. Resources used for the CSI-RS transmission of different antenna ports must be orthogonal. When one eNB transmits CSI-RSs for different antenna ports, it may orthogonally allocate the resources according to the FDM/TDM scheme by mapping the CSI-RSs for the respective antenna ports to different REs. Alternatively, the CSI-RSs for different antenna ports may be transmitted according to the CDM scheme for mapping the CSI-RSs to pieces of code orthogonal to each other.

When an eNB notifies a UE belonging to the eNB of information on a CSI-RS, first, the eNB must notify the UE of information about a time-frequency in which a CSI-RS for each antenna port is mapped. Specifically, the information includes subframe numbers in which the CSI-RS is transmitted or a period in which the CSI-RS is transmitted, a subframe offset in which the CSI-RS is transmitted, an OFDM symbol number in which the CSI-RS RE of a specific antenna is transmitted, frequency spacing, and the offset or shift value of an RE in the frequency axis.

A CSI-RS is transmitted through one, two, four or eight antenna ports. Antenna ports used in this case are p=15, p=15, 16, p=15, ..., 18, and p=15, ..., 22, respectively. A CSI-RS may be defined for only a subcarrier spacing $\Delta f = 15$ kHz.

In a subframe configured for CSI-RS transmission, a CSI-RS sequence is mapped to a complex-valued modulation symbol a_k,l^(p) used as a reference symbol on each antenna port p as in Equation 13.

$$a_{k,l}^{(p)} = w_{l''} \cdot r_{l,n_s}(m')$$ [Equation 13]

$$k = k' + 12m + \begin{cases} -0 & \text{for } p \in \{15,16\}, \quad \text{normal cyclic prefix} \\ -6 & \text{for } p \in \{17,18\}, \quad \text{normal cyclic prefix} \\ -1 & \text{for } p \in \{19,20\}, \quad \text{normal cyclic prefix} \\ -7 & \text{for } p \in \{21,22\}, \quad \text{normal cyclic prefix} \\ -0 & \text{for } p \in \{15,16\}, \quad \text{normal cyclic prefix} \\ -3 & \text{for } p \in \{17,18\}, \quad \text{extended cyclic prefix} \\ -6 & \text{for } p \in \{19,20\}, \quad \text{extended cyclic prefix} \\ -9 & \text{for } p \in \{21,22\}, \quad \text{extended cyclic prefix} \end{cases}$$

$$l = l' + \begin{cases} l'' & \text{CSI reference signal configurations 0-19,} \quad \text{normal cyclic prefix} \\ 2l'' & \text{CSI reference signal configurations 20-31,} \quad \text{normal cyclic prefix} \\ l'' & \text{CSI reference signal configurations 0-27,} \quad \text{extended cyclic prefix} \end{cases}$$

$$w_{l''} = \begin{cases} 1 & p \in \{15,17,19,21\} \\ (-1)^{l''} & p \in \{16,18,20,22\} \end{cases}$$

$$l'' = 0,1$$
$$m = 0,1,\ldots, N_{RB}^{DL} - 1$$
$$m' = m + \left\lfloor \frac{N_{RB}^{max,DL} - N_{RB}^{DL}}{2} \right\rfloor$$

In Equation 13, (k',l') (wherein k' is a subcarrier index within a resource block and l' indicates an OFDM symbol index within a slot.) and the condition of n_s is determined depending on a CSI-RS configuration, such as Table 3 or Table 4.

Table 3 illustrates the mapping of (k',l') from a CSI-RS configuration in a normal CP.

TABLE 3

| CSI reference signal con-figuration | Number of CSI reference signals configured | | | | | |
|---|---|---|---|---|---|---|
| | 1 or 2 | | 4 | | 8 | |
| | (k', l') | n_s mod 2 | (k', l') | n_s mod 2 | (k', l') | n_s mod 2 |
| Frame structure type 1 and 2 | | | | | | |
| 0 | (9, 5) | 0 | (9, 5) | 0 | (9, 5) | 0 |
| 1 | (11, 2) | 1 | (11, 2) | 1 | (11, 2) | 1 |
| 2 | (9, 2) | 1 | (9, 2) | 1 | (9, 2) | 1 |
| 3 | (7, 2) | 1 | (7, 2) | 1 | (7, 2) | 1 |
| 4 | (9, 5) | 1 | (9, 5) | 1 | (9, 5) | 1 |
| 5 | (8, 5) | 0 | (8, 5) | 0 | | |

TABLE 3-continued

| CSI reference signal con-figuration | 1 or 2 | | 4 | | 8 | |
|---|---|---|---|---|---|---|
| | (k', l') | $n_s$ mod 2 | (k', l') | $n_s$ mod 2 | (k', l') | $n_s$ mod 2 |
| 6 | (10, 2) | 1 | (10, 2) | 1 | | |
| 7 | (8, 2) | 1 | (8, 2) | 1 | | |
| 8 | (6, 2) | 1 | (6, 2) | 1 | | |
| 9 | (8, 5) | 1 | (8, 5) | 1 | | |
| 10 | (3, 5) | 0 | | | | |
| 11 | (2, 5) | 0 | | | | |
| 12 | (5, 2) | 1 | | | | |
| 13 | (4, 2) | 1 | | | | |
| 14 | (3, 2) | 1 | | | | |
| 15 | (2, 2) | 1 | | | | |
| 16 | (1, 2) | 1 | | | | |
| 17 | (0, 2) | 1 | | | | |
| 18 | (3, 5) | 1 | | | | |
| 19 | (2, 5) | 1 | | | | |
| Frame 20 | (11, 1) | 1 | (11, 1) | 1 | (11, 1) | 1 |
| 21 | (9, 1) | 1 | (9, 1) | 1 | (9, 1) | 1 |
| 22 | (7, 1) | 1 | (7, 1) | 1 | | 1 |
| 23 | (10, 1) | 1 | (10, 1) | 1 | | |
| 24 | (8, 1) | 1 | (8, 1) | 1 | | |
| 25 | (6, 1) | 1 | (6, 1) | 1 | | |
| 26 | (5, 1) | 1 | | | | |
| 27 | (4, 1) | 1 | | | | |
| 28 | (3, 1) | 1 | | | | |
| 29 | (2, 1) | 1 | | | | |
| 30 | (1, 1) | 1 | | | | |
| 31 | (0, 1) | 1 | | | | |

Table 4 illustrates the mapping of (k',l') from a CSI-RS configuration in an extended CP.

TABLE 4

| | CSI reference signal con-figuration | 1 or 2 | | 4 | | 8 | |
|---|---|---|---|---|---|---|---|
| | | (k', l') | $n_s$ mod 2 | (k', l') | $n_s$ mod 2 | (k', l') | $n_s$ mod 2 |
| Frame structure type 1 and 2 | 0 | (11, 4) | 0 | (11, 4) | 0 | (11, 4) | 0 |
| | 1 | (9, 4) | 0 | (9, 4) | 0 | (9, 4) | 0 |
| | 2 | (10, 4) | 1 | (10, 4) | 1 | (10, 4) | 1 |
| | 3 | (9, 4) | 1 | (9, 4) | 1 | (9, 4) | 1 |
| | 4 | (5, 4) | 0 | (5, 4) | 0 | | |
| | 5 | (3, 4) | 0 | (3, 4) | 0 | | |
| | 6 | (4, 4) | 1 | (4, 4) | 1 | | |
| | 7 | (3, 4) | 1 | (3, 4) | 1 | | |
| | 8 | (8, 4) | 0 | | | | |
| | 9 | (6, 4) | 0 | | | | |
| | 10 | (2, 4) | 0 | | | | |
| | 11 | (0, 4) | 0 | | | | |
| | 12 | (7, 4) | 1 | | | | |
| | 13 | (6, 4) | 1 | | | | |
| | 14 | (1, 4) | 1 | | | | |
| | 15 | (0, 4) | 1 | | | | |
| Frame structure type 2 only | 16 | (11, 1) | 1 | (11, 1) | 1 | (11, 1) | 1 |
| | 17 | (10, 1) | 1 | (10, 1) | 1 | (10, 1) | 1 |
| | 18 | (9, 1) | 1 | (9, 1) | 1 | (9, 1) | 1 |
| | 19 | (5, 1) | 1 | (5, 1) | 1 | | |
| | 20 | (4, 1) | 1 | (4, 1) | 1 | | |
| | 21 | (3, 1) | 1 | (3, 1) | 1 | | |
| | 22 | (8, 1) | 1 | | | | |
| | 23 | (7, 1) | 1 | | | | |
| | 24 | (6, 1) | 1 | | | | |
| | 25 | (2, 1) | 1 | | | | |
| | 26 | (1, 1) | 1 | | | | |
| | 27 | (0, 1) | 1 | | | | |

Referring to Table 3 and Table 4, in the transmission of a CSI-RS, in order to reduce inter-cell interference (ICI) in a multi-cell environment including a heterogeneous network (HetNet) environment, a maximum of 32 different configurations (in the case of a normal CP) or a maximum of 28 different configurations (in the case of an extended CP) are defined.

The CSI-RS configuration is different depending on the number of antenna ports and a CP within a cell, and a neighboring cell may have a maximum of different configurations. Furthermore, the CSI-RS configuration may be divided into a case where it is applied to both an FDD frame and a TDD frame and a case where it is applied to only a TDD frame depending on a frame structure.

(k',l') and n_s are determined depending on a CSI-RS configuration based on Table 3 and Table 4, and time-frequency resources used for CSI-RS transmission are determined depending on each CSI-RS antenna port.

FIG. 9 is a diagram illustrating resources to which reference signals are mapped in a wireless communication system to which the present invention may be applied.

FIG. 9(a) shows twenty types of CSI-RS configurations available for CSI-RS transmission by one or two CSI-RS antenna ports, FIG. 9(b) shows ten types of CSI-RS configurations available for four CSI-RS antenna ports, and FIG. 9(c) shows five types of CSI-RS configurations available for eight CSI-RS antenna ports.

As described above, radio resources (i.e., an RE pair) in which a CSI-RS is transmitted are determined depending on each CSI-RS configuration.

If one or two antenna ports are configured for CSI-RS transmission with respect to a specific cell, the CSI-RS is transmitted on radio resources on a configured CSI-RS configuration of the twenty types of CSI-RS configurations shown in FIG. 9(a).

Likewise, when four antenna ports are configured for CSI-RS transmission with respect to a specific cell, a CSI-RS is transmitted on radio resources on a configured CSI-RS configuration of the ten types of CSI-RS configurations shown in FIG. 9(b). Furthermore, when eight antenna ports are configured for CSI-RS transmission with respect to a specific cell, a CSI-RS is transmitted on radio resources on a configured CSI-RS configuration of the five types of CSI-RS configurations shown in FIG. 9(c).

A CSI-RS for each antenna port is subjected to CDM for every two antenna ports (i.e., {15,16}, {17,18}, {19,20} and {21,22}) on the same radio resources and transmitted. For example, in the case of antenna ports 15 and 16, CSI-RS complex symbols for the respective antenna ports 15 and 16 are the same, but are multiplied by different types of orthogonal code (e.g., Walsh code) and mapped to the same radio resources. The complex symbol of the CSI-RS for the antenna port 15 is multiplied by [1, 1], and the complex symbol of the CSI-RS for the antenna port 16 is multiplied by [1 −1] and mapped to the same radio resources. The same is true of the antenna ports {17,18}, {19,20} and {21,22}.

A UE may detect a CSI-RS for a specific antenna port by multiplying code by which a transmitted symbol has been multiplied. That is, a transmitted symbol is multiplied by the code [1 1] multiplied in order to detect the CSI-RS for the antenna port 15, and a transmitted symbol is multiplied by the code [1 −1] multiplied in order to detect the CSI-RS for the antenna port 16.

Referring to FIGS. 9(a) to 9(c), in the case of the same CSI-RS configuration index, radio resources according to a CSI-RS configuration having a large number of antenna ports include radio resources having a small number of CSI-RS antenna ports. For example, in the case of a CSI-RS configuration 0, radio resources for the number of eight antenna ports include both radio resources for the number of four antenna ports and radio resources for the number of one or two antenna ports.

A plurality of CSI-RS configurations may be used in one cell. 0 or one CSI-RS configuration may be used for a non-zero power (NZP) CSI-RS, and 0 or several CSI-RS configurations may be used for a zero power (ZP) CSI-RS.

For each bit set to 1 in a zeropower (ZP) CSI-RS ('ZeroPowerCSI-RS') that is a bitmap of 16 bits configured by a high layer, a UE assumes zero transmission power in REs (except a case where an RE overlaps an RE assuming a NZP CSI-RS configured by a high layer) corresponding to the four CSI-RS columns of Table 3 and Table 4. The most significant bit (MSB) corresponds to the lowest CSI-RS configuration index, and next bits in the bitmap sequentially correspond to next CSI-RS configuration indices.

A CSI-RS is transmitted only in a downlink slot that satisfies the condition of (n_s mod 2) in Table 3 and Table 4 and a subframe that satisfies the CSI-RS subframe configurations.

In the case of the frame structure type 2 (TDD), a CSI-RS is not transmitted in a special subframe, a synchronization signal (SS), a subframe colliding against a PBCH or SystemInformationBlockType1 (SIB 1) Message transmission or a subframe configured to paging message transmission.

Furthermore, an RE in which a CSI-RS for any antenna port belonging to an antenna port set S (S={15}, S={15,16}, S={17,18}, S={19,20} or S={21,22}) is transmitted is not used for the transmission of a PDSCH or for the CSI-RS transmission of another antenna port.

Time-frequency resources used for CSI-RS transmission cannot be used for data transmission. Accordingly, data throughput is reduced as CSI-RS overhead is increased. By considering this, a CSI-RS is not configured to be transmitted every subframe, but is configured to be transmitted in each transmission period corresponding to a plurality of subframes. In this case, CSI-RS transmission overhead can be significantly reduced compared to a case where a CSI-RS is transmitted every subframe.

A subframe period (hereinafter referred to as a "CSI transmission period") T_CSI-RS and a subframe offset Δ_CSI-RS for CSI-RS transmission are shown in Table 5.

Table 5 illustrates CSI-RS subframe configurations.

TABLE 5

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}$ − 5 |
| 15-34 | 20 | $I_{CSI-RS}$ − 15 |
| 35-74 | 40 | $I_{CSI-RS}$ − 35 |
| 75-154 | 80 | $I_{CSI-RS}$ − 75 |

Referring to Table 5, the CSI-RS transmission period T_CSI-RS and the subframe offset Δ_CSI-RS are determined depending on the CSI-RS subframe configuration I_CSI-RS.

The CSI-RS subframe configuration of Table 5 may be configured as one of the aforementioned 'SubframeConfig' field and 'zeroTxPowerSubframeConfig' field. The CSI-RS subframe configuration may be separately configured with respect to an NZP CSI-RS and a ZP CSI-RS.

A subframe including a CSI-RS satisfies Equation 14.

$$(10n_f + \lfloor n_s/2 \rfloor - \Delta_{CSI-RS}) \bmod T_{CSI-RS} = 0 \quad [\text{Equation 14}]$$

In Equation 14, T_CSI-RS means a CSI-RS transmission period, Δ_CSI-RS means a subframe offset value, n_f means a system frame number, and n_s means a slot number.

In the case of a UE in which the transmission mode 9 has been configured with respect to a serving cell, one CSI-RS resource configuration may be configured for the UE. In the case of a UE in which the transmission mode 10 has been configured with respect to a serving cell, one or more CSI-RS resource configuration (s) may be configured for the UE.

In the current LTE standard, a CSI-RS configuration includes an antenna port number (antennaPortsCount), a subframe configuration (subframeConfig), and a resource configuration (resourceConfig). Accordingly, the a CSI-RS configuration provides notification that a CSI-RS is transmitted how many antenna port, provides notification of the period and offset of a subframe in which a CSI-RS will be transmitted, and provides notification that a CSI-RS is transmitted in which RE location (i.e., a frequency and OFDM symbol index) in a corresponding subframe.

Specifically, the following parameters for each CSI-RS (resource) configuration are configured through high layer signaling.

If the transmission mode 10 has been configured, a CSI-RS resource configuration identifier A CSI-RS port number (antennaPortsCount): a parameter (e.g., one CSI-RS port, two CSI-RS ports, four CSI-RS ports or eight CSI-RS ports) indicative of the number of antenna ports used for CSI-RS transmission A CSI-RS configuration (resourceConfig) (refer to Table 3 and Table 4): a parameter regarding a CSI-RS allocation resource location A CSI-RS subframe configuration (subframeConfig, that is, I_CSI-RS) (refer to Table 5): a parameter regarding the period and/or offset of a subframe in which a CSI-RS will be transmitted If the transmission mode 9 has been configured, transmission power P_C for CSI feedback: in relation to the assumption of a UE for reference PDSCH transmission power for feedback, when the UE derives CSI feedback and takes a value within a [−8, 15] dB range in a 1-dB step size, P_C is assumed to be the ratio of energy per resource element (EPRE) per PDSCH RE and a CSI-RS EPRE.

If the transmission mode 10 has been configured, transmission power P_C for CSI feedback with respect to each CSI process. If CSI subframe sets C_CSI,0 and C_CSI,1 are configured by a high layer with respect to a CSI process, P_C is configured for each CSI subframe set in the CSI process.

A pseudo-random sequence generator parameter n_ID

If the transmission mode 10 has been configured, a high layer parameter 'qcl-CRS-Info-r11' including a QCL scrambling identifier for a quasico-located (QCL) type B UE assumption (qcl-ScramblingIdentity-r11), a CRS port count (crs-PortsCount-r11), and an MBSFN subframe configuration list (mbsfn-SubframeConfigList-r11) parameter.

When a CSI feedback value derived by a UE has a value within the [−8, 15] dB range, P_C is assumed to be the ration of PDSCH EPRE to CSI-RS EPRE. In this case, the PDSCH EPRE corresponds to a symbol in which the ratio of PDSCH EPRE to CRS EPRE is $\rho\_A$.

A CSI-RS and a PMCH are not configured in the same subframe of a serving cell at the same time.

In the frame structure type 2, if four CRS antenna ports have been configured, a CSI-RS configuration index belonging to the [20-31] set (refer to Table 3) in the case of a normal CP or a CSI-RS configuration index belonging to the [16-27] set (refer to Table 4) in the case of an extended CP is not configured in a UE.

A UE may assume that the CSI-RS antenna port of a CSI-RS resource configuration has a QCL relation with delay spread, Doppler spread, Doppler shift, an average gain and average delay.

A UE in which the transmission mode 10 and the QCL type B have been configured may assume that antenna ports 0-3 corresponding to a CSI-RS resource configuration and antenna ports 15-22 corresponding to a CSI-RS resource configuration have QCL relation with Doppler spread and Doppler shift.

In the case of a UE in which the transmission modes 1-9 have been configured, one ZP CSI-RS resource configuration may be configured in the UE with respect to a serving cell. In the case of a UE in which the transmission mode 10 has been configured, one or more ZP CSI-RS resource configurations may be configured in the UE with respect to a serving cell.

The following parameters for a ZP CSI-RS resource configuration may be configured through high layer signaling.

The ZP CSI-RS configuration list (zeroTxPowerResourceConfigList) (refer to Table 3 and Table 4): a parameter regarding a zero-power CSI-RS configuration The ZP CSI-RS subframe configuration (eroTxPowerSubframeConfig, that is, I_CSI-RS) (refer to Table 5): a parameter regarding the period and/or offset of a subframe in which a zero-power CSI-RS is transmitted A ZP CSI-RS and a PMCH are not configured in the same subframe of a serving cell at the same time.

In the case of a UE in which the transmission mode 10 has been configured, one or more channel state information—interference measurement (CSI-IM) resource configurations may be configured in the UE with respect to a serving cell.

The following parameters for each CSI-IM resource configuration may be configured through high layer signaling.

The ZP CSI-RS configuration (refer to Table 3 and Table 4)

The ZP CSI RS subframe configuration I_CSI-RS (refer to Table 5)

A CSI-IM resource configuration is the same as any one of configured ZP CSI-RS resource configurations.

A CSI-IM resource and a PMCH are not configured within the same subframe of a serving cell at the same time.

Massive MIMO

A MIMO system having a plurality of antennas may be called a massive MIMO system and has been in the spotlight as means for improving spectrum efficiency, energy efficiency and processing complexity.

In recent 3GPP, in order to satisfy the requirements of spectrum efficiency for a future mobile communication system, a discussion about the massive MIMO system has started. The massive MIMO is also called full-dimension MIMO (FD-MIMO).

In a wireless communication system after LTE Release (Rel)-12, the introduction of an active antenna system (AAS) is considered.

Unlike the existing passive antenna system in which an amplifier and antenna capable of adjusting the phase and size of a signal have been separated, the AAS means a system in which each antenna is configured to include an active element, such as an amplifier.

The AAS does not require a separate cable, connector and other hardware for connecting an amplifier and an antenna because the active antenna is used, and thus has a high efficiency characteristic in terms of energy and operating costs. In particular, the AAS enables an advanced MIMO technology, such as the formation of an accurate beam pattern or 3D beam pattern in which a beam direction and a beam width are considered because the AAS supports each electronic beam control method.

Due to the introduction of an advanced antenna system, such as the AAS, a massive MIMO structure having a plurality of input/output antennas and a multi-dimension antenna structure is also considered. For example, unlike in the existing straight type antenna array, if a two-dimensional (2D) antenna array is formed, a 3D beam pattern can be formed by the active antenna of the AAS.

FIG. 10 illustrates a 2D-AAS having 64 antenna elements in a wireless communication system to which the present invention may be applied.

FIG. 10 illustrates a common 2D antenna array. A case where $N\_t=N\_v \cdot N\_h$ antennas has a square form as in FIG. 10 may be considered. In this case, $N\_h$ indicates the number of antenna columns in a horizontal direction, and $N\_v$ indicates the number of antenna rows in a vertical direction.

If the antenna array of such a 2D structure is used, radio waves can be controlled both in the vertical direction (elevation) and the horizontal direction (azimuth) so that a transmission beam can be controlled in the 3D space. A wavelength control mechanism of such a type may be called 3D beamforming.

FIG. 11 illustrates a system in which an eNB or UE has a plurality of transmission/reception antennas capable of forming a 3D beam based on the AAS in a wireless communication system to which the present invention may be applied.

FIG. 11 is a diagram of the aforementioned example and illustrates a 3D MIMO system using a 2D antenna array (i.e., 2D-AAS).

From the point of view of a transmission antenna, if a 3D beam pattern is used, a semi-static or dynamic beam can be formed in the vertical direction of the beam in addition to the horizontal direction. For example, an application, such as the formation of a sector in the vertical direction, may be considered.

Furthermore, from the point of view of a reception antenna, when a reception beam is formed using a massive reception antenna, a signal power rise effect according to an antenna array gain may be expected. Accordingly, in the case of the uplink, an eNB can receive a signal from a UE through a plurality of antennas. In this case, there is an advantage in that the UE can set its transmission power very low by considering the gain of the massive reception antenna in order to reduce an interference influence.

FIG. 12 illustrates a 2D antenna system having cross-polarizations in a wireless communication system to which the present invention may be applied.

A 2D planar antenna array model in which polarization is considered may be diagrammed as shown in FIG. 12.

Unlike the existing MIMO system according to a passive antenna, a system based on an active antenna can dynamically control the gain of an antenna element by applying weight to an active element (e.g., an amplifier) to which each antenna element has been attached (or included). The antenna system may be modeled in an antenna element level because a radiation pattern depends on the number of antenna elements and an antenna arrangement, such as antenna spacing.

An antenna array model, such as the example of FIG. 12, may be represented by (M, N, P). This corresponds to a parameter that characterizes an antenna array structure.

M indicates the number of antenna elements having the same polarization in each column (i.e., the vertical direction) (i.e., the number of antenna elements having a +45° slant in each column or the number of antenna elements having a −45° slant in each column).

N indicates the number of columns in the horizontal direction (i.e., the number of antenna elements in the horizontal direction).

P indicates the number of dimensions of polarization. P=2 in the case of cross-polarization as in the case of FIG. 12, or P=1 in the case of co-polarization.

An antenna port may be mapped to a physical antenna element. The antenna port may be defined by a reference signal related to a corresponding antenna port. For example, in the LTE system, the antenna port 0 may be related to a cell-specific reference signal (CRS), and the antenna port 6 may be related to a positioning reference signal (PRS).

For example, an antenna port and a physical antenna element may be mapped in a one-to-one manner. This may correspond to a case where a single cross-polarization antenna element is used for downlink MIMO or downlink transmit diversity. For example, the antenna port 0 is mapped to one physical antenna element, whereas the antenna port 1 may be mapped to the other physical antenna element. In this case, from the point of view of a UE, two types of downlink transmission are present. One is related to a reference signal for the antenna port 0, and the other is related to a reference signal for the antenna port 1.

For another example, a single antenna port may be mapped to multiple physical antenna elements. This may correspond to a case where a single antenna port is used for beamforming. In beamforming, multiple physical antenna elements are used, so downlink transmission may be directed toward a specific UE. In general, this may be achieved using an antenna array configured using multiple columns of multiple cross-polarization antenna elements. In this case, from the point of view of a UE, one type of downlink transmission generated from a single antenna port is present. One is related to a CRS for the antenna port 0, and the other is related to a CRS for the antenna port 1.

That is, an antenna port indicates downlink transmission from the point of view of a UE not actual downlink transmission from a physical antenna element by an eNB.

For another example, a plurality of antenna ports is used for downlink transmission, but each antenna port may be mapped to multiple physical antenna elements. This may correspond to a case where an antenna array is used for downlink MIMO or downlink diversity. For example, each of the antenna ports 0 and 1 may be mapped to multiple physical antenna elements. In this case, from the point of view of a UE, two types of downlink transmission. One is related to a reference signal for the antenna port 0, and the other is related to a reference signal for the antenna port 1.

In FD-MIMO, the MIMO precoding of a data stream may experience antenna port virtualization, transceiver unit (or a transmission and reception unit) (TXRU) virtualization, and an antenna element pattern.

In the antenna port virtualization, a stream on an antenna port is precoded on a TXRU. In the TXRU virtualization, a TXRU signal is precoded on an antenna element. In the antenna element pattern, a signal radiated by an antenna element may have a directional gain pattern.

In the existing transceiver modeling, a static one-to-one mapping between an antenna port and a TXRU is assumed, and a TXRU virtualization effect is joined into a static (TXRU) antenna pattern including the effects of the TXRU virtualization and the antenna element pattern.

The antenna port virtualization may be performed by a frequency-selective method. In LTE, an antenna port, together with a reference signal (or pilot), is defined. For example, for precoded data transmission on an antenna port, a DMRS is transmitted in the same bandwidth as a data signal, and both the DMRS and data are precoded by the same precoder (or the same TXRU virtualization precoding). For CSI measurement, a CSI-RS is transmitted through multiple antenna ports. In CSI-RS transmission, a precoder that characterizes mapping between a CSI-RS port and a TXRU may be designed in a unique matrix so that a UE can estimate a TXRU virtualization precoding matrix for a data precoding vector.

A TXRU virtualization method is discussed in 1D TXRU virtualization and 2D TXRU virtualization, which are described below with reference to the following drawing.

FIG. 13 illustrates a transceiver unit model in a wireless communication system to which the present invention may be applied.

In the 1D TXRU virtualization, M_TXRU TXRUs are related to M antenna elements configured in a single column antenna array having the same polarization.

In the 2D TXRU virtualization, a TXRU model configuration corresponding to the antenna array model configuration (M, N, P) of FIG. 12 may be represented by (M_TXRU, N, P). In this case, M_TXRU means the number of TXRUs present in the 2D same column and same polarization, and always satisfies M_TXRU≤M. That is, the total number of TXRUs is the same as M_TXRU×N×P.

A TXRU virtualization model may be divided into a TXRU virtualization model option-1: sub-array partition model as in FIG. 13(a) and a TXRU virtualization model option-2: full connection model as in FIG. 13(b) depending on a correlation between an antenna element and a TXRU.

Referring to FIG. 13(a), in the case of the sub-array partition model, an antenna element is partitioned into multiple antenna element groups, and each TXRU is connected to one of the groups.

Referring to FIG. 13(b), in the case of the full-connection model, the signals of multiple TXRUs are combined and transferred to a single antenna element (or the arrangement of antenna elements).

In FIG. 13, q is the transmission signal vectors of antenna elements having M co-polarizations within one column. W is a wideband TXRU virtualization vector, and W is a wideband TXRU virtualization matrix. X is the signal vectors of M_TXRU TXRUs.

In this case, mapping between an antenna port and TXRUs may be one-to-one or one-to-many.

In FIG. 13, mapping between a TXRU and an antenna element (TXRU-to-element mapping) shows one example, but the present invention is not limited thereto. From the point of view of hardware, the present invention may be identically applied to mapping between a TXRU and an antenna element which may be implemented in various forms.

Precoding Matrix Indicator (PMI) Definition

In the case of the transmission modes 4, 5 and 6, precoding feedback is used for channel-dependent codebook-based precoding and depends on a UE(s) that reports a PMI. In the case of the transmission mode 8, a UE reports a PMI. In the case of the transmission modes 9 and 10, PMI/RI reporting is configured. When a CSI-RS port is greater than 1, a UE reports a PMI. The UE reports the PMI based on a feedback mode. In the case of other transmission mode, PMI reporting is not supported.

In the case of two antenna ports, each PMI value corresponds to Table 6 and a codebook index.

If two antenna ports are $\{0,1\}$ or $\{15,16\}$ and a related RI value is 1, a PMI value corresponds to a codebook index n when $\upsilon=1$ in Table 6 ($n\in\{0,1,2,3\}$).

If two antenna ports are $\{0,1\}$ or $\{15,16\}$ and a related RI value is 2, a PMI value corresponds to a codebook index n+1 when $\upsilon=2$ in Table 6 ($n\in\{0,1\}$).

Table 6 illustrates a codebook for transmission on the antenna port $\{0,1\}$ and for CSI reporting based on the antenna ports $\{0,1\}$ or $\{15,16\}$.

TABLE 6

| Codebook index | Number of layers (v) | |
|---|---|---|
| | 1 | 2 |
| 0 | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |
| 1 | $\frac{1}{\sqrt{2}}\begin{bmatrix}1\\-1\end{bmatrix}$ | $\frac{1}{2}\begin{bmatrix}1 & 1\\1 & -1\end{bmatrix}$ |
| 2 | $\frac{1}{\sqrt{2}}\begin{bmatrix}1\\j\end{bmatrix}$ | $\frac{1}{2}\begin{bmatrix}1 & 1\\j & -j\end{bmatrix}$ |

TABLE 6-continued

| Codebook index | Number of layers (v) | |
|---|---|---|
| | 1 | 2 |
| 3 | $\frac{1}{\sqrt{2}}\begin{bmatrix}1\\-j\end{bmatrix}$ | — |

If four antenna ports are $\{0,1,2,3\}$ or $\{15,16,17,18\}$, each PMI value corresponds to a codebook index given in Table 7 as follows, but corresponds to a pair of codebook indices given in Table 8 to Table 11.

A PMI value may correspond to a codebook index n given in Table 7 with respect to the same V as an associated RI value ($n\in\{0,1\Lambda,15\}$).

Alternatively, each PMI value may correspond to a pair of codebook indices given in Table 8 to Table 11. In this case, in Table 8 and Table 11, $\varphi_n$, $\varphi'_n$, and $v'_m$ are the same as Equation 15 below.

$\varphi_n = e^{j\pi n/2}$ $\varphi'_n = e^{j2\pi n/32}$ $v'_m = [1 \; e^{j2\pi n/32}]^T$ [Equation 15]

A first PMI value $i_1\in\{0,1,\Lambda,f(\upsilon)-1\}$ and a second PMI value $i_2\in\{0,1,\Lambda, g(\upsilon)-1\}$ correspond to respective codebook indices $i_1$ and $i_2$ given in Table j with respect to the same $\upsilon$ as an associated RI value. In this case, when $\upsilon=\{1,2,3,4\}$ $f(\upsilon)=\{16,16,1,1\}$ and $g(\upsilon)=\{16,16,16,16\}$ j corresponds to 8, 9, 10, and 11.

In Table 10 and Table 11, $W_n^{\{s\}}$ indicates a matrix defined by columns given by a set $\{s\}$ from $W_n=I-2u_nu_n^H/u_n^Hu_n$. In this case, I is a 4×4 unit matrix, and the vector $u_n$ is determined in Table 7. Furthermore, $n=i_2$.

In some cases, codebook subsampling is supported.

Table 7 illustrates a codebook for transmission on the antenna ports $\{0,1,2,3\}$ and CSI reporting based on the antenna ports $\{0,1,2,3\}$ or $\{15,16,17,18\}$.

TABLE 7

| Codebook index | $u_n$ | Number of layers(v) | | | |
|---|---|---|---|---|---|
| | | 1 | 2 | 3 | 4 |
| 0 | $u_0 = [1\; -1\; -1\; -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\; -j\; 1\; j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\; 1\; -1\; 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\; j\; 1\; -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\; (-1-j)/\sqrt{2}\; -j\; (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\; (1-j)/\sqrt{2}\; j\; (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\; (1+j)/\sqrt{2}\; -j\; (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\; (-1+j)/\sqrt{2}\; j\; (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\; -1\; 1\; 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\; -j\; -1\; -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\; 1\; 1\; -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\; j\; -1\; j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\; -1\; -1\; 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\; -1\; 1\; -1]^T$ | $W_{13}^{\{1\}}$ | $W_{13}^{\{13\}}/\sqrt{2}$ | $W_{13}^{\{123\}}/\sqrt{3}$ | $W_{13}^{\{1234\}}/2$ |
| 14 | $u_{14} = [1\; 1\; -1\; -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\; 1\; 1\; 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

Table 8 illustrates a codebook for 1-layer CSI reporting using the antenna ports 0 to 3 or 15 to 18.

TABLE 8

| $i_1$ | $i_2$ | | | | | | | |
|---|---|---|---|---|---|---|---|---|
|  | 0 | 1 | 2 | 3 | 4 | 5 | 6 | 7 |
| 0-15 | $W_{i_1,0}^{(1)}$ | $W_{i_1,8}^{(1)}$ | $W_{i_1,16}^{(1)}$ | $W_{i_1,24}^{(1)}$ | $W_{i_1+8,2}^{(1)}$ | $W_{i_1+8,10}^{(1)}$ | $W_{i_1+8,18}^{(1)}$ | $W_{i_1+8,26}^{(1)}$ |
| $i_1$ | $i_2$ | | | | | | | |
|  | 8 | 9 | 10 | 11 | 12 | 13 | 14 | 15 |
| 0-15 | $W_{i_1+16,4}^{(1)}$ | $W_{i_1+16,12}^{(1)}$ | $W_{i_1+16,20}^{(1)}$ | $W_{i_1+16,28}^{(1)}$ | $W_{i_1+24,6}^{(1)}$ | $W_{i_1+24,14}^{(1)}$ | $W_{i_1+24,22}^{(1)}$ | $W_{i_1+24,30}^{(1)}$ |

$$W_{m,n}^{(1)} = \frac{1}{2}\begin{bmatrix} v'_m \\ \varphi'_n v'_m \end{bmatrix}$$

Table 9 illustrates a codebook for 2-layer CSI reporting using the antenna ports 0 to 3 or 15 to 18.

TABLE 9

| $i_1$ | $i_2$ | | | |
|---|---|---|---|---|
|  | 0 | 1 | 2 | 3 |
| 0-15 | $W_{i_1,i_1,0}^{(2)}$ | $W_{i_1,i_1,1}^{(2)}$ | $W_{i_1+8,i_1+8,0}^{(2)}$ | $W_{i_1+8,i_1+8,1}^{(2)}$ |
| $i_1$ | $i_2$ | | | |
|  | 4 | 5 | 6 | 7 |
| 0-15 | $W_{i_1+16,i_1+16,0}^{(2)}$ | $W_{i_1+16,i_1+16,1}^{(2)}$ | $W_{i_1+24,i_1+24,0}^{(2)}$ | $W_{i_1+24,i_1+24,1}^{(2)}$ |
| $i_1$ | $i_2$ | | | |
|  | 8 | 9 | 10 | 11 |
| 0-15 | $W_{i_1,i_1,+8,0}^{(2)}$ | $W_{i_1,i_1+8,1}^{(2)}$ | $W_{i_1+8,i_1+16,0}^{(2)}$ | $W_{i_1+8,i_1+16,1}^{(2)}$ |
| $i_1$ | $i_2$ | | | |
|  | 12 | 13 | 14 | 15 |
| 0-15 | $W_{i_1,i_1+24,0}^{(2)}$ | $W_{i_1,i_1+24,1}^{(2)}$ | $W_{i_1+8,i_1+24,0}^{(2)}$ | $W_{i_1+8,i_1+24,1}^{(2)}$ |

$$W_{m,m',n}^{(2)} = \frac{1}{\sqrt{8}}\begin{bmatrix} v'_m & v'_{m'} \\ \varphi_n v'_m & -\varphi_n v'_{m'} \end{bmatrix}$$

Table 10 illustrates a codebook for 3-layer CSI reporting using the antenna ports 15 to 18.

TABLE 10

| $i_1$ | $i_2$ | | | | | | | |
|---|---|---|---|---|---|---|---|---|
|  | 0 | 1 | 2 | 3 | 4 | 5 | 6 | 7 |
| 0 | $W_0^{\{124\}}/\sqrt{3}$ | $W_1^{\{123\}}/\sqrt{3}$ | $W_2^{\{123\}}/\sqrt{3}$ | $W_3^{\{123\}}/\sqrt{3}$ | $W_4^{\{124\}}/\sqrt{3}$ | $W_5^{\{124\}}/\sqrt{3}$ | $W_6^{\{134\}}/\sqrt{3}$ | $W_7^{\{134\}}/\sqrt{3}$ |
| $i_1$ | $i_2$ | | | | | | | |
|  | 8 | 9 | 10 | 11 | 12 | 13 | 14 | 15 |
| 0 | $W_8^{\{124\}}/\sqrt{3}$ | $W_9^{\{134\}}/\sqrt{3}$ | $W_{10}^{\{123\}}/\sqrt{3}$ | $W_{11}^{\{134\}}/\sqrt{3}$ | $W_{12}^{\{123\}}/\sqrt{3}$ | $W_{13}^{\{123\}}/\sqrt{3}$ | $W_{14}^{\{123\}}/\sqrt{3}$ | $W_{15}^{\{123\}}/\sqrt{3}$ |

Table 11 illustrates a codebook for 4-layer CSI reporting using the antenna ports 15 to 18.

TABLE 11

| $i_1$ | \multicolumn{8}{c}{$i_2$} | | | | | | | |
|---|---|---|---|---|---|---|---|---|
| | 0 | 1 | 2 | 3 | 4 | 5 | 6 | 7 |
| 0 | $W_0^{\{1234\}}/2$ | $W_1^{\{1234\}}/2$ | $W_2^{\{3214\}}/2$ | $W_3^{\{3214\}}/2$ | $W_4^{\{1234\}}/2$ | $W_5^{\{1234\}}/2$ | $W_6^{\{1324\}}/2$ | $W_7^{\{1324\}}/2$ |
| $i_1$ | 8 | 9 | 10 | 11 | 12 | 13 | 14 | 15 |
| 0 | $W_8^{\{1234\}}/2$ | $W_9^{\{1234\}}/2$ | $W_{10}^{\{1324\}}/2$ | $W_{11}^{\{1324\}}/2$ | $W_{12}^{\{1234\}}/2$ | $W_{13}^{\{1324\}}/2$ | $W_{14}^{\{3214\}}/2$ | $W_{15}^{\{1234\}}/2$ |

In the case of the 8 antenna ports, each PMI value corresponds to a pair of codebook indices given in Table 12 to Table 19. In this case, $\varphi_n$ and $v_m$ are the same as Equation 16 below.

$$\varphi_n = e^{j\pi n/2}$$

$$v_m = [1\ e^{j2\pi m/32}\ e^{j4\pi m/32}\ e^{j6\pi m/32}]^T \quad \text{[Equation 16]}$$

In the case of the 8 antenna ports {15,16,17,18,19,20,21, 22}, a first PMI value $i_1 \in \{0,1,\Lambda,f(\upsilon)-1\}$ and a second PMI value $i_2 \in \{0,1,\Lambda,g(\upsilon)-1\}$ correspond to respective codebook indices $i_1$ and $i_2$ given in Table j with respect to the same as an associated RI value. In this case, j=$\upsilon$, f($\upsilon$)={16,16,4,4, 4,4,4,1}, and g($\upsilon$)={16,16,16,8,1,1,1,1}.

In some cases, codebook subsampling is supported.

Table 12 illustrates a codebook for 1-layer CSI reporting using the antenna ports 15 to 22.

TABLE 12

| $i_1$ | \multicolumn{8}{c}{$i_2$} | | | | | | | |
|---|---|---|---|---|---|---|---|---|
| | 0 | 1 | 2 | 3 | 4 | 5 | 6 | 7 |
| 0-15 | $W_{2i_1,0}^{(1)}$ | $W_{2i_1,1}^{(1)}$ | $W_{2i_1,2}^{(1)}$ | $W_{2i_1,3}^{(1)}$ | $W_{2i_1+1,0}^{(1)}$ | $W_{2i_1+1,1}^{(1)}$ | $W_{2i_1+1,2}^{(1)}$ | $W_{2i_1+1,3}^{(1)}$ |
| $i_1$ | 8 | 9 | 10 | 11 | 12 | 13 | 14 | 15 |
| 0-15 | $W_{2i_1+2,0}^{(1)}$ | $W_{2i_1+2,1}^{(1)}$ | $W_{2i_1+2,2}^{(1)}$ | $W_{2i_1+2,3}^{(1)}$ | $W_{2i_1+3,0}^{(1)}$ | $W_{2i_1+3,1}^{(1)}$ | $W_{2i_1+3,2}^{(1)}$ | $W_{2i_1+3,3}^{(1)}$ |

$$W_{m,n}^{(1)} = \frac{1}{\sqrt{8}} \begin{bmatrix} v_m \\ \varphi_n v_m \end{bmatrix}$$

Table 13 illustrates a codebook for 2-layer CSI reporting using the antenna ports 15 to 22.

TABLE 13

| $i_1$ | \multicolumn{4}{c}{$i_2$} | | | |
|---|---|---|---|---|
| | 0 | 1 | 2 | 3 |
| 0-15 | $W_{2i_1,2i_1,0}^{(2)}$ | $W_{2i_1,2i_1,1}^{(2)}$ | $W_{2i_1+1,2i_1+1,0}^{(2)}$ | $W_{2i_1+1,2i_1+1,1}^{(2)}$ |
| $i_1$ | 4 | 5 | 6 | 7 |
| 0-15 | $W_{2i_1+2,2i_1+2,0}^{(2)}$ | $W_{2i_1+2,2i_1+2,1}^{(2)}$ | $W_{2i_1+3,2i_1+3,0}^{(2)}$ | $W_{2i_1+3,2i_1+3,1}^{(2)}$ |
| $i_1$ | 8 | 9 | 10 | 11 |
| 0-15 | $W_{2i_1,2i_1+1,0}^{(2)}$ | $W_{2i_1,2i_1+1,1}^{(2)}$ | $W_{2i_1+1,2i_1+2,0}^{(2)}$ | $W_{2i_1+1,2i_1+2,1}^{(2)}$ |
| $i_1$ | 12 | 13 | 14 | 15 |
| 0-15 | $W_{2i_1,2i_1+3,0}^{(2)}$ | $W_{2i_1,2i_1+3,1}^{(2)}$ | $W_{2i_1+1,2i_1+3,0}^{(2)}$ | $W_{2i_1+1,2i_1+3,1}^{(2)}$ |

$$W_{m,m',n}^{(2)} = \frac{1}{4} \begin{bmatrix} v_m & v_{m'} \\ \varphi_n v_m & -\varphi_n v_{m'} \end{bmatrix}$$

Table 14 illustrates a codebook for 3-layer CSI reporting using the antenna ports 15 to 22.

TABLE 14

| | $i_2$ | | | |
|---|---|---|---|---|
| $i_1$ | 0 | 1 | 2 | 3 |
| 0-3 | $W_{8i_1,8i_1,8i_1+8}^{(3)}$ | $W_{8i_1+8,8i_1,8i_1+8}^{(3)}$ | $\tilde{W}_{8i_1,8i_1+8,8i_1+8}^{(3)}$ | $\tilde{W}_{8i_1+8,8i_1,8i_1}^{(3)}$ |

| | $i_2$ | | | |
|---|---|---|---|---|
| $i_1$ | 4 | 5 | 6 | 7 |
| 0-3 | $W_{8i_1+2,8i_1+2,8i_1+10}^{(3)}$ | $W_{8i_1+10,8i_1+28i_1+10}^{(3)}$ | $\tilde{W}_{8i_1+2,8i_1+10,8i_1+10}^{(3)}$ | $\tilde{W}_{8i_1+10,8i_1+2,8i_1+2}^{(3)}$ |

| | $i_2$ | | | |
|---|---|---|---|---|
| $i_1$ | 8 | 9 | 10 | 11 |
| 0-3 | $W_{8i_1+4,8i_1+4,8i_1+12}^{(3)}$ | $W_{8i_1+12,8i_1+4,8i_1+12}^{(3)}$ | $\tilde{W}_{8i_1+4,8i_1+12,8i_1+12}^{(3)}$ | $\tilde{W}_{8i_1+12,8i_1+4,8i_1+4}^{(3)}$ |

| | $i_2$ | | | |
|---|---|---|---|---|
| $i_1$ | 12 | 13 | 14 | 15 |
| 0-3 | $W_{8i_1+6,8i_1+6,8i_1+14}^{(3)}$ | $W_{8i_1+14,8i_1+6,8i_1+14}^{(3)}$ | $\tilde{W}_{8i_1+6,8i_1+14,8i_1+14}^{(3)}$ | $\tilde{W}_{8i_1+14,8i_1+6,8i_1+6}^{(3)}$ |

$$W_{m,m',m''}^{(3)} = \frac{1}{\sqrt{24}}\begin{bmatrix} v_m & v_{m'} & v_{m''} \\ v_m & -v_{m'} & -v_{m''} \end{bmatrix}, \tilde{W}_{m,m',m''}^{(3)} = \frac{1}{\sqrt{24}}\begin{bmatrix} v_m & v_{m'} & v_{m''} \\ v_m & v_{m'} & -v_{m''} \end{bmatrix}$$

Table 15 illustrates a codebook for 4-layer CSI reporting using the antenna ports 15 to 22.

TABLE 15

| | $i_2$ | | | |
|---|---|---|---|---|
| $i_1$ | 0 | 1 | 2 | 3 |
| 0-3 | $W_{8i_1,8i_1,0}^{(4)}$ | $W_{8i_1,8i_1+8,1}^{(4)}$ | $W_{8i_1+2,8i_1+10,0}^{(4)}$ | $W_{8i_1+2,8i_1+10,1}^{(4)}$ |

| | $i_2$ | | | |
|---|---|---|---|---|
| $i_1$ | 4 | 5 | 6 | 7 |
| 0-3 | $W_{8i_1+4,8i_1+12,0}^{(4)}$ | $W_{8i_1+4,8i_1+12,1}^{(4)}$ | $W_{8i_1+6,8i_1+14,0}^{(4)}$ | $W_{8i_1+6,8i_1+14,1}^{(4)}$ |

$$W_{m,m',n}^{(4)} = \frac{1}{\sqrt{32}}\begin{bmatrix} v_m & v_{m'} & v_m & v_{m'} \\ \varphi_n v_m & \varphi_n v_{m'} & -\varphi_n v_m & -\varphi_n v_{m'} \end{bmatrix}$$

Table 16 illustrates a codebook for 5-layer CSI reporting using the antenna ports 15 to 22.

TABLE 16

| | $i_2$ |
|---|---|
| $i_1$ | 0 |
| 0-3 | $W_{i_1}^{(5)} = \frac{1}{\sqrt{40}}\begin{bmatrix} v_{2i_1} & v_{2i_1} & v_{2i_1+8} & v_{2i_1+8} & v_{2i_1+16} \\ v_{2i_1} & -v_{2i_1} & v_{2i_1+8} & -v_{2i_1+8} & v_{2i_1+16} \end{bmatrix}$ |

Table 17 illustrates a codebook for 6-layer CSI reporting using the antenna ports 15 to 22.

TABLE 17

| | $i_2$ |
|---|---|
| $i_1$ | 0 |
| 0-3 | $W_{i_1}^{(6)} = \frac{1}{\sqrt{48}}\begin{bmatrix} v_{2i_1} & v_{2i_1} & v_{2i_1+8} & v_{2i_1+8} & v_{2i_1+16} & v_{2i_1+16} \\ v_{2i_1} & -v_{2i_1} & v_{2i_1+8} & -v_{2i_1+8} & v_{2i_1+16} & -v_{2i_1+16} \end{bmatrix}$ |

Table 18 illustrates a codebook for 7-layer CSI reporting using the antenna ports 15 to 22.

TABLE 18

| | $i_2$ |
|---|---|
| $i_1$ | 0 |
| 0-3 | $W_{i_1}^{(7)} = \frac{1}{\sqrt{56}}\begin{bmatrix} v_{2i_1} & v_{2i_1} & v_{2i_1+8} & v_{2i_1+8} & v_{2i_1+16} & v_{2i_1+16} & v_{2i_1+24} \\ v_{2i_1} & -v_{2i_1} & v_{2i_1+8} & -v_{2i_1+8} & v_{2i_1+16} & -v_{2i_1+16} & v_{2i_1+24} \end{bmatrix}$ |

Table 19 illustrates a codebook for 8-layer CSI reporting using the antenna ports 15 to 22.

TABLE 19

| | $i_2$ |
|---|---|
| $i_1$ | 0 |
| 0 | $W_{i_1}^{(8)} = \frac{1}{8}\begin{bmatrix} v_{2i_1} & v_{2i_1} & v_{2i_1+8} & v_{2i_1+8} & v_{2i_1+16} & v_{2i_1+16} & v_{2i_1+24} & v_{2i_1+24} \\ v_{2i_1} & -v_{2i_1} & v_{2i_1+8} & -v_{2i_1+8} & v_{2i_1+16} & -v_{2i_1+16} & v_{2i_1+24} & -v_{2i_1+24} \end{bmatrix}$ |

CSI Reporting

In the current 3GPP Rel-13, a CSI-RS operation (or CSI reporting operation) (each CSI process may be associated with one CSI-RS resource and one CSI-IM resource) of a non-precoded scheme defined as Class A and a CSI-RS operation (or CSI reporting operation) (each CSI process may be associated with one or more CSI-RS resources and one or more CSI-IM resources) of a beamformed scheme defined as Class B are defined.

1) Class A CSI Reporting

In a full dimension (FD)-MIMO (or may be called massive-MIMO, enhanced-MIMO, large-scale antenna system, very large MIMO or hyper-MIMO) system, a base station may configure multiple CSI-RS resources within one CSI process with respect to a UE. In this case, the UE does not consider a CSI-RS resource configured within one CSI process to be an independent channel and assumes one (massive) CSI-RS resource by aggregating corresponding resources. Furthermore, the UE calculates CSI from one CSI-RS resource and feeds it back to the base station. For example, the base station configures three 4-port CSI-RS resources within one CSI process with respect to the UE. The UE assumes one 12-port CSI-RS resources by aggregating the three 4-port CSI-RS resources. The UE calculates CSI using 12 port PMIs from the resources and feeds it back to the base station.

2) Class B CSI Reporting

In the FD MIMO system, a base station may configure multiple CSI-RS resources within one CSI process with respect to a UE. For example, the base station may configure eight CSI-RS resources within one CSI process. Each of the eight CSI-RS resources may include a 4-port CSI-RS. Different beamforming is applied to each of the eight 4-port CSI-RS resources because different virtualization is applied to each CSI-RS resource. For example, vertical beamforming may be applied to a CSI-RS resource corresponding to the first at a zenith angle of 100 degrees. CSI-RSs may be sequentially configured in respective CSI-RS resources at a zenith angle difference of 5 degrees, and vertical beamforming may be applied to a CSI-RS resource corresponding to the eighth at a zenith angle of 135 degrees.

A UE assumes each CSI-RS resource as an independent channel, selects one of SI-RS resources, calculates CSI based on the selected resource, and reports the CSI to a base station. That is, the UE selects a CSI-RS resource belonging to eight CSI-RSs and having the strongest channel, calculates CSI based on the selected CSI-RS resource, and reports the CSI to the base station. In this case, the UE additionally reports the selected CSI-RS resource to the base station through a CSI-RS resource indicator (CRI) value. For example, if the channel of the first CSI-RS is the strongest, the UE may configure a CRI=0 and report it to the base station.

In order to effectively indicate the characteristics, the following variables may be defined in Class B with respect to the CSI process. K means the number of CSI-RS resources within a CSI process. N_k means the number of CSI-RS ports of a k-th CSI-RS resource. The example shows a case where K=8 and N_k is set to 4 regardless of a k value.

In the current 3GPP Rel-13, a CRI indicates a specific CSI-RS resource, but a future CRI may be materialized to indicate a specific port combination in a specific CSI-RS resource.

For example, a CRI may be materialized to indicate one of eight CSI-RSs within a CSI process and additionally select a No. port 15 and 16 combination within the selected CSI-RS resource. As described above, when one of a port 15,16 combination and a port 17, 18 combination is selected in each CSI-RS, a CRI indicates one of 16 values. The port 15, 16 combination of the first CSI-RS resource, the port 17, 18 combination of the first CSI-RS resource, the port 15, 16 combination of the second CSI-RS resource, and the port 17, 18 combination of the second CSI-RS resource may be sequentially mapped to CRI=0, CRI=1, CRI=2, and CRI=3, respectively, so the port 17, 18 combination of the last eighth CSI-RS resources may be finally mapped to CRI=15.

A 3GPP Rel-13 codebook complies with a dual structure of an Rel-10, Rel-12 codebook. That is, the final codebook is formed as two products (i.e., the product of W_1 and W_2) with the characteristics of W_1 (long-term, wideband, beam group selection) and W_2 (short-term, subband, beam selection+co-phasing).

In this case, a difference between the 3GPP Rel-13 codebook and the Rel-10 and Rel-12 codebooks is that each of beams forming the codebook has a Kronecker product form of a vertical beam and a horizontal beam because a considered antenna port layout includes a 2 dimension (2D). The 3GPP Rel-13 rank 1-2 codebook is expressed into Equation 17.

[Equation 17]

$$W = W_1 W_2$$

$$W^{(1)}_{m_1,m_2,n} = \frac{1}{\sqrt{2N_1 N_2}} \begin{bmatrix} v_{m_1} \otimes u_{m_2} \\ \varphi_n v_{m_1} \otimes u_{m_2} \end{bmatrix},$$

$$\varphi_n = \exp\left(\frac{j2\pi n}{4}\right), n = 0, 1, 2, 3$$

$$W^{(2)}_{m_1,m_2,n} = \frac{1}{2\sqrt{N_1 N_2}} \begin{bmatrix} v_{m_1} \otimes u_{m_2} & v_{m_1} \otimes u_{m_2} \\ \varphi_n v_{m_1} \otimes u_{m_2} & -\varphi_n v_{m_1} \otimes u_{m_2} \end{bmatrix},$$

$$\varphi_n = \exp\left(\frac{j2\pi n}{4}\right), n = 0, 1$$

$$v_{m_1} = \begin{bmatrix} 1 & \exp\left(j\frac{2\pi m_1}{o_1 N_1}\right) L & \exp\left(j\frac{2\pi m_1(N_1-1)}{o_1 N_1}\right) \end{bmatrix}^T$$

$$u_{m_2} = \begin{bmatrix} 1 & \exp\left(j\frac{2\pi m_2}{o_2 N_2}\right) L & \exp\left(j\frac{2\pi m_2(N_2-1)}{o_2 N_2}\right) \end{bmatrix}^T$$

In Equation 17, W^(1) indicates the final form of a rank 1 codebook, and W^(2) indicates the final form of a rank 2 codebook.

In this case, N_1 and N_2 are the number of antenna ports for each polarization within a $1^{st}$ dimension and a $2^{nd}$ dimension, respectively. o_1 and o_2 are oversampling factors within the $1^{st}$ dimension and the $2^{nd}$ dimension, respectively.

Furthermore, m_1, m_2 indicate methods of selecting discrete Fourier transform (DFT) vectors in horizontality and verticality (or the $1^{st}$ and the $2^{nd}$ domain), respectively. Specific W1 2D beam groups (i.e., Codebook Configs 1 to 4) may be configured through m_1 (m_1 and m'_1 in the case of rank 2) and m_2 (m_2 and m'_2 in the case of rank 2). Furthermore, the subscript n indicates co-phasing.

That is, the 3GPP Rel-13 codebook may be considered to have been extended from an 8 port transmission (8Tx) codebook of Rel-10 in a 2-dimensional manner using operation of a Kronecker product.

Furthermore, the 3GPP Rel-13 codebook may form a closely spaced beam(s).

Furthermore, the 3GPP Rel-13 codebook may be considered to be a continued constant modulus codebook. That is, this means that the amplitude of elements forming a vector (i.e., v and u) is all 1 and an angle thereof is circularly changed.

Furthermore, the 3GPP Rel-13 codebook corresponds to a scalable codebook using an N_1, N_2, o_1, o_2 parameter.

Furthermore, the 3GPP Rel-13 codebook may be divided into 4 Configs.

FIG. 14 is a diagram illustrating the configurations of a codebook in a wireless communication system to which the present invention may be applied.

FIG. 14 illustrates beam group patterns for each codebook configuration (Config).

The Config 1 codebook shows a beam group pattern (i.e., (x, y), wherein x is a first dimension (e.g., horizontal dimension) index and y is a second dimension (e.g., vertical dimension) index) formed of one beam. That is, since one beam is selected by W_1, there is no beam selection within W_2.

The Config 2 codebook shows a beam group pattern (i.e., (x, y), (x, y+1), (x+1, y), (x+1, y+1), wherein x is a first dimension (e.g., horizontal dimension) index and y is a second dimension (e.g., vertical dimension) index) in which four beams have a rectangular form. This may be applied to medium angle spread in both the first dimension and the second dimension.

The Config 3 codebook show a beam group pattern (i.e., (x, y), (x+1, y+1), (x+2, y), (x+3, y+1), wherein x is a first dimension (e.g., horizontal dimension) index and y is a second dimension (e.g., vertical dimension) index) in which four beams are configured in zigzags. This may be applied to large angle spread and medium angle spread in each of the first dimension and the second dimension.

The Config 4 codebook shows a beam group pattern (i.e., (x, y), (x+1, y), (x+2, y), (x+3, y), wherein x is a first dimension (e.g., horizontal dimension) index and y is a second dimension (e.g., vertical dimension) index) in which four beams have a rectangular form (straight-line form). This may be applied large angle spread and small angle spread in each of the first dimension and the second dimension.

In this case, a performance difference between the four codebook Configs for the 3GPP Rel-13 codebook is weak (within 5%).

Furthermore, in the 3GPP Rel-13 codebook, a nested property between ranks is not satisfied. That is, Rank 1 and Rank 2 have different beam patterns.

Furthermore, in the 3GPP Rel-13 codebook, a codebook applicable for the 1 dimension includes the Config 1 and the Config 4.

Codebook Configuration Method for Multi-User (MU) Performance Improvement

As the full dimension (FD)-MIMO (or may be called massive-MIMO, enhanced-MIMO, a large-scale antenna system, very large MIMO or hyper-MIMO) is introduced, a base station may increase the throughput of a system by performing 3D-beamforming using an N (N>>1) antenna port (or it may correspond to an "element" depending on specific port-to-element virtualization. Hereinafter, it is collectively called a "port" for convenience description).

FIG. 15 illustrates the relation between the number of antenna ports and a beam width in a wireless communication system to which the present invention may be applied.

FIG. 15(a) illustrates an antenna port layout having N1=4, N2=4, cross polarization, and FIG. 15(b) illustrates an antenna port layout having N1=2, N2=2, cross polarization.

As illustrated in FIG. 15, as the number of antenna ports increases, a beam formed by antenna virtualization or beamforming is relatively narrowed. Accordingly, this can significantly increase system performance because the probability that beamforming suitable for a specific UE can be performed compared to a relatively wide beam.

Specifically, in a multi-user environment, beamforming using a narrow beam is more important because beamforming suitable for a plurality of UEs is more important.

Accordingly, the present invention proposes a codebook design method for improving MU performance in order to solve this problem.

Hereinafter, in the description of the present invention, a first dimension/domain is illustrated as denoting a horizontal dimension/domain and a second dimension/domain is illustrated as denoting a vertical dimension/domain in the 2D antenna array unless described otherwise, for convenience of description, but the present invention is not limited thereto.

Furthermore, hereinafter, in the description of the present invention, the same variables used in equations may be indicated as the same signs and may be construed identically, unless described otherwise.

Furthermore, hereinafter, in the description of the present invention, a beam may be construed as being a precoding matrix for generating a corresponding beam, and a beam group may be construed as having the same meaning as a set of precoding matrices (or a set of precoding vectors). Furthermore, to select a beam may be construed as having the meaning that a precoding matrix (or vector) capable of generating the corresponding beam is selected.

1. Extension of Dual Codebook

The Rel-13 codebook complies with the dual structure of the Rel-10 and Rel-12 codebooks. That is, the final codebook is formed as two products (i.e., the product of W_1 and W_2) with the characteristics of W_1 (or W1) (long-term, wideband, beam group selection) and W_2 (or W2) (short-term, subband, beam selection+co-phasing).

In this case, a difference between the Rel-13 codebook and the Rel-10 and Rel-12 codebooks is that each of beams forming the codebook has a Kronecker product form of a vertical beam and a horizontal beam because a considered antenna port layout includes a 2 dimension (2D). The 3GPP Rel-13 rank 1-2 codebook is expressed into Equation 18 below in an equation form.

[Equation 18]

$$W = W_1 W_2 \quad (1)$$

$$W^{(1)}_{m_1,m_2,n} = \frac{1}{\sqrt{2N_1 N_2}} \begin{bmatrix} v_{m_1} \otimes u_{m_2} \\ \varphi_n v_{m_1} \otimes u_{m_2} \end{bmatrix}, \quad (2)$$

$$\varphi_n = \exp\left(\frac{j2\pi n}{4}\right), n = 0, 1, 2, 3$$

$$W^{(2)}_{m_1,m_2,m'_1,m'_2,n} = \frac{1}{2\sqrt{N_1 N_2}} \begin{bmatrix} v_{m_1} \otimes u_{m_2} & v_{m'_1} \otimes u_{m'_2} \\ \varphi_n v_{m_1} \otimes u_{m_2} & -\varphi_n v_{m'_1} \otimes u_{m'_2} \end{bmatrix}, \quad (3)$$

$$\varphi_n = \exp\left(\frac{j2\pi n}{4}\right), n = 0, 1$$

$$v_{m_1} = \begin{bmatrix} 1 & \exp\left(j\frac{2\pi m_1}{o_1 N_1}\right) L & \exp\left(j\frac{2\pi m_1 (N_1 - 1)}{o_1 N_1}\right) \end{bmatrix}^T$$

$$u_{m_2} = \begin{bmatrix} 1 & \exp\left(j\frac{2\pi m_2}{o_2 N_2}\right) L & \exp\left(j\frac{2\pi m_2 (N_2 - 1)}{o_2 N_2}\right) \end{bmatrix}^T$$

In Equation 18, (1) indicates how W, that is, the final codebook is configured (i.e., the product of W_1 and W_2). Furthermore, (2) indicates the final form of a rank 1 codebook. Furthermore, (3) indicates the final form of a rank 2 codebook.

In this case, N_1 and N_2 are the number of antenna ports for each polarization within the 1$^{st}$ dimension and the 2$^{nd}$ dimension, respectively. o_1 and o_2 are oversampling factors within the 1$^{st}$ dimension and the 2$^{nd}$ dimension, respectively.

Furthermore, m_1 (m_1 and m'_1 in the case of rank 2) and m_2 (m_2 and m'_2 in the case of rank 2), that is, the subscripts of (2) and (3), indicate methods of selecting a DFT vector in horizontality and verticality (or the 1$^{st}$ and 2$^{nd}$ domains), respectively.

A specific W1 2D beam group (i.e., Codebook Configs 1 to 4) may be configured through m_1 (m_1 and m'_1 in the case of rank 2,) and m_2 (m_2 and m'_2 in the case of rank 2). Furthermore, the subscript n indicates co-phasing.

More specifically, the number of columns forming all of codebooks is N_1*o_1*N_2*o_2, and each column corresponds to a precoding matrix (or precoding vector) and has a DFT vector.

A first matrix (or first vector) (e.g., a matrix (or a vector) of a horizontal component) v_m_1 for a first dimension antenna port may be specified by the 1$^{st}$ dimension index m_1. A second matrix (or second vector) (e.g., a matrix (or vector) of a vertical component) u_m_2 for a second dimension antenna port may be specified by the 2$^{nd}$ dimension index m_2. Furthermore, the precoding matrix (or precoding vector) may be generated as the Kronecker product of v_m_1 and u_m_2.

Meanwhile, a PMI reported from a UE to a base station may include i_1 indicative of the index (i.e., a first PMI for specifying W_1) of W_1 (i.e., a set of precoding matrices) and i_2 indicative of an index corresponding to the selection of W_2 (i.e., a second PMI for specifying selected precoding within a set of precoding matrices).

A set of precoding matrices formed of one or more precoding matrices is determined in all of codebooks by i_1 depending on the codebook Configs 1 to 4 (refer to FIG. 14). One precoding matrix may be determined by i_2 within the determined set of precoding matrices. In other words, a value of the index pair (m_1, m_2) of the first dimension and the second dimension of one or more precoding matrices belonging to a set of precoding matrices may be determined by i_1.

Furthermore, a value of the index pair (m_1, m_2) of the first dimension and second dimension of the final precoding matrix (one precoding matrix in the case of rank 1, and two precoding matrices in the case of rank 2) may be determined by i_2 within the set of determined precoding matrices.

If multi-user (MU) MIMO and a narrow beam are taken into consideration, in the case of a codebook having a legacy beam group of W1, when W2 feedback is performed, there is a problem in that an inaccurate subband/short-term is selected because the angle spread of two dimensions (i.e., first dimension and second dimension) of a UE is not sufficiently covered.

In other words, there is a need for a codebook, which enables a UE to report a channel between a base station and the UE more finely because interference between users may occur when MU-MIMO is taken into consideration.

Accordingly, in order to solve this problem, the present invention proposes a method of designing a beam group of W1 and selecting a beam.

1-0. W1 Group with Four Beams

In the present method, in the case where a very narrow beam generated while a plurality of antennas is beamformed is used, if the Rel-13 codebook is used without any change, it is expected that performance will be degraded because the spread covered by a beam (the first domain and/or the second domain) is reduced.

Figure 17:
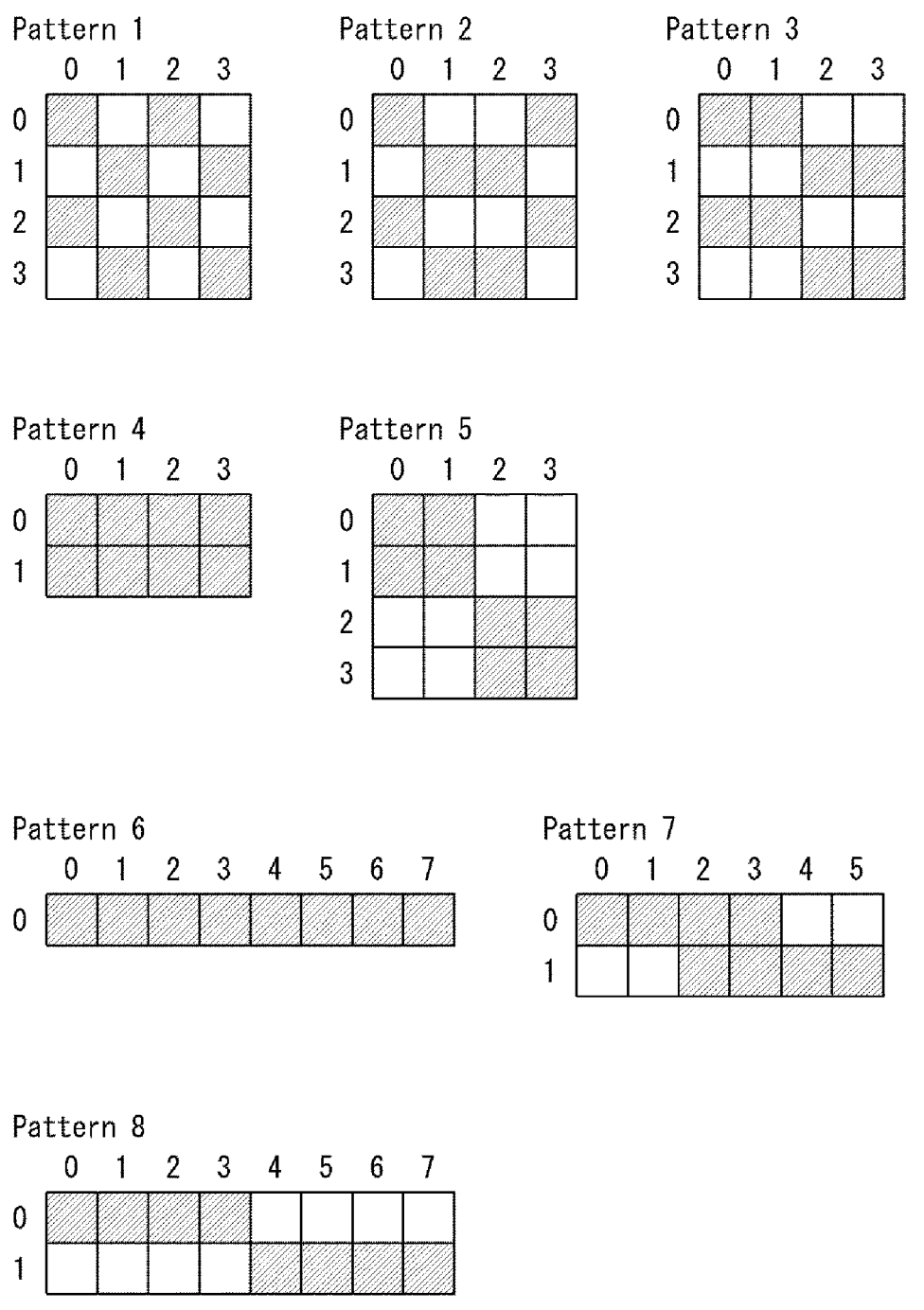

To this end, there is proposed a method of improving the Rel-13 Codebook Config. The proposed method is shown in FIG. 17.

FIG. 16 is a diagram illustrating a W1 beam group with four beams according to an embodiment of the present invention.

As illustrated in FIG. 16, the present invention proposes patterns extended (e.g., first domain) from the existing Rel-13 Codebook Configs with respect to a specific domain.

In FIG. 16, horizontality indicates a horizontal domain (or first domain) and verticality indicates a vertical domain (or second domain).

In FIG. 16, each box corresponds to a precoding matrix, and each box (i.e., the precoding matrix) may be specified as a pair of a first dimension index m_1 and a second dimension index m_2.

FIG. 16(a) shows 3GPP Rel-13 Codebook Configs, and FIG. 16(b) shows codebook configurations according to the present invention.

In the case of the 3GPP Rel-13 Config 2 codebook, a precoding matrix set including four precoding matrices respectively having (x, y) (i.e., "0" in FIG. 16), (x, y+1) (i.e., "1" in FIG. 16), (x+1, y) (i.e., "2" in FIG. 16), and (x+1, y+1) (i.e., "3" in FIG. 16) index pairs by the first PMI (e.g., W1 or i_1) is specified.

In this case, x indicates a first dimension (e.g., horizontal dimension) index value, and y indicates a second dimension (e.g., vertical dimension) index value.

In contrast, in the case of the Config 2 codebook according to the present invention, a precoding matrix set including four precoding matrices respectively having (x, y) (i.e., "0" in FIG. 16), (x, y+1) (i.e., "1" in FIG. 16), (x+3, y) (i.e., "2" in FIG. 16), and (x+3, y+1) (i.e., "3" in FIG. 16) index pairs by the first PMI may be specified (e.g., W1 or i_1).

In the case of the 3GPP Rel-13 Config 3 codebook, a precoding matrix set including four precoding matrices respectively having (x, y) (i.e., "0" in FIG. 16), (x+1, y+1)

(i.e., "1" in FIG. 16), (x+2, y) (i.e., "2" in FIG. 16), and (x+3, y+1) (i.e., "3" in FIG. 16) index pairs by the first PMI (e.g., W1 or i_1) is specified.

In contrast, in the case of the Config 3 codebook according to the present invention, a precoding matrix set including four precoding matrices respectively having (x, y) (i.e., "0" in FIG. 16), (x+1, y+1) (i.e., "1" in FIG. 16), (x+4, y) (i.e., "2" in FIG. 16), and (x+5, y+1) (i.e., "3" in FIG. 16) index pairs by the first PMI (e.g., W1 or i_1) may be specified (in the case of o*1/2).

Alternatively, a precoding matrix set including four precoding matrices respectively having (x, y) (i.e., "0" in FIG. 16), (x+1, y+1) (i.e., "1" in FIG. 16), (x+6, y) (i.e., "2" in FIG. 16), and (x+7, y+1) (i.e., "3" in FIG. 16) index pairs by the first PMI (e.g., W1 or i_1) may be specified (in the case of o*1).

In the case of the 3GPP Rel-13 Config 4 codebook, a precoding matrix set including four precoding matrices respectively having (x, y) (i.e., "0" in FIG. 16), (x+1, y) (i.e., "1" in FIG. 16), (x+2, y) (i.e., "2" in FIG. 16), and (x+3, y) (i.e., "3" in FIG. 16) index pairs by the first PMI (e.g., W1 or i_1) is specified.

In contrast, in the case of the Config 4 codebook according to the present invention, a precoding matrix set including four precoding matrices respectively having (x, y) (i.e., "0" in FIG. 16), (x+1, y) (i.e., "1" in FIG. 16), (x+4, y) (i.e., "2" in FIG. 16), and (x+5, y) (i.e., "3" in FIG. 16) index pairs by the first PMI (e.g., W1 or i_1) may be specified (in the case of o*1/2).

Alternatively, a precoding matrix set including four precoding matrices respectively having (x, y) (i.e., "0" in FIG. 16), (x+1, y) (i.e., "1" in FIG. 16), (x+6, y) (i.e., "2" in FIG. 16), and (x+7, y) (i.e., "3" in FIG. 16) index pairs by the first PMI (e.g., W1 or i_1) may be specified (in the case of o*1).

The codebook configuration according to the present method is expressed into Equation 19 below in an equation form.

[Equation 19]

$$W^{(1)}_{m_1, m_2, n} = \frac{1}{\sqrt{2N_1 N_2}} \begin{bmatrix} v_{m_1} \otimes u_{m_2} \\ \varphi_n v_{m_1} \otimes u_{m_2} \end{bmatrix},$$ (4-0)

$$\varphi_n = \exp\left(\frac{j2\pi n}{4}\right), n = 0, 1, 2, 3$$

$$W^{(2)}_{m_1, m_2, m'_1, m'_2, n} = \frac{1}{2\sqrt{N_1 N_2}} \begin{bmatrix} v_{m_1} \otimes u_{m_2} & v_{m'_1} \otimes u_{m'_2} \\ \varphi_n v_{m_1} \otimes u_{m_2} & -\varphi_n v_{m'_1} \otimes u_{m'_2} \end{bmatrix},$$ (4-1)

$$\varphi_n = \exp\left(\frac{j2\pi n}{4}\right), n = 0, 1$$

In Equation 19, (4-0) indicates the final form of the rank 1 codebook, and (4-1) indicates the final form of the rank 2 codebook.

In the codebook according to Equation 19, in the case of (4-1) corresponding to rank 2, the pairs of values of (m_1, m_2, m'_1, m'_2) are defined as follows.

If (m_1,m_2)=k, (m'_1, m'_2)=l are defined, (k,l)={(0,0), (1,1), (2,2), (3,3), (0,1), (1,2), (0,3), (1,3)}. In this case, 0, 1, 2, and 3 are the same as the numbers of FIG. 16.

In FIG. 16, in Configs 3 and 4, the beam spacing of 0 and 1, 2 and 3 has been configured as O1 (i.e., the same as oversampling) or O1/2 (i.e., half of oversampling), and may be associated with an oversampling factor.

In this case, the oversampling factor may be previously set (or defined) as a separate value or a base station may set a specific value of the oversampling factor through higher layer signaling (e.g., RRC layer) with respect to a UE.

Furthermore, FIG. 16 illustrates the beam patterns of a W1 beam group with four beams in the case of N1>=N2, but the present invention is not limited thereto. In the case of N1<N2, patterns transposed from the beam patterns illustrated in FIG. 16 may also be used.

1-1. W1 Group with 8 Beams

A codebook configuration according to the present method is expressed into Equation 20 below in an equation form.

[Equation 20]

$$W^{(1)}_{m_1, m_2, n} = \frac{1}{\sqrt{2N_1 N_2}} \begin{bmatrix} v_{m_1} \otimes u_{m_2} \\ \varphi_n v_{m_1} \otimes u_{m_2} \end{bmatrix},$$ (4)

$$\varphi_n = \exp\left(\frac{j2\pi n}{4}\right), n = 0, 1, 2, 3$$

$$W^{(2)}_{m_1, m_2, n} = \frac{1}{2\sqrt{N_1 N_2}} \begin{bmatrix} v_{m_1} \otimes u_{m_2} & v_{m_1} \otimes u_{m_2} \\ \varphi_n v_{m_1} \otimes u_{m_2} & -\varphi_n v_{m_1} \otimes u_{m_2} \end{bmatrix},$$ (5)

$$\varphi_n = \exp\left(\frac{j2\pi n}{4}\right), n = 0, 1$$

In Equation 20, (4) indicates the final form of the rank 1 codebook, and (5) indicates the final form of the rank 2 codebook.

In the case of the codebook according to Equation 20, Rank 2 has a characteristic in that it is limited to the same beam selection only. Accordingly, feedback bits of W2 include 5 bits (3 bits: beam selection, 2 bits: co-phasing) in the case of Rank 1, and include 4 bits (3 bits: beam selection, 1 bit: co-phasing) in the case of rank 2.

A method of configuring a beam group of W1 may include using patterns of FIG. 17.

FIG. 17 is a diagram illustrating a W1 beam group with eight beams according to an embodiment of the present invention.

In FIG. 17, horizontality indicates a horizontal domain (or first domain) and verticality indicates a vertical domain (or second domain).

In FIG. 17, each box corresponds to a precoding matrix, and each box (i.e., precoding matrix) may be specified as a pair of a first dimension index m_1 and a second dimension index m_2.

In the case of the pattern 1 of the codebook, a precoding matrix set including eight precoding matrices respectively having (x, y), (x, y+2), (x+1, y+1), (x+1, y+3), (x+2, y), (x+2, y+2), (x+3, y+1), and (x+3, y+3) index pairs by the first PMI (e.g., W1 or i_1) may be specified.

In this case, x indicates a first dimension (e.g., horizontal dimension) index value, and y indicates a second dimension (e.g., vertical dimension) index value.

In the case of the pattern 2 of the codebook, a precoding matrix set including eight precoding matrices respectively having (x, y), (x, y+2), (x+1, y+1), (x+1, y+3), (x+2, y+1), (x+2, y+3), (x+3, y), and (x+3, y+2) index pairs by the first PMI (e.g., W1 or i_1) may be specified.

In the case of the pattern 3 of the codebook, a precoding matrix set including eight precoding matrices respectively having (x, y), (x, y+2), (x+1, y), (x+1, y+2), (x+2, y+1), (x+2, y+3), (x+3, y+1), and (x+3, y+3) index pairs by the first PMI (e.g., W1 or i_1) may be specified.

In the case of the pattern 4 of the codebook, a precoding matrix set including eight precoding matrices respectively having (x, y), (x, y+1), (x+1, y), (x+1, y+1), (x+2, y), (x+2, y+1), (x+3, y), and (x+3, y+1) index pairs by the first PMI (e.g., W1 or i_1) may be specified.

In the case of the pattern 5 of the codebook, a precoding matrix set including eight precoding matrices respectively having (x, y), (x, y+1), (x+1, y), (x+1, y+1), (x+2, y+2), (x+2, y+3), (x+3, y+2), and (x+3, y+3) index pairs by the first PMI (e.g., W1 or i_1) may be specified.

In the case of the pattern 6 of the codebook, a precoding matrix set including eight precoding matrices respectively having (x, y), (x+1, y), (x+2, y), (x+3, y), (x+4, y), (x+5, y), (x+6, y), and (x+7, y) index pairs by the first PMI (e.g., W1 or i_1) may be specified.

In the case of the pattern 7 of the codebook, a precoding matrix set including eight precoding matrices respectively having (x, y), (x+1, y), (x+2, y), (x+2, y+1), (x+3, y), (x+3, y+1), (x+4, y+1), (x+5, y+1) index pairs by the first PMI (e.g., W1 or i_1) may be specified.

In the case of the pattern 8 of the codebook, a precoding matrix set including eight precoding matrices respectively having (x, y), (x+1, y), (x+2, y), (x+3, y), (x+4, y+1), (x+5, y+1), (x+6, y+1), (x+6, y+1) index pairs by the first PMI (e.g., W1 or i_1) may be specified.

FIG. 17 illustrates specific beam spacings (beam spacing p1=1 of the first domain, beam spacing p2=1 of the second domain), but the present invention is not limited thereto. The beam spacing indicates spacing between adjacent beams (i.e., an index difference between beams) for each dimension.

In this case, the parameters (i.e., p1 and p2) of the beam spacings may be previously determined (or pre-defined) through an agreement with a base station or the base station may notify a UE of the parameters through higher layer signaling (e.g., RRC layer).

Furthermore, beam group spacing parameters (i.e., s1 and s2) may be previously determined (or pre-defined) through an agreement with a base station like the legacy codebook (i.e., s1=2, s2=2) or the base station may notify a UE of the beam group spacing parameters through higher layer signaling (e.g., RRC layer). The beam group spacing indicates spacing between adjacent beam groups (i.e., an index difference between beams belonging to a beam group) for each dimension.

Furthermore, in FIG. 17, a pattern including a complementary set (a portion not having a shadow in FIG. 17) of patterns (i.e., patterns 1, 2, 3, and 5) expressed in a partial set of a 4×4 (4 by 4) square may be evidently included in the W1 pattern.

For the association between the pattern of FIG. 17 and (4) and (5) of Equation 20, that is, codebook final equations, Rank 1 is described like (6) of Equation 21 below with respect to the pattern 1.

[Equation 21]

$$\{n = 0, 1, 2, 3 \mid W^{(1)}_{2i_{1,1}, 2i_{1,2}, n}, W^{(1)}_{2i_{1,1}+2, 2i_{1,2}, n}, \\ W^{(1)}_{2i_{1,1}+1, 2i_{1,2}+1, n}, W^{(1)}_{2i_{1,1}+3, 2i_{1,2}+1, n}, W^{(1)}_{2i_{1,1}, 2i_{1,2}+2, n}, \\ W^{(1)}_{2i_{1,1}+2, 2i_{1,2}+2, n}, W^{(1)}_{2i_{1,1}+1, 2i_{1,2}+3, n}, W^{(1)}_{2i_{1,1}+3, 2i_{1,2}+3, n}\} \quad (6)$$

In this case, i_1,1, i_1,2 are indices of W1. They may be extended (i.e., in this manner) and thus the patterns illustrated in FIG. 17 and the codebook for Rank 2 may be evidently extended and applied.

As another embodiment, a pattern expressed as by the combining of the pattern (refer to FIG. 14) of the legacy Rel-13 Class A codebook Configs 1-4 and repetition and extension on the 2D domain of the pattern may be used.

That is, a new W1 pattern with 8 beams, generated by the combining and repetitive extension of the W1 patterns with four beams of Rel-13 (refer to FIG. 14) may be used.

For example, the pattern 1 of FIG. 17 may be understood to be a pattern obtained by repeatedly extending the Rel-13 Codebook Config 3 (refer to FIG. 14) twice in the second domain. The pattern 6 of FIG. 17 may be understood to be a pattern obtained by repeatedly extending the Rel-13 Codebook Config 4 (refer to FIG. 14) twice in the first domain. Furthermore, the pattern 5 of FIG. 17 may be understood to be a pattern obtained by repeatedly extending the Rel-13 codebook Config 2 (refer to FIG. 14) on the first domain and the second domain.

The present invention is not limited to the patterns illustrated in FIG. 17. As another embodiment, the patterns illustrated in FIG. 17 may also include patterns configured through transposition on the 2D domain.

FIG. 18 is a diagram illustrating a W1 beam group with eight beams according to an embodiment of the present invention.

In FIG. 18, horizontality indicates a horizontal domain (or first domain) and verticality indicates a vertical domain (or second domain).

In FIG. 18, each box corresponds to a precoding matrix, and each box (i.e., the precoding matrix) may be specified as a pair of a first dimension index m_1 and a second dimension index m_2.

The pattern 9 and pattern 10 of FIG. 18 indicate W1 beam group patterns transposed from the patterns 4 and 6 of FIG. 17.

In the case of the pattern 9 of the codebook, a precoding matrix set including eight precoding matrices respectively having (x, y), (x, y+1), (x, y+2), (x, y+3), (x+1, y), (x+1, y+1), (x+1, y+2), and (x+1, y+3) index pairs by the first PMI (e.g., W1 or i_1) may be specified.

In this case, x indicates a first dimension (e.g., horizontal dimension) index value, and y indicates a second dimension (e.g., vertical dimension) index value.

In the case of the pattern 10 of the codebook, a precoding matrix set including eight precoding matrices respectively having (x, y), (x, y+1), (x, y+2), (x, y+3), (x, y+4), (x, y+5), (x, y+6), and (x, y+7) index pairs by the first PMI (e.g., W1 or i_1) may be specified.

1-2. W1 Group with 16 Beams

In this case, in the aforementioned method 1-1, rank 1 and rank 2 codebooks may be configured using Equations (4) and (5).

Accordingly, feedback bits of W2 are 6 bits (4 bits: beam selection, 2 bits: co-phasing) in the case of rank 1, and are 5 bits (4 bits: beam selection, 1 bit: co-phasing) in the case of rank 2.

A method of configuring a beam group of W1 may include using patterns of FIG. 19.

FIG. 19 is a diagram illustrating a W1 beam group with 16 beams according to an embodiment of the present invention.

In FIG. 19, horizontality indicates a horizontal domain (or first domain) and verticality indicates a vertical domain (or second domain).

In FIG. 19, each box corresponds to a precoding matrix, and each box (i.e., precoding matrix) may be specified as a pair of a first dimension index m_1 and a second dimension index m_2.

In the case of the pattern 1 of the codebook, a precoding matrix set having 16 precoding matrices respectively having (x, y), (x, y+1), (x, y+2), (x, y+3), (x+1, y), (x+1, y+1), (x+1, y+2), (x+1, y+3), (x+2, y), (x+2, y+1), (x+2, y+2), (x+2, y+3), (x+3, y), (x+3, y+1), (x+3, y+2), and (x+3, y+3) index pairs by the first PMI (e.g., W1 or i_1) may be specified.

In this case, x indicates a first dimension (e.g., horizontal dimension) index value, and y indicates a second dimension (e.g., vertical dimension) index value.

In the case of the pattern 2 of the codebook, a precoding matrix set having 16 precoding matrices respectively having (x, y), (x, y+1), (x+1, y), (x+1, y+1), (x+2, y+2), (x+2, y+3), (x+3, y+2), (x+3, y+3), (x+4, y), (x+4, y+1), (x+5, y), (x+5, y+1), (x+6, y+2), (x+6, y+3), (x+7, y+2), and (x+7, y+3) index pairs by the first PMI (e.g., W1 or i_1) may be specified.

In the case of the pattern 3 of the codebook, a precoding matrix set having 16 precoding matrices respectively having (x, y), (x, y+1), (x+1, y), (x+1, y+1), (x+2, y), (x+2, y+1), (x+3, y), (x+3, y+1), (x+4, y+2), (x+4, y+3), (x+5, y+2), (x+5, y+3), (x+6, y+2), (x+6, y+3), (x+7, y+2), and (x+7, y+3) index pairs by the first PMI (e.g., W1 or i_1) may be specified.

In the case of the pattern 4 of the codebook, a precoding matrix set having 16 precoding matrices respectively having (x, y), (x, y+2), (x+1, y+1), (x+1, y+3), (x+2, y), (x+2, y+2), (x+3, y+1), (x+3, y+3), (x+4, y), (x+4, y+2), (x+5, y+1), (x+5, y+3), (x+6, y), (x+6, y+2), (x+7, y+1), and (x+7, y+3) index pairs by the first PMI (e.g., W1 or i_1) may be specified.

In the case of the pattern 5 of the codebook, a precoding matrix set having 16 precoding matrices respectively having (x, y), (x, y+1), (x+1, y), (x+1, y+1), (x+2, y), (x+2, y+1), (x+3, y), (x+3, y+1), (x+4, y), (x+4, y+1), (x+5, y), (x+5, y+1), (x+6, y), (x+6, y+1), (x+7, y), and (x+7, y+1) index pairs by the first PMI (e.g., W1 or i_1) may be specified.

In the case of the pattern 6 of the codebook, a precoding matrix set having 16 precoding matrices respectively having (x, y), (x+1, y), (x+1, y+1), (x+2, y), (x+2, y+1), (x+2, y+2), (x+3, y), (x+3, y+1), (x+3, y+2), (x+3, y+3), (x+4, y+1), (x+4, y+2), (x+4, y+3), (x+5, y+2), (x+5, y+3), and (x+6, y+3) index pairs by the first PMI (e.g., W1 or i_1) may be specified.

In the case of the pattern 7 of the codebook, a precoding matrix set having 16 precoding matrices respectively having (x, y), (x, y+2), (x+1, y), (x+1, y+2), (x+2, y+1), (x+2, y+3), (x+3, y+1), (x+3, y+3), (x+4, y), (x+4, y+2), (x+5, y), (x+5, y+2), (x+6, y+1), (x+6, y+3), (x+7, y+1), and (x+7, y+3) index pairs by the first PMI (e.g., W1 or i_1) may be specified.

In the case of the pattern 8 of the codebook, a precoding matrix set having 16 precoding matrices respectively having (x, y), (x, y+2), (x+1, y+1), (x+1, y+3), (x+2, y+1), (x+2, y+3), (x+3, y), (x+3, y+2), (x+4, y), (x+4, y+2), (x+5, y+1), (x+5, y+3), (x+6, y+1), (x+6, y+3), (x+7, y+0), and (x+7, y+2) index pairs by the first PMI (e.g., W1 or i_1) may be specified.

FIG. 19 illustrates specific beam spacings (beam spacing p1=1 of the first domain, beam spacing p2=1 of the second domain), but the present invention is not limited thereto.

In this case, the parameters (i.e., p1 and p2) of the beam spacings may be previously determined (or pre-defined) through an agreement with a base station or the base station may notify a UE of the parameters through higher layer signaling (e.g., RRC layer).

Furthermore, as in the legacy codebook (i.e., s1=2, s2=2), beam group spacing parameters (i.e., s1 and s2) may be previously determined (or pre-defined) through an agreement with a base station or the base station may notify a UE of the beam group spacing parameters through higher layer signaling (e.g., RRC layer).

Furthermore, in FIG. 19, a pattern configured as a complementary set (a portion not having a shadow in FIG. 19) of patterns (i.e., patterns 2, 3, 4, 7, and 8) expressed as a partial set of a 4×4 (4 by 4) square may also be evidently included in the W1 pattern. Furthermore, the final codebook may be expressed by easily extending (6) of Equation 21.

As another embodiment, a pattern expressed as the combining of the patterns (refer to FIG. 14) of the legacy Rel-13 Class A codebook Configs 1-4 and repetition and extension on the 2D domain of the pattern may be used.

That is, a new W1 pattern with 16 beams may be used by the combination and repetitive extension of the W1 patterns with four beams of Rel-13 (refer to FIG. 14).

For example, the pattern 1 of FIG. 19 may be understood to be a pattern obtained by repeatedly extending the Rel-13 codebook Config 2 (refer to FIG. 14) four times in the first domain and the second domain.

The present invention is not limited to the patterns illustrated in FIG. 19. As another embodiment, patterns transposed from the patterns illustrated in FIG. 19 on the 2D domain may also be used.

In the codebook design using a dual codebook structure, various patterns of codebooks forming W1 have been described.

A base station may notify which W1 of the codebooks will be used through higher layer signaling (e.g., RRC layer signaling). That is, the base station may notify a UE of a codebook configuration (or codebook/beam pattern).

Alternatively, the codebook proposed in the present invention includes various numbers of beams (e.g., 8 or 16 (1 or 4 in the case of the 3GPP Rel-13 LTE codebook)) within a beam group forming W1. If codebooks are divided into different numbers of W1 beams, a base station may notify a UE of the number of beams within a group of beams forming W1 through higher layer signaling (e.g., RRC layer signaling). For example, the 3GPP Rel-13 codebook Config 1 and codebook Config 2 and the codebooks of the pattern 4 of FIG. 17 and pattern 1 of FIG. 19 proposed in the present invention correspond to the numbers 1, 4, 8, and 16 of W1 beams, respectively. Accordingly, the base station may notify the UE of the number of W1 beams through higher layer signaling (e.g., RRC layer signaling).

Furthermore, the codebooks proposed in the present invention may be used for a W1 only feedback codebook. More specifically, this means that if the W1 only feedback codebook is configured, the operation of a UE is restricted so that it does not report beam selection and co-phasing feedback to a base station, but reports only beam group feedback.

The W1 only feedback codebook means a codebook for indicating a specific beam group including one or more beams, and may play the role of W1 in the structure of a dual codebook.

In this case, only a PMI corresponding to a beam group may be reported or a CQI may also be reported (in this case, an operation, such as 5-c below).

Furthermore, if an RI is also reported, an operation of 5-b below may be performed.

1) The W1 only feedback codebook may be used as a CDI codebook that provides notification of the direction of a UE in a long term in a hybrid CSI-RS operation of providing notification of the location of the UE in the long term and performing beam fining in a short term.

2) If the speed of a UE is fast, for performance improvements of an open-loop scheme, the W1 only feedback codebook may be used in a semi-open loop operation used to report PMI information of a UE in a long term.

More characteristically, the W1 only feedback codebook may be used to select a beam group in a long term and to operate as an open loop scheme through the cycling of a beam (or co-phasing and combining) within a selected beam group.

3) The W1 only feedback codebook may be used as a (base) vector group that is linearly combined in a linear combination (LC) codebook described as another use case.

4) In the case of the W1 only codebook proposed in the present invention, a base station may notify a UE of the following contents through higher layer signaling (e.g., RRC layer signaling).

A) In order to configure the aforementioned 2D DFT codebook, a base station may notify a UE of N_1, N_2, O_1, and O_2 that determine the size of all of codebooks.

B) A base station may notify a UE of a codebook configuration. That is, the base station may notify the UE that a group is formed of how many beams in the 2D or 1D grid of beam (GoB) and which pattern (i.e., a codebook configuration) is used.

i) In this case, a specific beam group may be a beam group including closely spaced beams within the 2D GoB represented as Rel-13 or may be a beam group including widely spaced beams within the 2D GoB like the characteristics of the Rel-12 4 Tx codebook. Alternatively, only beams of a specific domain (e.g., vertical/horizontal) may be a widely spaced beam group.

Alternatively, the beam spacing parameter (i.e., p1, p2), that is, a parameter indicative of beam spacing within a beam group, may be previously determined (or pre-defined) through an agreement with a base station or the base station may notify a UE of the beam spacing parameter through higher layer signaling (e.g., RRC signaling).

ii) In the case of a codebook in which a beam pattern indicates a beam group pattern including closely spaced beams in the 1D as in the Rel-13 Codebook Config 4, a base station may notify a UE of a codebook configuration by signaling the number of beams forming a beam group to the UE.

iii) In the case of a specific 8 or 16 beam pattern, if beam group skipping/spacing is set to (s1, s2)=(2,2) according to the existing Rel-13, too many beam groups may overlap.

In order to solve this problem, a base station may notify a UE of s1 and s2 through higher layer signaling (e.g., RRC signaling).

5) The codebook proposed in the present invention may have a major object of transferring PMI information.

Accordingly, a UE in which the W1 only codebook has been configured may assume Rank 1 restriction and select the best PMI. Furthermore, the UE may report a beam group to which the selected best PMI belongs to a base station. That is, the UE in which the W1 only codebook has been configured may report only PMI information.

A) In the use case of 2), in order to obtain beam cycling diversity, a base station may signal (set) the number of beam groups "B" to be reported by a UE, so the UE may report B beam groups to the base station.

i) In this case, the UE may report the beam groups to the base station so that the reported beam groups do not overlap. Alternatively, the base station may set s1 and s2 so that the beam groups reported by the UE do not overlap. Accordingly, the UE may not expect that the beam groups of a configured codebook overlap.

B) When the W1 only codebook is used, if an RI is reported, a UE may set (p1, p2)=(O1, O2) or positive number times of O1, O2 so that beams forming a beam group are orthogonal.

C) When the W1 only codebook is used, if a CQI is reported, a UE may calculate the CQI using a leading beam (i.e., a beam having the strongest beam) of a beam group or may report a representative value (e.g., the mean value of CQIs calculated as beams within a beam group or a CQI using a beam located at a specific location within a beam group) of a beam group previously agreed with a base station. Such a CQI is a CQI value characteristically representative of a wideband, and a base station may use the CQI as an object, such as wideband scheduling.

2. Linear Combination Codebook (LC Codebook)

Compared to the aforementioned method 1 of increasing the beam group of W1 ("Extension of dual codebook"), a method 2 is a method of generating a finer beam by linearly combining (not excluding a case where one beam to which an amplitude/power coefficient and/or a phase coefficient is applied is selected) a plurality of beams selected in a given legacy W1 beam group (e.g., a beam group including four beams of the Config 2-4 illustrated in FIG. 14 or the W1 beam group proposed in "1. Extension of dual codebook").

That is, in order to incorporate a multipath channel between a base station and a UE more accurately, the UE may generate a finer beam for the multipath channel by linearly combining beams into which a channel for each link within the multipath is reflected.

This is expressed into Equation 22 below in an equation form.

[Equation 22]

$$W_{k,n}^{(1)} = \frac{1}{\sqrt{2\|a_k\|^2}} \begin{bmatrix} a_k \\ \varphi_n a_k \end{bmatrix}, \varphi_n = \exp\left(\frac{j2\pi n}{4}\right), n = 0, 1, 2, 3$$

$$W_{k,n}^{(2)} = \frac{1}{2\|a_k\|^2} \begin{bmatrix} a_k & a_k \\ \varphi_n a_k & -\varphi_n a_k \end{bmatrix}, \varphi_n = \exp\left(\frac{j2\pi n}{4}\right), n = 0, 1$$

where $$a_k = \sum_{i=1}^{N} c_{i,k} \exp(j\theta_{i,k}) b_i, c_{i,k} (0 \leq c_{i,k} \leq 1)$$

is an amplitude coefficient, N is a number of beams $\theta_i$ is a phase coefficient, $b_i \in \{(m_1,m_2)|v_{m_1} \otimes u_{m_2}\}$ is an 2d DFT vector.

In Equation 22, WA(1) indicates a rank 1 codebook, and WA(2) indicates a rank 2 codebook.

N is the number of beams (i.e., the number of beams participating in a linear combination), and a subscript k indicates the index of combined beams.

b_i is a 2 dimension DFT vector, and may include the Kronecker product of v_m_1 and u_m_2.

m_1, m_2, that is, subscripts, indicate indices for the selection of DFT vectors in the horizontality and verticality (or the 1st and 2nd domains). That is, a first matrix (or first vector) (e.g., a matrix (or vector) of a horizontal component) v_m_1 for a first dimension antenna port may be specified by index m_1 of the first dimension, and a second matrix (or second vector) (e.g., a matrix (or a vector) of a vertical component) u_m_2 for a second dimension antenna port may be specified by index m_2 of the second dimension. Furthermore, b_i may be generated as the Kronecker product of v_m_1 and u_m_2.

Furthermore, a subscript n indicates co-phasing.

$c_{i,k}(0 \le c_{i,k} \le 1)$ is an amplitude/power coefficient (amplitude/power coefficient).

$\theta_{i,k}$ is a phase coefficient.

$\|a\_k\|$ indicates norm operation of a vector a_k.

Equation 22 is the most general form of a linear combination. In Equation 22, a parameter to be controlled includes two factors of an amplitude/power $c_{i,k}$ and a phase $\theta_{i,k}$.

A UE may report its preferred precoding matrix to a base station. In this case, the UE may determine the preferred precoding matrix by linearly combining each of plural b_i (i.e., a codeword, beam) to which an amplitude/power coefficient $c_{i,k}$ and/or a phase coefficient $\theta_{i,k}$ has been applied.

That is, in order to report the preferred precoding matrix to a base station, the UE may report information for specifying (i.e., a PMI, for example, "i_1", that is, a first PMI) plural b_i (i.e., a codeword, beam) participating in (used for) a linear combination to the base station. As described above, b_i is generated as the Kronecker product of v_m_1 and u_m_2, and v_m_1 and u_m_2 are specified as m_1 and m_2, respectively. That is, m_1 and m_2 may be determined by a PMI (e.g., "i_1", that is, the first PMI), and thus b_i may be specified.

Furthermore, the UE may report information for specifying an amplitude/power coefficient $c_{i,k}$ and/or a phase coefficient $\theta_{i,k}$ for each b_i (i.e., codeword, beam) participating in (used for) a linear combination to the base station.

One or more of the information for specifying b_i (i.e., a codeword, beam), the information for specifying an amplitude/power coefficient $c_{i,k}$, and the information for specifying a phase coefficient $\theta_{i,k}$ may be jointly encoded and reported to the base station. The pieces of information may be independently reported to the base station.

In this case, as base information for enabling a UE to select $c_{i,k}$ and/or $\theta_{i,k}$, a base station may notify a UE of information about $c_{i,k}$ and $\theta_{i,k}$ (e.g. sizes (e.g., the size of available values as $c_{i,k}$ and $\theta_{i,k}$) and a configuration method to be described later) through higher layer signaling (e.g., RRC signaling) systematically or independently or the information may be previously agreed and determined between the base station and the UE.

For example, W1 in the case of N=4 may correspond to the legacy Rel-13 codebook Configs 2-4 (refer to FIG. 14). Furthermore, W1 in the case of N=4 may correspond to Configs 2-4 (refer to FIG. 16) proposed in the present invention. Furthermore, W1 in the case of N=8 may correspond to the patterns (i.e., Configs) 1-10 (refer to FIG. 17 and FIG. 18) proposed in the present invention. Furthermore, W1 in the case of N=16 may correspond to the Configs 1-8 (refer to FIG. 19) proposed in the present invention.

2-1. Amplitude Control for Linear Combination (LC)

In accordance with this method, only an amplitude/power coefficient may be applied to b_i (i.e., codeword, beam) participating in a linear combination.

In accordance with this method, in Equation 22, a_k is given like Equation 23 below.

[Equation 23]

$$a_k = \sum_{i=1}^{N} c_{i,k} b_i, \; c_{i,k}(0 \le c_{i,k} \le 1)$$

In this case, according to a method of quantizing $c_{i,k}$, a UE may determine codebook feedback bits necessary to report its selected a_k (and $c_{i,k}$) to a base station.

For example, if $c_{i,k}$ is 1 bit quantization, {0,1} or {0.5, 1} may be used.

This may be generalized into $$c_{i,k} \in \left\{0, \frac{1}{2^L-1}, \frac{1}{2^L-1}2, \frac{1}{2^L-1}3, \ldots, 1\right\} \text{ or}$$

$$c_{i,k} \in \left\{\frac{1}{2^L}, \frac{1}{2^L}2, \frac{1}{2^L}3, \ldots, 1\right\}.$$

In this case, L corresponds to the number of quantization bits per coefficient.

That is, available values of $c_{i,k}$ may include an amplitude/power between a pre-defined upper limit and lower limit (e.g., between 1 and 0, or 1 and 1/2^L)) equally divided in a 2^L number. A UE selects one of the available values of $c_{i,k}$ for each b_i (i.e., codeword, beam) and report it a base station.

If $c_{i,k} \in \{0,1\}$, it corresponds to combining beam selection and equal power combining is performed. In this case, a case where all of beams are 0 may be excluded (i.e., $c_{i,k}=0 \; \forall i$).

One embodiment if N=4 is the same as Table 20.

Table 20 illustrates beam combining according to an embodiment of the present invention.

TABLE 20

|    | ci1 | ci2 | ci3 | ci4 |
|----|-----|-----|-----|-----|
| 0  | 1   | 0   | 0   | 0   |
| 1  | 0   | 1   | 0   | 0   |
| 2  | 0   | 0   | 1   | 0   |
| 3  | 0   | 0   | 0   | 1   |
| 4  | 1   | 1   | 0   | 0   |
| 5  | 1   | 0   | 1   | 0   |
| 6  | 1   | 0   | 0   | 1   |
| 7  | 0   | 1   | 0   | 1   |
| 8  | 0   | 1   | 1   | 0   |
| 9  | 0   | 0   | 1   | 1   |
| 10 | 1   | 1   | 1   | 0   |
| 11 | 1   | 1   | 0   | 1   |
| 12 | 1   | 0   | 1   | 1   |
| 13 | 0   | 1   | 1   | 1   |
| 14 | 1   | 1   | 1   | 1   |

Table 20 may include beam combinings 0, 1, 2, and 3. That is, only one beam may be selected in a W1 beam group including four beams. Accordingly, a codebook according to the present method includes a legacy codebook (i.e., single beam selection+co-phasing).

In this case, the consumption of one codeword may occur because a total number of cases that may be combined within the W1 beam group is not an exponent of 2 (i.e., since the number of cases is 15, 0 to 14 are indexed in Table 20). To this end, a codebook can be designed without the consumption of a codeword by adding specific combinings (e.g., (1, 1, 0.5, 0.5)).

Furthermore, from a codebook's viewpoint, it will be more preferred in a narrow beam forming aspect by placing restriction on the number of codewords participating in combining rather than configuring a new linear codeword using all of given four beams.

Accordingly, a maximum number of beams participating in a linear combination may be limited to a specific value (e.g., 2), and an embodiment thereof may include Table 21.

Table 21 illustrates beam combining according to an embodiment of the present invention.

TABLE 21

|   | ci1 | ci2 | ci3 | ci4 |
|---|-----|-----|-----|-----|
| 0 | 1   | 0   | 0   | 0   |
| 1 | 0   | 1   | 0   | 0   |
| 2 | 0   | 0   | 1   | 0   |
| 3 | 0   | 0   | 0   | 1   |
| 4 | 1   | 1   | 0   | 0   |
| 5 | 0   | 1   | 1   | 0   |
| 6 | 1   | 0   | 0   | 1   |
| 7 | 0   | 1   | 0   | 1   |

Table 21 corresponds to a case where the number of bits for beam combining (i.e., the number of bits for specifying beams (i.e., codeword, b_i) participating in the beam combining and an amplitude/power coefficient applied to each beam) is 3 and a maximum number of beams participating in the linear combination is 2.

Alternatively, more generally, a subset of Table 20 may be configured. That is, in Table 20, to configure a codebook using linear combinations {0,1,2,3,10,11,12,13} may also be taken into consideration.

Meanwhile, the examples of Table 20 and Table 21 illustrate a case where $c_{i,k}$ is 0 or 1, for convenience of description, but the present invention is not limited thereto.

If $c_{i,k}$ has a value other than 0 and 1, a weighted sum form appears between combined beams. Beamforming and a beam gain in more various directions can be achieved.

2-2. Phase Control for Linear Combination

In accordance with this method, only a phase may be applied to b_i (i.e., a codeword, beam) participating in a linear combination.

In accordance with this method, in Equation 22, a_k is given as in Equation 24.

[Equation 24]

$$a_k = \sum_{i=1}^{N} \exp(j\theta_{i,k}) b_i$$

In this case, codebook feedback bits necessary to report a_k (and $\theta_{i,k}$) selected by a UE to a base station may be determined in accordance with a method of quantizing $\theta_{i,k}$. In the case of the method, since $c_{i,k}$ is not applied to b-i participating in a linear combination, N beams (i.e., b_i) having equal power are linearly combined.

For example, if $\theta_{i,k}$ is 1 bit quantization, {0,π/2} or {0,π} may be used.

If this is generalized, this corresponds to $$\theta_{i,k} \in \left\{\frac{2\pi}{2^L}, \frac{2\pi}{2^L}2, \frac{2\pi}{2^L}3, \ldots, 2\pi\right\} \text{ or }$$

$$\theta_{i,k} \in \left\{\phi_1 + \frac{\phi_2 - \phi_1}{2^L - 1}, \phi_1 + \frac{\phi_2 - \phi_1}{2^L - 1}2, \phi_1 + \frac{\phi_2 - \phi_1}{2^L - 1}3, \ldots, \phi_2\right\}.$$

In this case, L corresponds to the number of quantization bits per coefficient.

In this case, in the case of the second, $\phi_1, \phi_2$ indicates the lower limit and upper limit of phase coefficient of a linear combination, and an angle between the lower limit and upper limit is equally divided in a 2^L−1 number. That is, available values of $\theta_{i,k}$ may include angles equally divided between pre-defined upper limit and lower limit (e.g., $\phi_1, \phi_2$) in 2^L−1. A UE may select one of the available values of $\theta_{i,k}$ for each b_i (i.e., codeword, beam) and report it to a base station.

The base station may notify the UE of $\phi_1, \phi_2$ through higher layer signaling (e.g., RRC signaling) or $\phi_1, \phi_2$ may be previously determined (or pre-defined) through an agreement between the base station and the UE.

2-3. Both Amplitude and Phase Control for Linear Combination

The present method is a method of combining the aforementioned method 2-1 and method 2-2. That is, in accordance with this method, both an amplitude/power coefficient and a phase coefficient may be applied to b_i (i.e., a codeword, beam) participating in a linear combination.

In accordance with this method, there is an advantage in that all of beamformings capable of configuring N beams can be covered, but complexity such as feedback overhead may be the greatest.

In accordance with this method, a_k is given as in Equation 22.

In this case, according to a method of quantizing $c_{i,k}$ and $\theta_{i,k}$, codebook feedback bits necessary for a UE to report its selected a_k (and $c_{i,k}$, $\theta_{i,k}$) to a base station may be determined.

That is, for example, a linear combination may be configured by setting $c_{i,k} \in \{0.5,1\}$, $\theta_{i,k} \in \{0,\pi/2\}$. That is, the UE may report a value $c_{i,k}$ selected using 1 bit within a CSI to the base station.

For another example, an example in which beam combining is restricted to 4 bits may include Table 22 and Table 23.

Table 22 illustrates beam combinings according to an embodiment of the present invention.

TABLE 22

|    | ci1 | ci2 | ci3 | ci4 |
|----|-----|-----|-----|-----|
| 0  | 1   | 1   | 1   | 1   |
| 1  | 1   | 1   | 1   | −1  |
| 2  | 1   | 1   | −1  | 1   |
| 3  | 1   | 1   | −1  | −1  |
| 4  | 1   | −1  | 1   | 1   |
| 5  | 1   | −1  | 1   | −1  |
| 6  | 1   | −1  | −1  | 1   |
| 7  | 1   | −1  | −1  | −1  |
| 8  | 1   | 0   | 0   | 0   |
| 9  | 0   | 1   | 0   | 0   |
| 10 | 0   | 0   | 1   | 0   |
| 11 | 0   | 0   | 0   | 1   |
| 12 | 0   | 1   | 1   | 1   |
| 13 | 1   | 0   | 1   | 1   |
| 14 | 1   | 1   | 0   | 1   |
| 15 | 1   | 1   | 1   | 0   |

Table 23 illustrates beam combinings according to an embodiment of the present invention.

TABLE 23

|   | ci1 | ci2 | ci3 | ci4 |
|---|-----|-----|-----|-----|
| 0 | 1   | 0   | 0   | 0   |
| 1 | 0   | 1   | 0   | 0   |

TABLE 23-continued

|    | ci1 | ci2 | ci3 | ci4 |
|----|-----|-----|-----|-----|
| 2  | 0   | 0   | 1   | 0   |
| 3  | 0   | 0   | 0   | 1   |
| 4  | 1   | 1   | 0   | 0   |
| 5  | 1   | 0   | 1   | 0   |
| 6  | 1   | 0   | 0   | 1   |
| 7  | 0   | 1   | 0   | 1   |
| 8  | 0   | 1   | 1   | 0   |
| 9  | 0   | 0   | 1   | 1   |
| 10 | 1   | −1  | 0   | 0   |
| 11 | 1   | 0   | −1  | 0   |
| 12 | 1   | 0   | 0   | −1  |
| 13 | 0   | 1   | 0   | −1  |
| 14 | 0   | 1   | −1  | 0   |
| 15 | 0   | 0   | 1   | −1  |

Table 23 is an embodiment of a case where a maximum number of combined beams is restricted to 2 as in the previous 2-1 method. In this case, in the beam combinings 10-15, "−1" may be set as a specific value (e.g., $\exp(j\frac{\pi}{2})$ or $\exp(j\frac{\pi}{4})$).

As another embodiment of the present method, a method of combining a specific one beam with maximum power (i.e., 1) and combining the remaining beams as relative power (e.g., power equal to or smaller than maximum power) may be taken into consideration.

That is, a first amplitude/power coefficient applied to a specific first b_j is previously determined to be max power (i.e., 1), and an amplitude/power coefficient value smaller than the first amplitude/power coefficient may be applied to another b_i.

In this case, the amplitude/power coefficient value applied to another b_i may be indicated by the first amplitude/power coefficient versus a relative value (e.g., 0.5).

This is expressed into Equation 25 in an equation form.

[Equation 25]

$$a_k = b_j + \sum_{i=1, j \neq 1}^{N} c_{i,k} b_i,$$

where $c_{i,k} \in \{0, \varepsilon\}$, $\varepsilon$ is a complex number with $|\varepsilon|<1$ In Equation 25, E, that is, a specific weight value, is a complex number that is $|\varepsilon|<1$, and $c_{i,k}$ may have a value belonging to $\{0,\varepsilon\}$. Equation 25 illustrates a case where the size of $\varepsilon$ is $|\varepsilon|<1$. This is for convenience of description in which an amplitude/power coefficient for a b_i beam may be set as a relative value compared to maximum amplitude/power (i.e., 1) applied to b_j, but the present invention is not limited thereto. That is, the size of E may also include 1 (i.e., maximum amplitude/power).

A base station may signal E to a BE through a higher layer (e.g., RRC layer) or c may be previously determined (or pre-defined) through an agreement between the base station and the UE.

Accordingly, a linear combination fed back by the UE includes beams combined as max power (i.e., 1) and beams to which $c_{i,k}$ has been applied.

In accordance with Equation 25, maximum power/amplitude (i.e., the first amplitude/power coefficient value is 1) may be applied to a specific first b_j, and a maximum power/amplitude (i.e., 1) versus a relative power/amplitude (i.e., the first amplitude/power coefficient versus a relative amplitude/power coefficient value) may be applied to another b_i. Furthermore, a UE may generate (specify) its preferred precoding matrix based on a linear combination of an amplitude/power coefficient and/or a plurality of beams (i.e., b_j and b_i) to which a phase coefficient has been applied.

Table 24 shows one embodiment of a method expressed as Equation 25 and shows that $\varepsilon=-0.5$ (i.e., 1 applied to a specific b_j versus a relative value).

Table 24 illustrates beam combinings according to an embodiment of the present invention.

TABLE 24

|    | ci1  | ci2  | ci3  | ci4  |
|----|------|------|------|------|
| 0  | 1    | 0    | 0    | 0    |
| 1  | 0    | 1    | 0    | 0    |
| 2  | 0    | 0    | 1    | 0    |
| 3  | 0    | 0    | 0    | 1    |
| 4  | 1    | −0.5 | 0    | 0    |
| 5  | 1    | 0    | −0.5 | 0    |
| 6  | 1    | 0    | 0    | −0.5 |
| 7  | 0    | 1    | 0    | −0.5 |
| 8  | 0    | 1    | −0.5 | 0    |
| 9  | 0    | 0    | 1    | −0.5 |
| 10 | −0.5 | 1    | 0    | 0    |
| 11 | −0.5 | 0    | 1    | 0    |
| 12 | −0.5 | 0    | 0    | 1    |
| 13 | 0    | −0.5 | 0    | 1    |
| 14 | 0    | −0.5 | 1    | 0    |
| 15 | 0    | 0    | −0.5 | 1    |

As another embodiment, Table 25 may be described. Table 25 is characterized in that the number of beams participating in a linear combination is restricted to 2 and single beam selection within a beam group is also included as in the example of Table 22 and Table 23.

Table 25 illustrates beam combinings according to an embodiment of the present invention.

TABLE 25

|    | ci1 | ci2 | ci3 | ci4 |
|----|-----|-----|-----|-----|
| 0  | 1   | 0   | 0   | 0   |
| 1  | 0   | 1   | 0   | 0   |
| 2  | 0   | 0   | 1   | 0   |
| 3  | 0   | 0   | 0   | 1   |
| 4  | 1   | 1   | 0   | 0   |
| 5  | 1   | 0   | 1   | 0   |
| 6  | 1   | 0   | 0   | 1   |
| 7  | 0   | 1   | 0   | 1   |
| 8  | 0   | 1   | 1   | 0   |
| 9  | 0   | 0   | 1   | 1   |
| 10 | 1   | −1  | 0   | 0   |
| 11 | 1   | 0   | −1  | 0   |
| 12 | 1   | 0   | 0   | −1  |
| 13 | 0   | 1   | 0   | −1  |
| 14 | 0   | 1   | −1  | 0   |
| 15 | 0   | 0   | 1   | −1  |
| 16 | 1   | j   | 0   | 0   |
| 17 | 1   | 0   | j   | 0   |
| 18 | 1   | 0   | 0   | j   |
| 19 | 0   | 1   | 0   | j   |
| 20 | 0   | 1   | j   | 0   |
| 21 | 0   | 0   | 1   | j   |
| 22 | 1   | −j  | 0   | 0   |
| 23 | 1   | 0   | −j  | 0   |
| 24 | 1   | 0   | 0   | −j  |
| 25 | 0   | 1   | 0   | −j  |

TABLE 25-continued

|    | ci1 | ci2 | ci3 | ci4 |
|----|-----|-----|-----|-----|
| 26 | 0   | 1   | −j  | 0   |
| 27 | 0   | 0   | 1   | −j  |

Table 25 illustrates a case where {1, j, −1, −j} is used as a beam combination coefficient (i.e., an amplitude/power coefficient $c_{i,k}$ and a phase coefficient $\theta_{i,k}$), but the present invention is not limited thereto. The beam combination coefficient may have various values.

Meanwhile, the aforementioned one and the beam combination coefficient may be configured as $$c_{i,k} \in \left\{0, \frac{1}{2^L-1}, \frac{1}{2^L-1}2, \frac{1}{2^L-1}3, \ldots, 1\right\}$$

in Equation 22 or configured as $$\theta_{i,k} \in \left\{\frac{2\pi}{2^L}, \frac{2\pi}{2^L}2, \frac{2\pi}{2^L}3, \ldots, 2\pi\right\}$$

or may include two combinations.

That is, available values of $c_{i,k}$ may include amplitude/power equally divided between a pre-defined upper limit and lower limit (e.g., between 1 and 0) in a 2^L number. A UE may select one of the available values of $c_{i,k}$ for each b_i (i.e., a codeword, beam) and report it a base station.

Furthermore, likewise, the available values of $\theta_{i,k}$ may include angles equally divided in a 2^L number between a pre-defined upper limit and lower limit (e.g., between 2π and 2π/2^L). A UE may select one of the available values of $\theta_{i,k}$ for each b_i (i.e., a codeword, beam) and report it to a base station.

The base station may notify the UE of a value (or 2^L or 2^(L+1)) of L that determines resolution (i.e., the number of available coefficient values) of the beam combination coefficient (i.e., the amplitude/power coefficient $c_{i,k}$ and the phase coefficient $\theta_{i,k}$) through higher layer signaling (e.g., RRC signaling).

FIG. 20 illustrates a graph indicating a codebook gain (i.e., a cumulative distribution function (CDF)) according to the number of beams participating in a linear combination according to an embodiment of the present invention In the graph according to FIG. 20, a "baseline" shows the case of one beam selection, "LC (2 beams)" shows two-beam combining, and "LC (4 beams)" shows four-beam combining.

Metric used in the graph of FIG. 20 is $10 \log_{10}\|Hp\|$. In this case, H is a normalized channel matrix, and P is the best PMI to maximize the metric. Furthermore, it has been assumed that Tx has 3D-Urban Micro (3D-UMi)/32-port and RX has 2-port. The present invention proposes restriction to two-beam combining because a gain according to the codebook has almost no metric performance difference between two-beam combining and the four-beam combining, as may be seen from the graph of FIG. 20.

Meanwhile, in a massive MIMO system in which the number of antennas is numerous, beams may be further narrowed. Accordingly, it may be advantageous to greater selection diversity by increasing the number of beams participating in a beam combination. Accordingly, a base station may notify a UE of the number of beams participating in (used for) a linear combination through higher layer signaling (e.g., RRC signaling). That is, the base station may notify the UE of a value of N of Equation 22 through higher layer signaling (e.g., RRC signaling).

In the case of the LC codebook proposed in the present method (i.e., "2. Linear combination codebook"), it may be combined with the codebook described in "1. Extension of dual codebook" and performed. More specifically, the LC codebook may be applied to a codebook having a dual codebook structure and including W2 of single beam selection and co-phasing.

More specifically, if an LC codebook using the existing W1 beam group is used, the number of beam selection+beam combining is 6*4 (beam selection $_4C_2$*2 beam combinings (1,j,−1,−j) in the example), and thus a total number of codewords is 24. Feedback thereof is 5 bits and thus eight states are wasted. Accordingly, the present invention proposes a method of joint-encoding legacy single beam selection with the four states of the remaining reserved eight states.

If an index for a beam selection portion (if M beams of N beams are selected and linear combining is performed on the M beams) is separately divided (e.g., i_21), i_21 may have a maximum of 3 bits ($_4C_2$) if the legacy codebook Configs 2-4 (refer to FIG. 14) are used.

In this case, the six states of the total number of eight states are used for beam selection. For example, one of the remaining two states may be selected and another codebook configuration (e.g., a legacy codebook configuration), that is, single beam selection and co-phasing operation, may be configured to be performed. Table 26 shows an example of such a configuration.

Table 26 illustrates beam combinings according to an embodiment of the present invention.

TABLE 26

| 3-bit states | Beam combining [b1, b2, b3, b4] |
|---|---|
| 000 | [b1, b2] |
| 001 | [b1, b3] |
| 010 | [b1, b4] |
| 011 | [b2, b3] |
| 100 | [b2, b4] |
| 101 | [b3, b4] |
| 110 | Flag for another (legacy) codebook (e.g., single beam selection + co-phasing) |
| 111 | Reserved |

In Table 26, the beam-combined b1, b2, b3, and b4 mean four beams forming a beam group of W1 selected based on a W1 index and the codebook Configs 2-4. For example, if a beam selection state "000" is fed back by a UE, a combination the first and second beams is performed.

Furthermore, if the state of "110" is fed back by a UE, a base station may recognize that the UE performs another codebook (e.g., legacy codebook) operation. Accordingly, a feedback operation regarding single beam selection and co-phasing may be performed by using 4 bits of the feedback bits of W2, for example.

That is, one beam of the b1, b2, b3, and b4 may be selected, and a co-phasing operation may be performed on $a_k=b_k$ (k=1,2,3,4) and the selected beam. Such an operation may be applied to all the ranks (e.g., ranks 1-8), but a corresponding rank may be restricted to 1-2 if MU-MIMO improvement is taken into consideration.

In the aforementioned example, a reserved state of all of states for beam selection has been described with respect to the case of the remaining M=2, but the present invention is not limited thereto. That is, for example, if M=3, 4, the same method as that described above may be applied by allocating a bit width for codebook performance improvement (performance improvement attributable to larger granularity).

Furthermore, in the case of the codebook Config 1, single beam selection and co-phasing operation may be performed on a new codebook (e.g., if W1 of the ranks 7-8 of the codebook Config 1 has been configured to be recognized as ranks 1-2).

Furthermore, a base station may notify a UE of information of M through higher layer signaling (e.g., RRC signaling). Alternatively, after the UE measures performance for all of codebooks, it may report information about M to the base station.

In the example, in the case of Rank 2, in order to maintain a correlation with Rank 1, the same beam selection, that is, beam combining of Rank 2 may be restricted to (1,1), (2,2), (3,3), and (4,4), and a UE may perform reporting using 3 bits. Alternatively, in the legacy rank 2, a UE may perform 4-bit reporting using all the number of eight cases {(1,1), (2,2), (3,3), (4,4), (1,2), (1,4), (2,3), (2,4)} of beam selection of W2.

As another method, in the feedback of a UE, i2, that is, the index of W2, may be split in line with a payload size. For example, i2, that is, the index of W2, may be split into i21 for beam selection, i22 for a coefficient, and i23 for co-phasing. In this case, compared to a case where pieces of information are joint-encoded, additional feedback bits may be caused because a legacy operation is additionally performed.

In this case, a UE may report co-phasing information about a legacy single beam pre-defined in the remaining two states. That is, the UE may select the pre-defined two beams of the four beams and report a co-phase for the pre-defined two beams.

For example, in the case of the Class A codebook Configs 2-4, there are four beams corresponding to each i_1. In the two beams of the four beams, for example, No. 1 and No. 4 (or No. 1 and No. 2, or No. 1 and No. 3, or No. 2 and No. 3, or No. 2 and No. 4, or No. 3 and No. 4) may be mapped to the "110" and "111" states of Table 16, respectively. Furthermore, feedback may be performed using only bits that belong to bits allocated to the remaining co-phasing and coefficient and that correspond to a co-phase (Rank 1 is 2 bits, and Rank 2 is 1 bit). In the above example, in order to maintain a correlation with Rank 1 in the case of Rank 2, the same operation may be performed by restricting the same beam selection, that is, beam combining of Rank 2, to (1,1), (2,2), (3,3), and (4,4). Alternatively, specific two of the eight cases {(1,1), (2,2), (3,3), (4,4), (1,2), (1,4), (2,3), (2,4)} of beam selection of the legacy rank 2 W2 may be set, and thus for example, (1,1) and (1,4) may be mapped to the "110" and "111" states, respectively.

The method, that is, single beam selection of the four beams and single beam selection of the two beams, may be applied systematically or independently for each rank.

The methods for various codebook designs have been described so far. A base station may configure that such codebooks may be used for a UE of which environment with respect to the UE through higher layer signaling (e.g., RRC signaling).

For example, the base station may notify the UE whether the codebook described in "1. Extension of dual codebook" is used, whether the extension codebook of simple Rel-13 (e.g., a codebook to which a new N1, N2, 01 or 02 value has been applied or a codebook to which s1, s2, p1 or p2 has been applied) is used, or whether the LC-based codebook proposed in "2. Linear combination codebook" is used through higher layer signaling (e.g., RRC signaling).

In this case, a W1 beam group configuration when the LC codebook is used may be previously agreed and determined (or pre-defined) between a base station and a UE (e.g., one of the codebook Configs 2, 3, and 4 or a new beam group set), or the base station may additionally notify the UE of the W1 beam group configuration through higher layer signaling (e.g., RRC signaling).

1) W1 Beam Group for LC Based Codebook

In the case of the above proposed LC codebook, how a beam combination will be performed with respect to fixed W1 has been proposed.

Hereinafter, a method of configuring a W1 group is proposed.

Alt 1. Reuse W1 in the Rel-13 Codebook Configs):

In accordance with this method, W1 corresponding to the codebook configuration configured in Rel-13 or Rel-14 may be used without any change.

Alt 2. in the case of a UE configured with LC, a specific beam spacing parameter is used:

In the case of rank 1-2 defined in Rel-13, (p1, p2)=(1,1) is set (refer to FIG. 14) other than a case where the codebook Config 2, N1<=N2. If a beam group corresponding to W1 of the Rel-13 codebook is used without any change, when the size of antenna ports is increased, phase spacing of four beams (corresponding to the codebook Configs 2, 3, 4) forming W1 becomes very small. That is, close beams in similar directions are combined to generate a new beam. To use the beam generated as described above may not be sufficient in using a beam formed of LC as a PMI in the condition in which a beam coefficient is restricted.

To this end, in the case of a UE configured with LC, the W1 pattern complies with a codebook configuration. In this case, a configuration of (p_1, p_2)=(O_1, O_2) is proposed. In this case, in the case of the codebook Configs 2, 3, and 4 (or a W1 pattern defined in ranks 3-4 of the Codebook Config 3), four beams forming W1 are orthogonal to each other. Although a restricted combining coefficient is used, there is an advantage in that combined beams of more various directions can be configured.

As another embodiment of this proposal, in the case of a UE configured with LC, the W1 pattern may comply with a codebook configuration, and a method of configuring only one domain parameter of p_1/p_2 as O_1/O_2 may be used. By configuring only one domain parameter as O_1/O_2 as described above, there is an effect in that beam spacing is further widened with respect to dominant beam directions for a UE from among 2D beams.

In this case, a base station may notify a UE that the configuration of p_1 or p_2 will be changed into O_1 or O_2 with respect to which domain through higher layer signaling (e.g., RRC signaling) or the configuration may be performed when N_1 or N_2 is set (e.g., p_1=O_1 if N_1>N_2, p_2=O_2 if not or p_1=O_1 if N_1<N_2 or p_2=O_2 if not).

Alternatively, a UE may measure an azimuth angle of arrival (AoA) and a zenith angle of arrival (ZoA) and report a domain that greatly affects its own beam directions, and reports them to a base station. Also, the UE may previously agree that the p_1, p_2 parameter is set as (p_1=O_1) or (p_2=O_2) or (p_1,p_2)=(O_1,O_2) with the base station. Or, the base station may set p_1, p_2 with respect to a UE through higher layer signaling (e.g., RRC signaling) based on information reported by the UE.

In the case of the configured method, p_1, p_2 may be differently set for each rank for the diversity of each combined beam.

If the aforementioned Alt2 method is used, a 2D beam grid (GoB) configured as N_1, N_2, O_1, O_2 may not be fully covered because p_1, p_2 is increased. That is, the reason for this is that s_1, s_2 is set to (2,2) in the codebook of Rel-13. To this end, if an LC codebook is configured in a UE, a base station may newly configure s_1, s_2 through higher layer signaling (e.g., RRC signaling) or a specific value (e.g., (s_1,s_2)=(1,1)) may be agreed and determined between the base station and the UE.

Furthermore, the method of setting p_1, p_2 (and/or s_1,s_2) may be configured through DCI or layer (L2) (e.g., MAC layer) signaling in order to dynamically p_1, p_2.

In the case of a UE in which LC codebook (or advanced CSI reporting) has been configured/applied, the W1 configuration method for the LC codebook configuration has been described in Alt 1 and Alt2.

In this case, in the case of a UE in which Alt 1 (non-orthogonal beam group) has been configured, phase only LC (2-2 method) may be applied.

Furthermore, in the case of a UE in which Alt2 (orthogonal beam group) has been configured, LC (phase+amplitude LC) (2-3 method) to which both a phase and amplitude/power are applied may be applied.

Such an operation may be previously agreed between a base station and a UE.

In this case, a base station may notify a UE that which method of Alt 1 and Alt 2 is configured in the UE through higher layer signaling (e.g., RRC signaling).

If only one of Alt 1 and Alt 2 has been agreed (or pre-defined) to be used, the base station may notify the UE that which LC codebook of the aforementioned LC codebook (e.g., 2-2 method (phase only LC), 2-1 method (amplitude only LC), and 2-3 method (phase+amplitude LC)) is applied to the UE through higher layer signaling (e.g., RRC signaling).

2) LC Codebook Subset Restriction

Codebook subset restriction may also be applied as an object of controlling intercell interference if the LC codebook described in "2. Linear combination codebook" is to be used.

The LC codebook subset restriction may be performed as follows.

A) 2D beam restriction: the aforementioned LC codebook corresponds to a method of linearly combining beams within a given W1 beam group and performing W1 reporting.

In this case, 2D beams participating in the linear combination may be restricted. That is, a bitmap corresponding to all of the N_1*N_2*O_1*O_2 number of 2D beams (each bit corresponds to each 2D beam in a one-to-one manner) may be configured to restrict 2D beams participating in a linear combination. That is, a base station may notify a UE of a 2D beam available for a linear combination by transmitting a bitmap of an N_1*N_2*O_1*O_2 length to the UE.

i) Beam group restriction: if the LC codebook is used, although a 2D beam itself is restricted, there is a possibility that beams of beam directions restricted due to a linear combination may be generated. In order to fundamentally restrict this, beam group forming W1 may be restricted.

That is, a beam group available for a linear combination may be restricted by configuring the bitmap for the (N_1*O_1/s_1)*(N_2*O_2/s_2) indices of W1. That is, the base station may notify the UE of a 2D beam group available for the linear combination by transmitting the bitmap of the (N_1*O_1/s_1)*(N_2*O_2/s_2) length to the UE.

B) Rank restriction (1 bit indicator): the LC codebook has an object of MU-MIMO performance improvement and may be ambiguous in configuring the LC codebook in a high rank due to an orthogonality problem between beams formed of LC. Accordingly, the present invention proposes a codebook up to Rank 2. Accordingly, if codebook subset restriction is taken into consideration for each rank (i.e., if rank restriction is applied), a codebook corresponding to all the ranks may be restricted using a 1 bit indicator for each rank.

C) Specific coefficient restriction: a coefficient of LC may be limited in order to restrict the final beam configured with LC so that it is not directed toward specific directions.

For example, if a coefficient of LC has been previously agreed as {1, −1, j, −j} between a base station and a UE, the base station restricts a specific coefficient using a 4-bit bitmap, and the UE may not use the specific coefficient transmitted in the bitmap when performing LC. As a result, the final beam generated by LC may be restricted so that it is not directed toward specific directions.

D) the number of combining beam restriction: As the number of LC beams increases, sharp beam forming becomes difficult. It is advantageous to reduce the number of beams participating in LC in the case of a UE located in a cell edge. In this viewpoint, a base station may restrict the number of combining beams to codebook subset restriction.

For example, if a W1 beam group includes four beams, a base station may restrict the number of linearly combined beams using a 4-bit bitmap corresponding to {1,2,3,4}.

E) Combining coefficient restriction: as described above, in each condition/environment, for example, if both the amplitude/power combining method and the phase combining method are together supported, or if only the phase combining is desired, or if only the amplitude/power combining is desired, a coefficient combined using a 2-bit bitmap indicative of a phase LC/amplitude LC on/off may be limited.

Codebook subset restriction may be performed by applying the conditions (description) related to the LC codebook subset restriction described in A) to E) independently or systematically.

FIG. 21 is a diagram illustrating a method of transmitting and receiving channel state information according to an embodiment of the present invention.

Referring to FIG. 21, a UE receives a channel state information reference signal (CSI-RS) from an eNB through a multi-the antenna port (S2101).

The UE reports channel state information to the eNB (S2102).

In this case, the UE may generate (calculate) the channel state information based on the CSI-RS received from the eNB and report the channel state information to the eNB.

As described above, the channel state information may include a CQI, a PMI, an RI, a PTI, a CRI, etc.

Specifically, when the UE reports the PMI to the eNB, it may select its most preferred precoding matrix within the codebook for the reporting of the channel state information designed according to "1. Extension of dual codebook" and/or "2. Linear combination (LC) codebook" according to embodiments of the present invention, and may report a PMI for indicating the precoding matrix to the eNB.

Furthermore, as described above, the PMI may include the first PMI (i.e., W1, i_1) and the second PMI (i.e., W1, i_2), and a detailed description thereof is omitted.

In accordance with the method of "2. Linear combination (LC) codebook", a plurality of codewords (i.e., beam, b_i)

may be used to generate the precoding matrix (i.e., the most preferred precoding matrix) selected by the UE in the codebook for the reporting of the channel state information. In this case, the plurality of codewords may be specified by the channel state information (e.g., PMI).

Furthermore, after a power coefficient and/or a phase coefficient has been applied to each of the plurality of codewords, the precoding matrix may be generated based on a linear combination of the plurality of codewords to which the power coefficient and/or the phase coefficient has been applied.

The UE may report information about the power coefficient $c_{i,k}$ and/or the phase coefficient $\theta_{i,k}$ (e.g., the power coefficient and/or the phase coefficient value or an indication/index for identifying the power coefficient and/or the phase coefficient value) applied to each codeword to the eNB. In this case, the information about the power coefficient and/or the phase coefficient may be included in the channel state information.

In this case, a value available as the power coefficient and/or the phase coefficient may be equally divided and included between a specific upper limit and a specific lower limit. In this case, information indicative of the upper limit and the lower limit, the number of values available as the power coefficient and/or the phase coefficient, and one or more of bits necessary for the reporting of the power coefficient and/or the phase coefficient may be received from the eNB as the information for determining the value available as the power coefficient and/or the phase coefficient through higher layer signaling.

Furthermore, the power coefficient that belongs to codewords participating in (used for) the linear combination and that is applied to a specific codeword may be previously determined to be maximum power. The power coefficient applied to the remaining codewords may be determined to be a relative value for the maximum power. In this case, the UE may report information about the power coefficient applied to the remaining codewords (i.e., an indication/index for identifying the relative value for the maximum power) to the eNB. In this case, the information about the power coefficient applied to the remaining codewords may be included in the channel state information.

For example, if a precoding matrix is generated based on a linear combination of a first codeword and a second codeword, a first power coefficient applied to the first codeword may be previously determined (e.g., 1), and a second power coefficient applied to the second codeword may be determined to be a value relative to the first power coefficient. That is, the UE may include the information about the second power coefficient applied to the second codeword (i.e., an indication/index for identifying the value relative to the first power coefficient) in the channel state information, and may report the channel state information to an eNB. That is, the second power coefficient may be determined based on the channel state information reported from the UE to the eNB.

Furthermore, the number of codewords used for the linear combination may be pre-defined (e.g., 2). Alternatively, the number of codewords used for the linear combination may be received from the eNB through higher layer signaling.

Furthermore, information indicating whether the codebook designed according to "1. Extension of dual codebook" and/or "2. Linear combination (LC) codebook" (codebook including a precoding matrix generated by a linear combination) is used may be received from an eNB through higher layer signaling. In this case, the linear combination codebook may be restricted and used for only channel state information reporting of ranks 1 and 2.

Furthermore, only an orthogonal codeword may be selected as a codeword used for a linear combination.

Furthermore, if a linear combination codebook is used as described above, subset restriction of the linear combination codebook may be applied.

For example, a codeword available for the linear combination may be restricted by a bitmap including a bit corresponding to each of all of predefined codewords or codewords belonging to a codeword set. The bitmap may be received from an eNB through higher layer signaling.

Furthermore, an indicator indicating whether a codebook including a precoding matrix generated by a linear combination is used for each rank may be received from the eNB.

Furthermore, a power coefficient available for a linear combination may be restricted by a bitmap including bits corresponding to each of all of predefined power coefficients. The bitmap may be received from the eNB through higher layer signaling.

In addition, if the codebook for the reporting of the channel state information designed according to "1. Extension of dual codebook" and/or "2. Linear combination (LC) codebook" is used for the channel state information reporting of a UE according to FIG. 15, description of a detailed operation is the same as that described above and is thus omitted.

General Apparatus to which the Present Invention May be Applied

FIG. 22 illustrates a block diagram of a wireless communication apparatus according to an embodiment of the present invention.

Referring to FIG. 22, the wireless communication system includes a base station (eNB) 2210 and a plurality of user equipments (UEs) 2220 located within the region of the eNB 2210.

The eNB 2210 includes a processor 2211, a memory 2212 and a radio frequency unit 2213. The processor 2211 implements the functions, processes and/or methods proposed in FIGS. 1 to 21 above. The layers of wireless interface protocol may be implemented by the processor 2211. The memory 2212 is connected to the processor 2211, and stores various types of information for driving the processor 2211. The RF unit 2213 is connected to the processor 2211, and transmits and/or receives radio signals.

The UE 2220 includes a processor 2221, a memory 2222 and a radio frequency unit 2223. The processor 2221 implements the functions, processes and/or methods proposed in FIGS. 1 to 21 above. The layers of wireless interface protocol may be implemented by the processor 2221. The memory 2222 is connected to the processor 2221, and stores various types of information for driving the processor 2221. The RF unit 2223 is connected to the processor 2221, and transmits and/or receives radio signals.

The memories 2212 and 2222 may be located interior or exterior of the processors 2211 and 2221, and may be connected to the processors 2211 and 2221 with well known means. In addition, the eNB 2210 and/or the UE 2220 may have a single antenna or multiple antennas.

The embodiments described so far are those of the elements and technical features being coupled in a predetermined form. So far as there is not any apparent mention, each of the elements and technical features should be considered to be selective. Each of the elements and technical features may be embodied without being coupled with other elements or technical features. In addition, it is also possible to construct the embodiments of the present invention by coupling a part of the elements and/or technical features. The order of operations described in the embodiments of the present invention may be changed. A part of elements or technical features in an embodiment may be included in another embodiment, or may be replaced by the elements and technical features that correspond to other embodiment. It is apparent to construct embodiment by combining claims that do not have explicit reference relation in the following claims, or to include the claims in a new claim set by an amendment after application.

The embodiments of the present invention may be implemented by various means, for example, hardware, firmware, software and the combination thereof. In the case of the hardware, an embodiment of the present invention may be implemented by one or more application specific integrated circuits (ASICs), digital signal processors (DSPs), digital signal processing devices (DSPDs), programmable logic devices (PLDs), field programmable gate arrays (FPGAs), a processor, a controller, a micro controller, a micro processor, and the like.

In the case of the implementation by the firmware or the software, an embodiment of the present invention may be implemented in a form such as a module, a procedure, a function, and so on that performs the functions or operations described so far. Software codes may be stored in the memory, and driven by the processor. The memory may be located interior or exterior to the processor, and may exchange data with the processor with various known means.

It will be understood to those skilled in the art that various modifications and variations can be made without departing from the essential features of the inventions. Therefore, the detailed description is not limited to the embodiments described above, but should be considered as examples. The scope of the present invention should be determined by reasonable interpretation of the attached claims, and all modification within the scope of equivalence should be included in the scope of the present invention.

INDUSTRIAL APPLICABILITY

The present invention has been described mainly with the example applied to 3GPP LTE/LTE-A system, but may also be applied to various wireless communication systems (e.g., 5G (5 generation) system) except the 3GPP LTE/LTE-A system.

The invention claimed is:

1. A method for a user equipment (UE) to report channel state information in a 2-dimensional multi-antenna wireless communication system, the method comprising:
receiving a channel state information reference signal (CSI-RS) from a base station through a multi-antenna port; and
reporting channel state information to the base station,
wherein a plurality of codewords used to generate a precoding matrix selected by the UE in a codebook for the reporting of the channel state information are specified by the channel state information,
the precoding matrix is generated based on a linear combination of the plurality of codewords to which a power coefficient has been applied after the power coefficient is applied to each of the plurality of codewords,
the plurality of codewords comprises a first codeword and a second codeword,
a first power coefficient applied to the first codeword is previously determined to be 1, and
a second power coefficient applied to the second codeword is determined to be a value relative to the first power coefficient based on the channel state information.

2. The method of claim 1, wherein:
a value available as the power coefficient is equally divided and configured between a specific upper limit and a specific lower limit, and
one or more of the upper limit and the lower limit, a number of values available as the power coefficient, and a number of bits necessary to report the power coefficient are received as information for determining the value available as the power coefficient from the base station through higher layer signaling.

3. The method of claim 1, wherein after the power coefficient and a phase coefficient are applied to each of the plurality of codewords, the precoding matrix is generated based on the linear combination of the plurality of codewords to which the power coefficient and the phase coefficient have been applied.

4. The method of claim 3, wherein:
a value available as the phase coefficient is equally divided and configured between a specific upper limit and a specific lower limit, and
one or more of the upper limit and the lower limit, a number of values available as the phase coefficient, and a number of bits necessary to report the phase coefficient are received as information for determining the value available as the phase coefficient from the base station through higher layer signaling.

5. The method of claim 1, wherein a number of codewords used for the linear combination is restricted to 2.

6. The method of claim 1, wherein a number of codewords used for the linear combination is received from the base station through higher layer signaling.

7. The method of claim 1, wherein information indicating whether a codebook comprising the precoding matrix generated by the linear combination is used is received from the base station through higher layer signaling.

8. The method of claim 1, wherein a codebook comprising the precoding matrix generated by the linear combination is used for only channel state information reporting of ranks 1 and 2.

9. The method of claim 1, wherein the codewords used for the linear combination are orthogonal.

10. The method of claim 1, wherein:
a codeword available for the linear combination is restricted by a bitmap comprising a bit corresponding to each of all of predefined codewords or codewords belonging to a codeword set, and
the bitmap is received from the base station through higher layer signaling.

11. The method of claim 1, wherein an indicator indicating whether a codebook comprising the precoding matrix generated by the linear combination is used for each rank is received from the base station.

12. The method of claim 1, wherein:
a power coefficient available for the linear combination is restricted by a bitmap comprising a bit corresponding to each of all of predefined power coefficients, and
the bitmap is received from the base station through higher layer signaling.

* * * * *